United States Patent
Bartholomew et al.

[19]

[11] Patent Number: 5,911,119

[45] Date of Patent: *Jun. 8, 1999

[54] SECURE CORDLESS TELEPHONE EXTENSION SYSTEM AND METHOD

[75] Inventors: David B. Bartholomew, West Valley City; Scott R. Bullock, South Jordan; John M. Knab, Sandy, all of Utah

[73] Assignee: Phonex Corporation, Midvale, Utah

[*] Notice: This patent is subject to a terminal disclaimer.

[21] Appl. No.: 08/729,876

[22] Filed: Oct. 15, 1996

Related U.S. Application Data

[63] Continuation-in-part of application No. 08/639,508, Apr. 29, 1996, Pat. No. 5,852,785, which is a continuation of application No. 08/034,086, Mar. 22, 1993, Pat. No. 5,530,737.

[51] Int. Cl.$^6$ .............................. H04M 11/00; H04Q 7/32
[52] U.S. Cl. ..................... 455/402; 455/425; 455/415; 455/462; 455/561
[58] Field of Search ..................... 455/462, 402, 455/410, 425, 465, 422, 561, 560, 566, 415

[56] References Cited

U.S. PATENT DOCUMENTS

| | | | |
|---|---|---|---|
| 3,280,259 | 10/1966 | Cotter . | |
| 3,809,815 | 5/1974 | Reed et al. | 179/15 FD |
| 3,809,816 | 5/1974 | Reed et al. | 179/15 FD |
| 3,949,172 | 4/1976 | Brown et al. | 179/2.5 R |
| 4,013,840 | 3/1977 | Anderson | 179/15 FD |
| 4,058,678 | 11/1977 | Dunn et al. | 179/2.5 R |
| 4,218,655 | 8/1980 | Johnston et al. | 455/39 |
| 4,222,035 | 9/1980 | Lohoff | 340/167 R |
| 4,254,403 | 3/1981 | Perez-Cavero et al. | 340/310 R |
| 4,455,651 | 6/1984 | Baran | 370/104 |
| 4,471,399 | 9/1984 | Udren | 361/64 |
| 4,475,193 | 10/1984 | Brown | 370/124 |
| 4,479,033 | 10/1984 | Brown et al. | 179/2.51 |
| 4,495,386 | 1/1985 | Brown et al. | 179/2.51 |
| 4,514,594 | 4/1985 | Brown et al. | 179/2.51 |
| 4,523,307 | 6/1985 | Brown et al. | 370/30 |
| 4,551,581 | 11/1985 | Doughty | 179/2 A |
| 4,558,177 | 12/1985 | Corris et al. | 455/402 |
| 4,559,520 | 12/1985 | Johnston | 340/310 R |
| 4,582,956 | 4/1986 | Doughty | 179/2 A |
| 4,641,126 | 2/1987 | Crowe | 340/310 A |
| 4,641,322 | 2/1987 | Hasegawa | 375/1 |
| 4,688,210 | 8/1987 | Eizenhofer et al. | 370/18 |
| 4,701,945 | 10/1987 | Pedigo | 379/66 |
| 4,759,016 | 7/1988 | Otsuka | 370/95 |
| 4,864,589 | 9/1989 | Endo | 375/1 |
| 4,901,307 | 2/1990 | Gilhousen | 370/18 |
| 4,922,517 | 5/1990 | West, Jr. et al. | 379/58 |
| 4,924,496 | 5/1990 | Figa et al. | 379/142 |
| 4,963,853 | 10/1990 | Mak | 340/310 A |
| 4,968,970 | 11/1990 | LaPorte | 340/310 A |
| 5,101,501 | 3/1992 | Gilhousen et al. | 455/33 |
| 5,127,045 | 6/1992 | Cargun et al. | 455/402 |
| 5,136,612 | 8/1992 | Bi | 375/1 |
| 5,289,542 | 2/1994 | Kessler | 380/9 |
| 5,319,634 | 6/1994 | Bartholomew et al. | 370/18 |
| 5,530,737 | 6/1996 | Bartholomew et al. | 455/402 |
| 5,581,599 | 12/1996 | Tsuji et al. | 455/462 |
| 5,752,195 | 5/1998 | Tsuji et al. | 455/462 |

*Primary Examiner*—Willis R. Wolfe
*Assistant Examiner*—Hieu T. Vo
*Attorney, Agent, or Firm*—Lloyd W. Sadler; Eleanor V. Goodall

[57] ABSTRACT

A method and system for multiple access telephone communications is described. The system utilizes one or more base units connected to subscriber lines, and multiple extension units in communication with each base unit via building power lines. Secure multiple access coding is used to prevent eavesdropping and interference. Extension units may employ cordless telephone technology. Caller ID information transmitted with incoming telephone signals may be transmitted to extension units via building power lines and displayed on the extension handset or cradle.

6 Claims, 47 Drawing Sheets

| LINES 75a & 75b | LINE 76 | NO LINE | LINE 77 |
| --- | --- | --- | --- |
| APARTMENT 71 | APARTMENT 72 | APARTMENT 73 | APARTMENT 74 |

FIG. 3

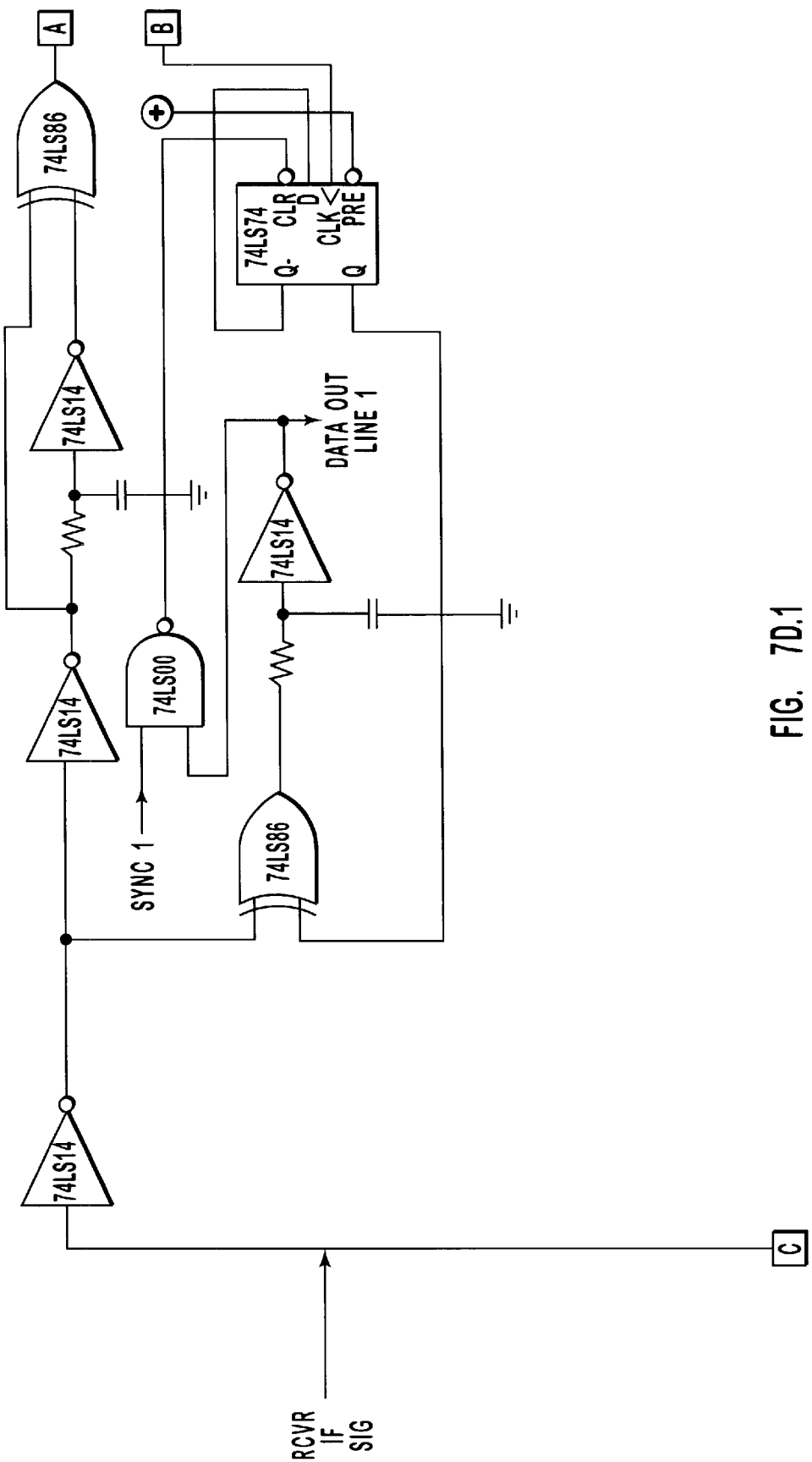
FIG. 7D.1

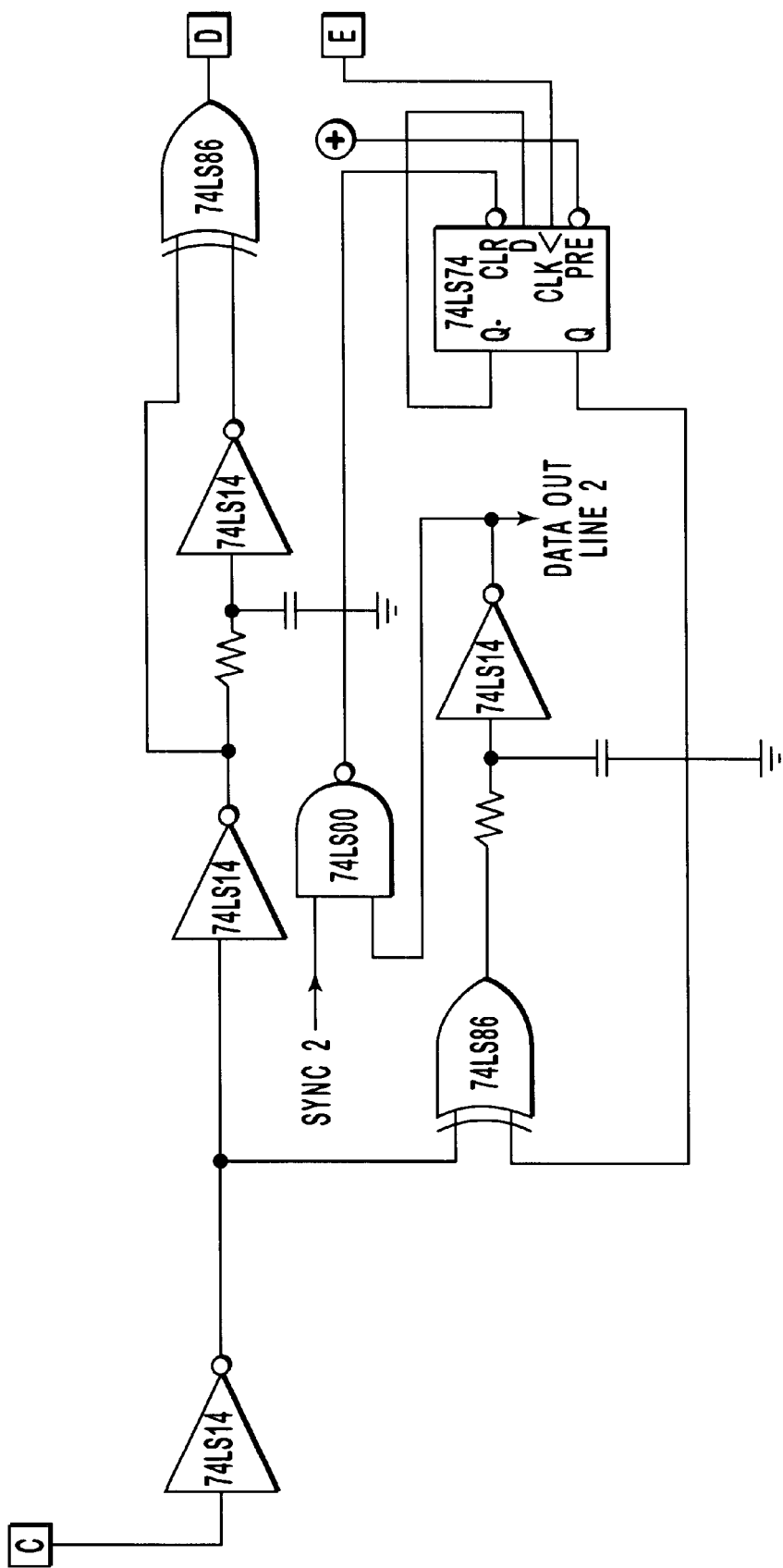
FIG. 7D.2

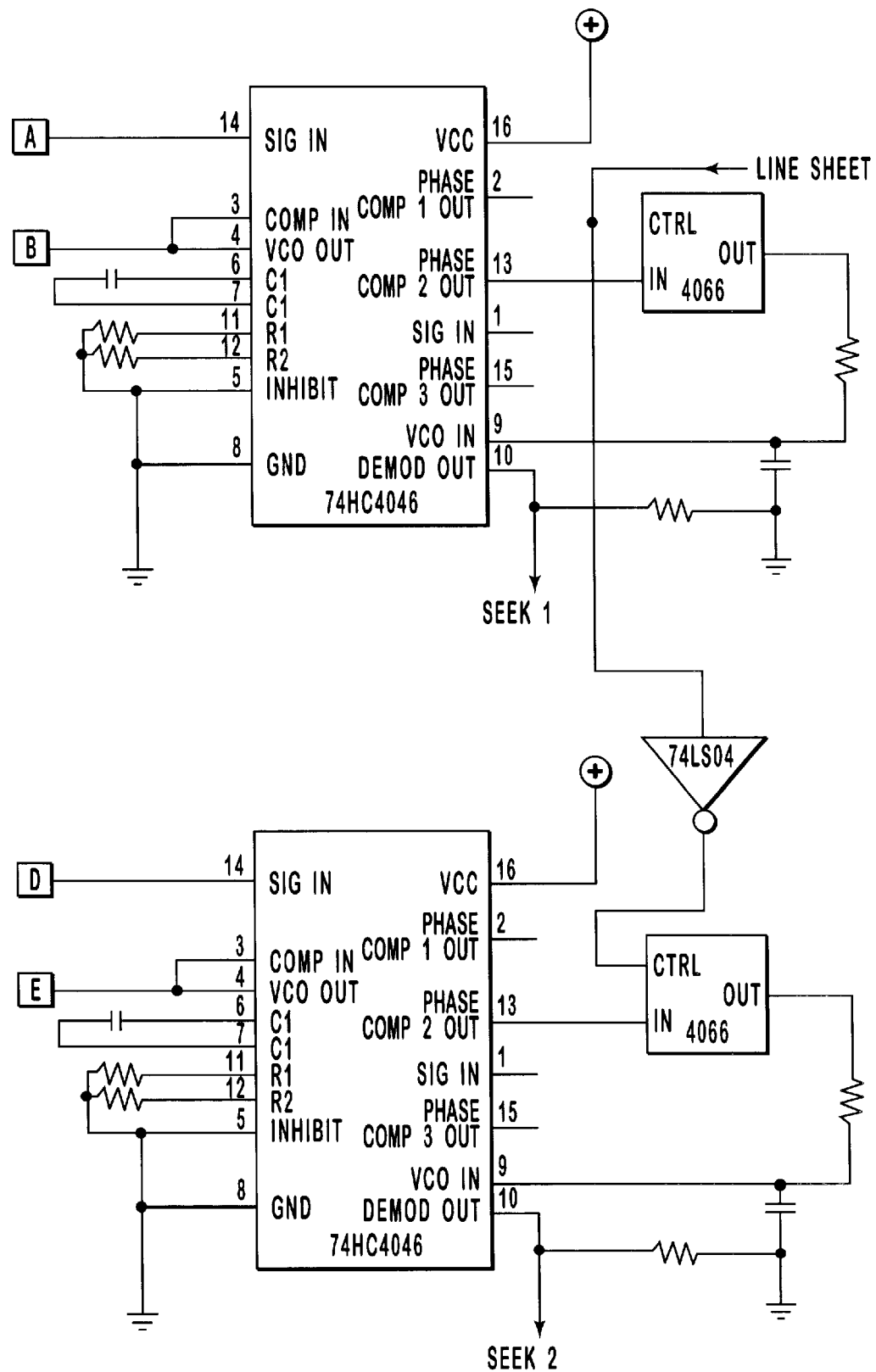
FIG. 7D.3

FIG. 23 4 KHZ LOW PASS

FIG. 34 4 KHZ LOW PASS

SECURE CORDLESS TELEPHONE EXTENSION SYSTEM AND METHOD

The following is a continuation-in-part of U.S. patent application Ser. No. 08/639,508 filed Apr. 29, 1996, now U.S. Pat. No. 5,852,785 which is a continuation of application Ser. No. 08/034,086, filed Mar. 22, 1993, now U.S. Pat. No. 5,530,737.

BACKGROUND OF THE INVENTION

This invention relates generally to digital communication systems and, particularly, to such systems which provide for multiple access to a plurality of signals carried on a single communications medium. More specifically, this invention relates to telephone extension systems, by which signals are transferred simultaneously between a plurality of telephone lines and telephone extensions by means of the AC power lines of a building or an RF (radio frequency) transmission medium. This invention also relates to secure system control protocols for line carrier telephone extension systems, which provide multiple extension arbitration logic, privacy, security and other telephone signaling options, which technique is called Secure Access (SA). The inventive method may further be implemented in a cordless telephone system and may be combined with caller I.D. technology.

THE BACKGROUND ART

When conventional telephone systems are installed in a building, a significant expense is frequently associated with running the necessary telephone wires for all desired telephone extensions. In an existing building, the telephone installation process may also significantly disrupt the building's normal use. Moreover, due to the time and expense involved, the installation is very often not susceptible to convenient modification, despite changes in the needs of the telephone system user.

Various types of telephone systems which do not require wiring installation have been developed in an effort to overcome the foregoing disadvantages.

Wireless ("cordless") telephone systems typically include a base unit which receives the telephone signal from a conventional telephone line. The signal is then transmitted between the base unit and one or more extension locations in some manner. Most commonly, the telephone signal is transmitted between the base unit and the extensions using conventional radio frequency (RF) transmission signals and techniques. Because radio frequency signals are used, good reception will not be obtained if the handset and the base are separated by concrete or tile walls, large metal objects, metal shielding within walls, metal fences, or other objects which obstruct radio frequencies. Electrical devices, including other cordless telephones, may interfere with operation of the cordless telephone. Privacy of communication is not assured, since radio frequency signals may be inadvertently (or intentionally) received by other cordless telephones, radios, and other devices which receive FM frequency signals.

Recently, attempts have been made to transmit the telephone signal using the existing power lines of the building. These prior efforts have had varying degrees of success. For example, one of the major deterrents in transmitting telephone signals over existing power lines is the nature of the power line medium itself, which presents a low and variable impedance to carrier signals as well as an extremely noisy communications environment. Studies have demonstrated that the optimum carrier frequency range lies between 3 and 15 MHz. Most prior art attempts to operate below 2 MHz have failed commercially because of noise or interference problems from other equipment operating on the electrical system.

Numerous prior art signal modulation techniques have also been attempted, primarily employing FM modulation of the carrier by audio (speech) signals (U.S. Pat. Nos. 3,949,172 and 4,701,945 being examples, the disclosures of which are incorporated herein by this reference). The problem with FM modulation is that no security is afforded the users; that is, other users with the same devices can make calls on another user's line and eavesdrop on conversations. The impact of these problems has already been demonstrated in the cordless telephone industry, which shares the same limitations as the line carrier industry. Additionally, commercial AM and FM broadcast stations are often heterodyned and demodulated in the RF range utilized by these systems, thereby interfering with the reception of telephone conversations. The transmissions from one of these systems will often also radiate and interfere with other types of FCC licensed and unlicensed commercial and residential equipment. Even the use of two FM modulation stages, as described in U.S. Pat. No. 4,701,945, is not able to solve these problems.

In prior art systems, full duplex voice communication is usually attempted by using two carrier frequencies, one for each direction. Usually a transmitter and receiver are included in each station which are operating simultaneously. This leads to mutual interference as well as increasing the normal interference drift problems and does not eliminate the security problems.

Recently, attempts have been made to transmit relatively low frequency digital data (<2 Kbps) via a line carrier and employing a multiple access technique known as direct spread. (See, for example, U.S. Pat. Nos. 4,641,322 and 4,864,589, the disclosures of which are incorporated herein by this reference.) Generally, the carrier frequencies (200–500 KHz) and corresponding data rates (20–1000 bps) are too low to provide sufficient processing gain to permit real time full duplex voice communication which generally requires about 100 Kbps. The systems using direct spread techniques also typically employ line carrier remote data collection and control applications for which high speed multiple channel data transmission is not required. Such systems likewise do not typically accommodate more than one system using the same power lines in the same building.

The physical range of line carrier communications systems is usually limited to the confines of the secondary of the power line transformer and is subject to severe noise and attenuation variances depending upon carrier frequencies and load conditions.

While noise and attenuation problems may be overcome somewhat by increasing transmitter power levels or increasing receiver sensitivity, this increases the potential for interference from neighbors with similar systems, which aggravates the problems of privacy and security prior art line carrier systems exhibit. Thus, privacy or security breaches arise when other users on the same power distribution system or in the same apartment complex with the same line carrier devices can make long distance calls on another user's line and eavesdrop on their conversations. But people driving by in cars cannot scan and eavesdrop on the line carrier signals the way they can cordless phone RF transmissions. The impact of these problems has already been demonstrated in the cordless telephone industry, which shares some of the same limitations as the line carrier industry. Security from line capture by third parties has been provided by security coding protocols in the cordless phone industry. But people with scanners or cordless phone receivers can eavesdrop on a neighbor's cordless call. Similarly, in line carrier systems it was not permitted for more than one system to use the same power lines in the same building.

Another recent innovation in telephone technology is the transmission of caller identification (ID) information with telephone calls. Equipment for generating and transmitting caller ID information is described in U.S. Pat. No. 4,551,581, while equipment for receiving and displaying this information is described in U.S. Pat. No. 4,582,956. These two patents are incorporated herein by reference. Caller ID information typically consists of a code identifying the telephone number of the station from which the call originated which is transmitted between the first and second ring signals. Caller ID equipment (which may be installed in a telephone or packaged as a separate unit which is connected to the telephone) detects the occurrence of a ring signal, detects and translates the coded identification information, and displays the caller's telephone number (or, optionally, the name of the telephone subscriber associated with that number) on a display, or simply a code corresponding to a particular caller (as described in U.S. Pat. No. 5,289,542 issued to W. K. Kessler). Other types of caller ID information could be transmitted as well, e.g., a code representing the type of service. Earlier caller ID systems delivered caller ID information after the receiving party had picked up the receiver; however, this approach is less desirable if the caller ID information is to be used for screening calls.

The subject matter of the instant invention relates somewhat to that of a previous application by the inventors hereof filed Oct. 7, 1991, Ser. No. 07/773,009, entitled "MULTIPLE ACCESS TELEPHONE EXTENSION SYSTEMS AND METHOD". The previous application relates primarily to a combination of radio frequency (RF) transmission techniques such as frequency division multiple access (FDMA) and code division multiple access (CDMA or spread spectrum).

BRIEF SUMMARY AND OBJECTS OF THE INVENTION

In view of the foregoing, it is a primary object of the present invention to provide an effective method of multiple access communication which provides for multiple access of a plurality of signals on a single communications medium.

It is also an object of the present invention to provide a method and system of line carrier communications utilizing both TDMA (time division multiple access) and CDMA (code division multiple access) to permit high data rates and multiple access by two or more telephone lines.

Further, it is an object of the present invention to provide a method and system of line carrier telephone communications which utilizes CDMA (code division multiple access) to provide a high degree of security for preventing unauthorized access to the subscriber's line, and which provides privacy with respect to the conversation from third parties.

An additional object of the present invention is to provide a method and system of line carrier telephone communications which utilizes FDMA (frequency division multiple access) in combination with CDMA (code division multiple access) to prevent interference between relatively close neighboring transmission systems or partner transmissions in the same system and to provide for multiple access (simultaneous transmission) of duplex signals for at least one telephone line.

Also, it is an object of the present invention to provide a method and system of multiple access cordless telephone extension communications which applies the same techniques to obtain the same advantages as for the line carrier telephone extension systems and methods.

It is an object of the present invention to provide an effective method of secure access (SA) communication which provides for access of a plurality of signals on a single communications medium.

It is a further object to provide a method and system of line carrier telephone communications which utilizes SA (secure access) to provide a high degree of security for preventing unauthorized access to the subscriber's line, and which provides privacy with respect to the conversation from third parties, and which provides nearly transparent interconnectivity between extension phones and the central office line.

It is an object to provide a method and system of secure access cordless telephone communications which applies the same secure access techniques to obtain the same advantages as for the line carrier telephone extension systems and method. It is a further object of the invention to provide a secure, multiple-access telephone communications system which is capable of recognizing and displaying caller ID information.

These and other objects and advantages of the invention and method will become more fully apparent as the description which follows is read in conjunction with the drawings.

Consistent with the foregoing objects, and in accordance with the invention as embodied and broadly described herein, a telephone communications system and method is disclosed in one embodiment of the present invention for conducting multiple access simultaneous telephone communications in full duplex either over the power lines of a building or over a common RF transmission means. The method employs a combination of multiple access techniques selected from among the following: time division, code division, and frequency division. The following features result: a) security coding to prevent unauthorized access and eavesdropping, b) multiple simultaneous conversations through identical and closely coupled transmission media, c) non-interference to other communications systems and users, and d) processing gain for operating in noisy environments. Secure access (SA) techniques include the use of a digital data transmission channel operating at audio rates which exchanges messages between base and extension unit controllers, which messages are composed of a sync byte, a unique security key and a system control key. SA techniques require hardware "locks" on audio, RF and system control paths which can only be connected ("opened") by receipt of the proper control key. The message can be Manchester encoded to eliminate any net DC component to the message when modulated and demodulated. Data transmission techniques such as Manchester encoding are described in the ITT "Reference Data for Radio Engineers", Fifth Ed., Howard W. Sams & Co., 1972, which is made a part hereof by reference. To complete the system requirements for secure access, hardware locks (digitally controlled analog switches) must be provided in all essential telephone signal and control paths which are operated by the system controller when proper security and control keys are received. The method also relates to improvements in cordless telephone communication.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 3 a is multiple access signal coverage diagram illustrating the deployment and combination of multiple access techniques for solving near-far problems and simultaneous use of a transmission medium in accordance with one presently preferred embodiment of the present invention;

FIG. 7 (i.e. FIGS. 7A, 7B, 7C, 7D.1, 7D.2 and 7D.3) is a schematic diagram of base unit subsystems described in FIG. 6.

DETAILED DESCRIPTION OF THE PREFERRED EMBODIMENTS

Figure 1:
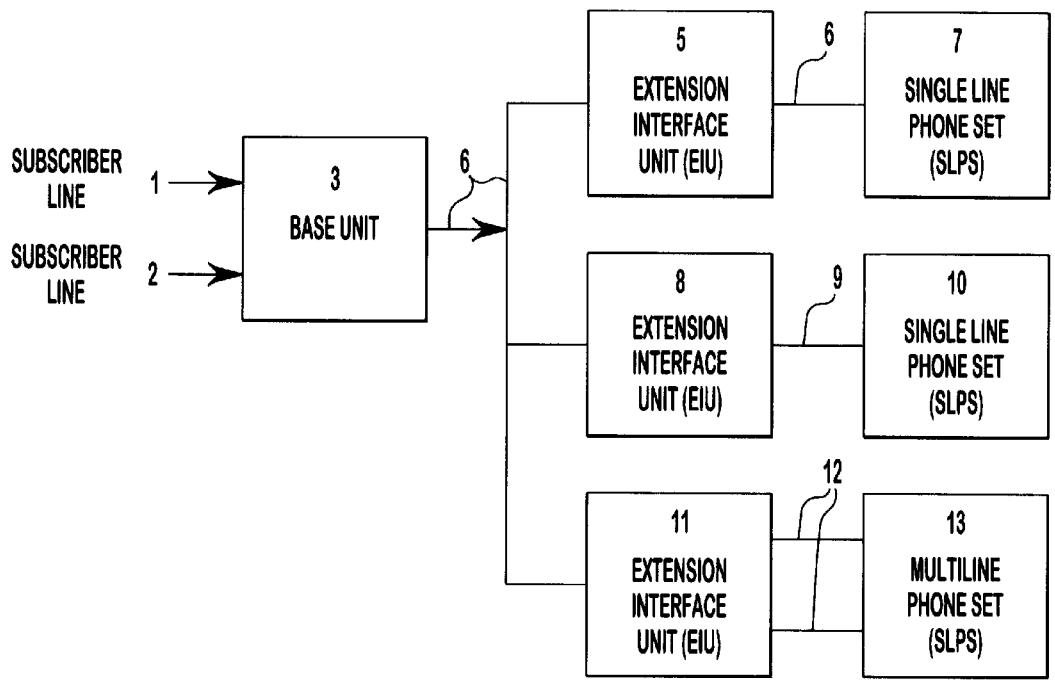
FIG. 1 is a block diagram of a line carrier telephone extension system in accordance with one presently preferred embodiment of the present invention, the system servicing a plurality of subscriber lines and corresponding extension phone sets.

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 40, is not intended to limit the scope of the invention, as claimed, but it is merely representative of the presently preferred embodiments of the invention.

The presently preferred embodiments of the invention will be best understood by reference to the drawings, wherein like parts are designated by like numerals throughout.

It will be readily apparent from the discussion which follows that the present invention is adapted for use in a wide variety of specific communications applications, including telephone communications. The present invention may likewise be used with virtually any communications medium, such as, for example, RF signals or line carriers such as the power lines in a building. Nevertheless, in order to simplify the following discussion, the presently preferred embodiments of the present invention will be described below with specific reference to a telephone communications system which employs line carriers as the communications medium.

Multiple Access System

An increasing number of people live in apartments and condominiums which share power lines. It is, therefore, important for a telephone extension system to utilize multiple access techniques in a unique and skillful manner so as to permit acceptable operation. Many prior art limitations can be overcome by proper application of multiple access techniques as employed in the instant invention.

The following specific multiple access (MA) techniques are employed in the presently preferred embodiments of the present invention:

A) Time Division Multiple Access (TDMA), and two spread spectrum techniques, namely:

B1) Code Division Multiple Access (CDMA), often called direct spread, which can include subcarrier CDMA, and B2) Frequency Division Multiple Access (FDMA), which includes frequency hopping techniques and deployment of multiple simultaneous transmission frequencies.

These techniques are more fully described in a work by Robert C. Dixon, "Spread Spectrum Systems," 2nd Ed., John Wiley & Sons, (U.S.A., 1984), which is made a part hereof by reference.

TDMA (time division multiple access) is employed in the instant invention to permit the bidirectional transmission of duplex voice data for one or more subscriber lines which are "partners" in the same multiline installation. A single base unit interfaces with the subscriber lines and transmission medium (AC power line) and controls the transmission of bidirectional voice data by breaking the transmissions into time frames and windows, in which each communications channel is assigned a specific transmit and receive time window. By this means the system controller can guarantee that only one transmission will occupy the medium at one time. The frequency with which each frame of windows is repeated (20–40 KHz) is high enough to transfer high speed voice data.

CDMA (code division multiple access) provides four benefits: security, privacy, low interference with other FCC licensed systems and antijamming margin from interference and competing users. The fact that neighboring users may wish to make simultaneous use of the transmission medium requires that the transmission be coded so that a casual neighbor cannot access (transmit to) another's phone line to make long distant calls ("security") or intercept (eavesdrop/receive) their conversation ("privacy"). CDMA also spreads the radiation spectrum of the transmission energy over a very wide bandwidth (2–10 MHz) so that the energy content of any licensed or unlicensed narrow band is too small to interfere with FCC licensed users. CDMA also rejects many types of power line interference due to inherent "processing gain"; and the multiple access feature of using mutually orthogonal codes prevents jamming interference between users of similar telephone extension systems if their signals are below the "jamming margin". A discussion of these terms follows.

Processing gain (Pg) is acquired by using more bandwidth than the data requires. Processing gain is defined by the following equation:

$$\frac{\text{RF BANDWITH}}{\text{DATA BW}} = \frac{5000 \text{ KHz}}{100 \text{ KHz}} = 50 = 17 \text{ dB}$$

Thus, if the RF bandwidth is 5 MHz and the data bandwidth is 100 KHz then the processing gain would be 50 times or 17 dB. Since approximately 6 dB of gain is required for correlation and demodulation, the resultant 11 dB is the jamming margin (Mj) (i.e., Mj=Pg−6dB). A 10 dB Mj would provide that ten jamming sources of equal strength or distance to the "friendly" signals could be rejected, or one "unfriendly" source of equal strength ten times closer, or one unfriendly source ten times greater in strength and equal in distance. For this reason, CDMA cannot be relied upon to carry the burden of jamming margin for near jamming sources. The CDMA jamming margin is also related to code length which is the number of code generator clock cycles ("chips") a code generator will cycle through before the code pattern repeats; but as long as the code length exceeds the processing gain, the main advantage gained by using long codes is privacy and security related.

Because of the limitations of CDMA (code division multiple access) to provide a high antijamming margin for near neighbors, FDMA (frequency division multiple access) is employed to the extent that it is limited by the bandwidth of the media. Thus, if the center frequency of near neighbors were offset by 1 to 3 MHz, the correlation and recovery of the required IF (intermediate frequencies) is diminished substantially.

Prior art line carrier and cordless telephone extension systems do not combine the advantages of the forms of multiple access technology described above. Consequently, they suffer from significant operational disadvantages which are believed to be overcome by system and method of the present invention, a presently preferred embodiment of which will now be described in greater detail.

Reference is first made to FIG. 1 which illustrates one presently preferred embodiment of a line carrier telephone extension system in accordance with the present invention. As shown, the line carrier telephone extension system in FIG. 1 services a plurality of subscriber lines 1–2 and corresponding extension phone sets 7, 10 and 13. Subscriber lines 1 and 2 plug into base unit 3 which provides the interface circuitry and protocols for the subscriber line signals (including ring, off hook and duplex audio signals), and for multiple access power line carrier signals, which are carried through a building via AC power lines 4 to extension interface units 5, 8 and 11. The extension units 5 and 8 are single line extensions and provide means to interface the multiple access line carrier signals to single line phone sets 7 and 10 via lines 6 and 9, respectively. Extension unit 11 provides means to interface the multiple access line carrier signals to a multiline phone set 13 via lines 12.

A line carrier system as illustrated in FIG. 1 must operate in a manner which is transparent to the extension phone set user. Thus, by means of base unit 3, AC power lines 4 and extension unit 5, an incoming ring signal is detected in the base unit, encoded into multiple access line carrier signals, transferred to the power lines 4, decoded in the extension unit 5 and converted to a ring signal for extension phone set 7.

When a user picks up the receiver of an extension phone set, it goes off hook, which condition is detected in the extension unit 5, encoded by said extension unit into multiple access line carrier signals and transmitted via power lines 4 to the base unit 3 where the line carrier signals are decoded and the subscriber line is captured by off hook circuitry. Duplex audio circuitry then connects to the line and bidirectional transmission of voice and/or dial tones and DTMF (dual tone multifrequency) signals takes place, with the voice being encoded into multiple access line carrier signals, transmitted via power lines 4 and decoded back into voice in the base and extension units 3 and 5, respectively. Specific subsystems and corresponding functions will be addressed with reference to FIGS. 4 through 8.

While in the preferred embodiment the voice signals are encoded into multiple access line carrier signals by converting the analog voice signals to digital representations using a analog-to-digital converters or CODECs, an alternative embodiment of the invention could use a frequency-modulation encoding or modulation technique. Such encoding techniques are well-known in the art.

Alternatively, the preferred embodiment can directly transmit digital data by eliminating the analog-to-digital converters and directly connecting a digital input in place of the output of the analog-to-digital converter. The preferred embodiment can also directly produce digital output by eliminating the digital-to-analog converter in the receiving subsystem and using the digital signal previously connected to the digital-to-analog converter as the digital output.

Figure 2:
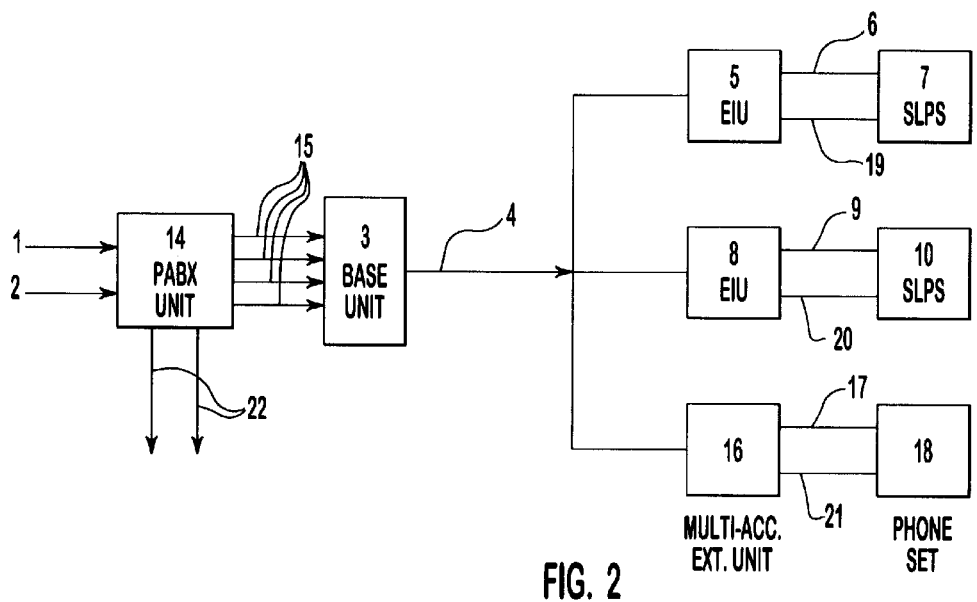
FIG. 2 is a block diagram of a line carrier PABX telephone extension system in accordance with one presently preferred embodiment of the present invention, the system servicing a plurality of line carrier extension phones and conventional extension phones.

Another embodiment of a multiple access line carrier system in accordance with the present invention is illustrated in FIG. 2 and involves replacing conventional PABX extension lines 22 with multiple access line carrier systems, which can be easily installed and moved. As shown, subscriber lines 1–2 connect to PABX unit 14 which provides a plurality of extension phone lines 22 and 15. Extension lines 15 connect to multiple access base units 3 while some of the extension lines 22 connect in a conventional manner to other phone sets. Base units 3 interface the PABX signals to the AC power lines 4 of a building, as previously described. Multiple access extension units 5, 8 and 16 interface the line carrier signals to phone sets 7, 10 and 18 via voice and data lines 6, 9, 17, and 19–21, said data lines 19–21 providing PABX control signals to phone sets 7, 10, and 18, or, alternatively, digital data for digital communications equipment, such as, for example, computers and fax machines.

The relative advantages of using various multiple access techniques are depicted in FIG. 3. Four apartments 7174 are shown which are located in the same building and which share a common power line transformer secondary. Apartment 71 has two phone lines 75(a) and (b) which are connected to a base unit 3 (FIG. 4) of the instant invention, not shown. Apartment 72 adjoins apartment 71 and has one line 76 connected to a base unit 3. Apartment 73 separates apartment 74 from apartment 72 and, while apartment 73 may have a phone line, it is not connected to a base unit. Apartment 74 has a phone line 77 connected to a base unit.

Using TDMA, different signals are sent at different times as orchestrated by the system controller of a base unit. TDMA techniques are, therefore, used to separate the signals from the two "partner" lines 75(a) and (b) of apartment 71 so that there is no mutual interference between them.

The other two apartments 72 and 74 have independent base units which use the same transmission medium as apartment 71, that is, the power lines of the same apartment building. FDMA techniques are used to separate apartment 72 from the other two competitors (71 and 74), since the IF (intermediate frequency) filters of the units are sufficient to block strong local competitors of different frequencies, as will be described in further detail below. There is not sufficient bandwidth in the medium to provide more than a few alternate frequencies. Therefore, FDMA is used to avoid interference from competitors which are relatively "near" and, fortunately, relatively few.

A greater number of neighbors ("competitors") exists which are relatively "far" from each other, of which apartment 74 and apartment 71 are examples. CDMA techniques possess sufficient jamming margin to reject interference from weaker, more "far" away, competitors. It is also a major characteristic of CDMA to provide a low probability of interception from eavesdropping receivers, even at "near" distances, which is why CDMA is employed in all cases.

Figure 4:
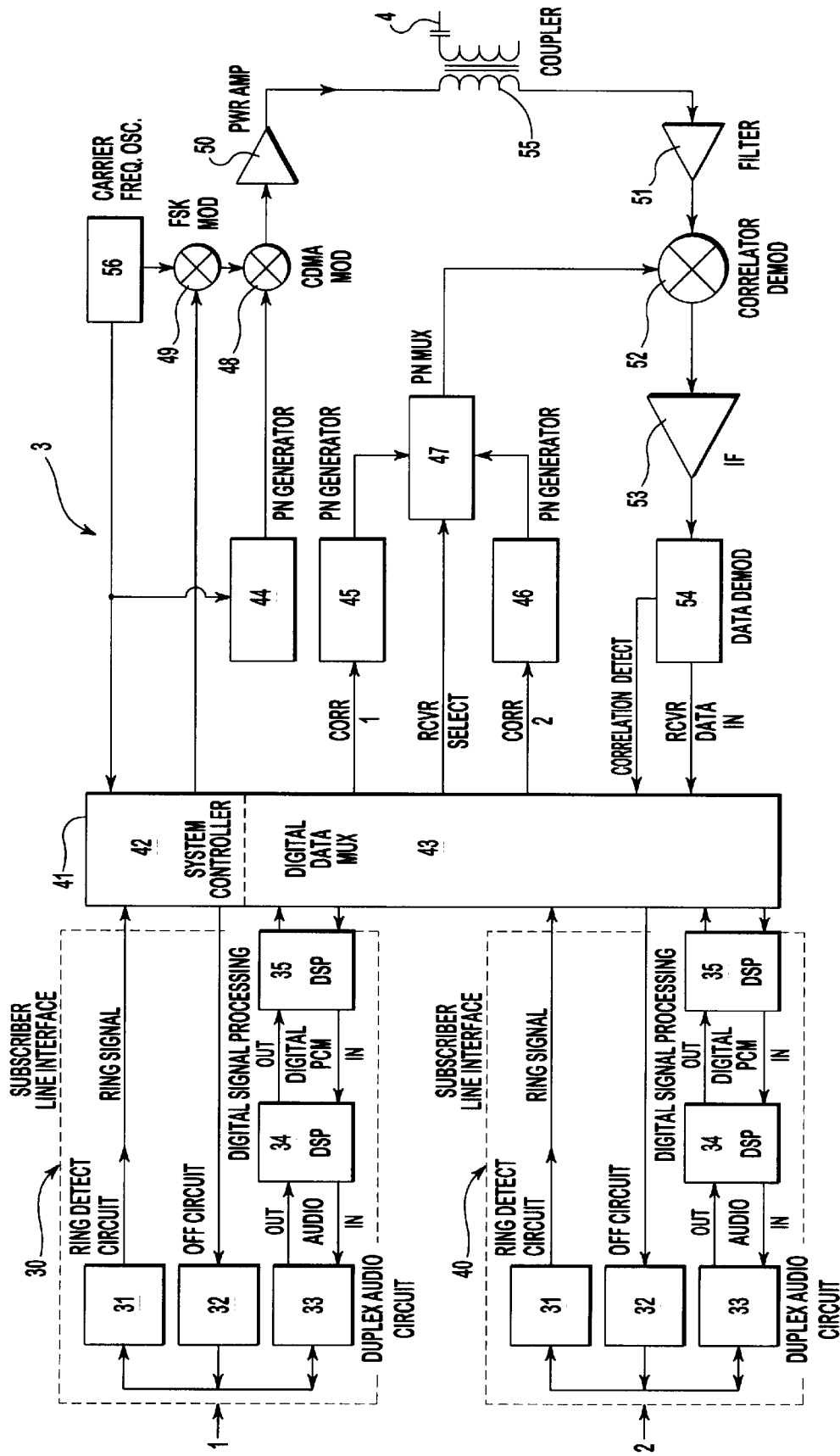
FIG. 4 is an electrical block diagram of a base unit of a multiple access line carrier telephone extension system in accordance with one presently preferred embodiment of the present invention, said base unit interfacing a plurality of subscriber lines to the power line distribution system of a building.

A multiple access base unit 3 is functionally diagrammed in FIG. 4 which illustrates subsystems selected from and providing a combination of two or more multiple access techniques: CDMA, FDMA and TDMA. The subscriber lines 1 and 2 each connect to respective subscriber line interfaces 30 and 40, which each contain ring detect circuit 31, off hook circuit 32, and duplex audio circuit 33. The ring detect circuit 31 converts an incoming subscriber line ring signal to a control signal for the system controller 42. Off hook circuit 32 accepts an off hook command from system controller 42 and captures the subscriber line 1. Duplex audio circuit 33 connects bidirectional audio signals between line 1 and digital signal processing (DSP) blocks 34 and 35 which interface with digital data MUX (multiplexer) 43 and system controller 42. The DSP blocks include analog-to-digital and digital-to-analog converters called codecs 34 and digital data compression/expansion circuits 35.

Alternatively, the preferred embodiment can directly transmit digital data by eliminating the analog-to-digital converters 34 and directly connecting a digital input in place of the output of the analog-to-digital converter 34. The preferred embodiment can also directly produce digital output by eliminating the digital-to-analog converter 34 in the receiving subsystem and using the digital signal previously connected to the digital-to-analog converter 34 as the digital output. This could be used to provide a direct interface to an ISDN data or facsimile device.

The TDMA (time division multiple access) subsystem 41, between the system controller 42 and data MUX 43, multiplexes the transmit and receive functions performed in the CDMA/FDMA (code and frequency division multiple access) circuits with the incoming and outgoing voice data streams and control signals for ring and off hook/busy. For example, in one embodiment which relies primarily on time and code division multiple access techniques, the system controller 42 divides the total system time into blocks of 10 microsecond duration. During the first half of the block the base unit 3 transmitter is enabled, and transmits data from subscriber lines 1 and 2 in two 2.5 microsecond windows to the extension units 5, 8 and 11 (see FIG. 1). During the second half of the block, the base unit 3 receiver is enabled and data is received from two extension units in two 2.5 microsecond windows and transferred to subscriber lines 1 and 2 via subscriber line interfaces 30 and 40. Short time spaces between transmit and receive windows and modes allows for signal propagation delays between the base and extension units.

In addition to TDMA (time division multiple access), FIG. 4 illustrates the use of CDMA and FDMA in the line carrier transceiver section. A pseudonoise (PN) code generator 44 and carrier frequency oscillator 56, by means of a CDMA modulator 48, produces a spread spectrum line carrier. Said CDMA modulator 48 is connected to a power amplifier 50. In one embodiment the oscillator 56 runs at 10 MHz and the PN code rate is 5 MHz, producing a spread spectrum main lobe bandwidth from 5 to 15 MHz. Use of 4095+ bit (chip) code length ensures reasonable privacy and security and minimizes interference with other types of equipment. An FSK (frequency shift key) modulator 49 modulates the carrier with the data to be transmitted. Some other forms of data modulation can also work with spread spectrum modulation, such as BPSK (biphase shift key), QPSK (quadriphase shift key), MSK (minimum shift key) and FM (frequency modulation). Code selection switches and oscillator/carrier frequency switches can provide user changeability of CDMA and FDMA parameters to minimize collision potentials between physically proximate systems.

To accommodate the variation in distances between the base unit and the several extension units and to still maintain carrier lock with the system oscillator, the base receiver comprises a plurality of PN (pseudonoise) generators 45 and 46 which are delayed in time from the transmitter PN generator 44 as selected by the system controller via PN MUX (multiplexer) 47 to provide the correct PN phase to the CDMA correlator 52 permitting correlation of extension CDMA signals coming from the AC lines 4 through coupler 55 and filter 51 to said correlator/demodulator 52. The correlated receiver signals are amplified and filtered by IF 53 prior to demodulation by data demodulator 54. The digital data MUX 43 insures that the right data is transferred to the right subscriber line interface during its assigned TDMA window.

The use of TDMA (time division multiple access) for transmit and receive modes as well as for the duplex data for each subscriber line allows the transmitters and receivers of both the base 3 and extension units 5, 8, and 11 (see FIG. 1) to operate at the same carrier and IF frequencies. Frequency division multiple access is not required if no near neighbors are using the transmission medium.

Another embodiment of the present invention does not require the use of TDMA (time division multiple access) if FDMA (frequency division multiple access) is employed for each data channel. The transmitters in the base 3 and extension units 5, 8, and 11 send data on two or more carrier frequencies simultaneously, and the receivers have corresponding correlators 52 for each transmitted data channel. Carrier frequencies and corresponding heterodyne correlator frequencies can be synthesized so that single or multiple IF's (intermediate frequencies) can be employed to reduce mutual interference between subsystems in a unit. Differing CDMA codes can also be used in each data channel to reduce mutual interference with other data channels. Care must also be taken to avoid collisions between carrier and code rate harmonics.

Figure 5:
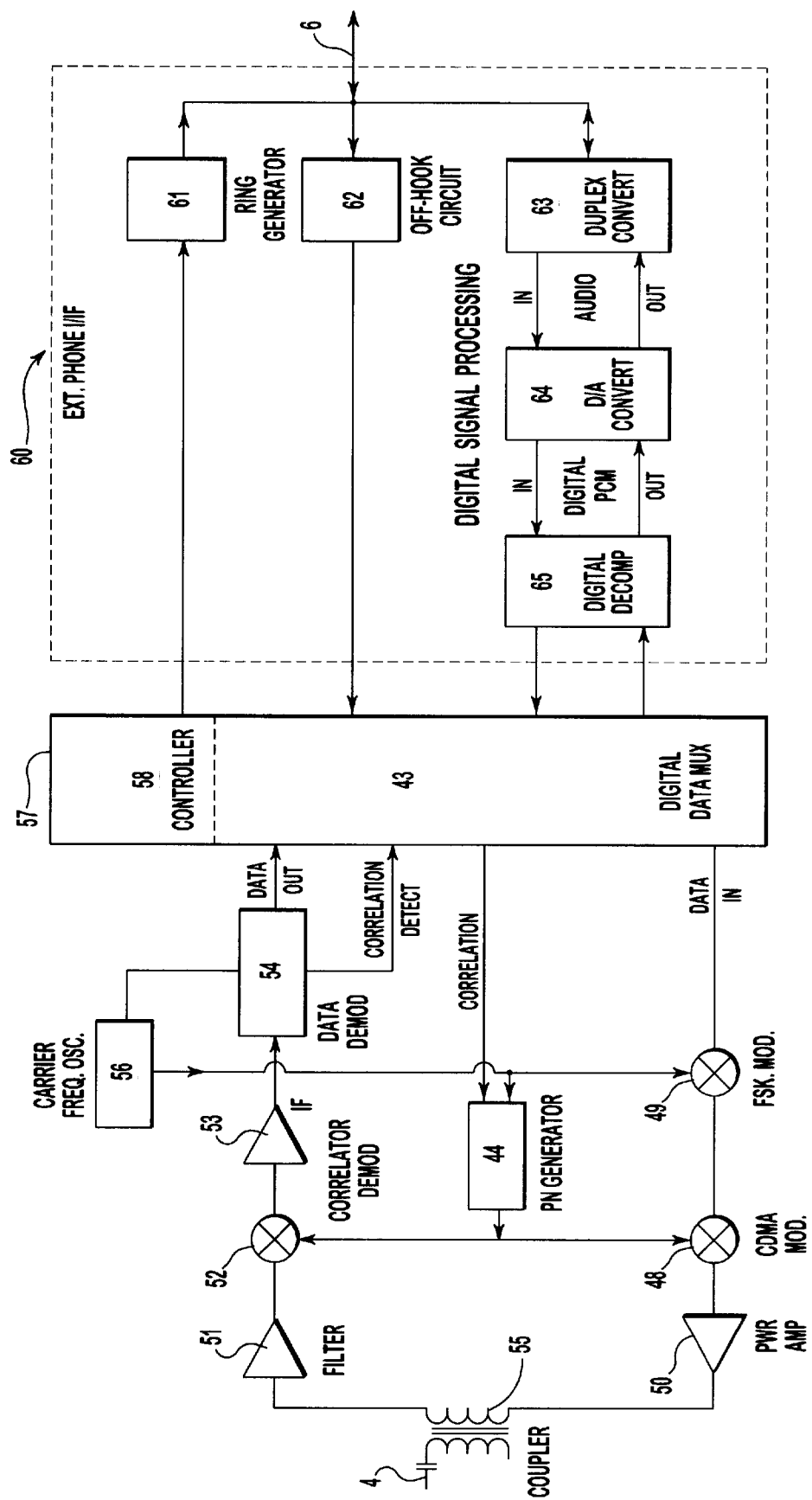
FIG. 5 is an electrical block diagram of an extension unit of a multiple access line carrier telephone extension system in accordance with one presently preferred embodiment of the present invention, the extension unit interfacing an extension phone to the power line distribution system of a building.

FIG. 5 illustrates one presently preferred embodiment of a multiple access extension unit in accordance with the present invention. As shown, the extension unit diagramed in FIG. 5 contains most of the same subsystems as the base unit of FIG. 4, and the same reference numerals are accordingly employed. There is, however, one notable exception: the additional PN (pseudonoise) generators 45 and 46 of the base unit are omitted in the extension unit. The same type of PN code generator 44 which is used to correlate the received spread spectrum carrier signal in the base unit is used in the extension unit to CDMA modulate the transmitter data returning to the base unit. Thus, referring to FIG. 1 and 5, multiple access carrier signals from the base unit 3 are carried by power lines 4 to extension units 5, 8 and 11 and coupled via AC line coupler 55 and filter 51 into the CDMA correlator 52. The recovered data modulated carrier is amplified and filtered by IF (intermediate frequency) amplifier 53 and sent to data demodulator 54 where the data is recovered and multiplexed 43 to the extension phone interface 60 where digital decompression (expansion) 65 and digital to analog converter 64 provide duplex audio to the extension phone line 6 and set 7 (not shown). Extension phone interface 60 also comprises a ring generator 61 and an off hook circuit 62. Similarly, audio returning from the extension line 7 to the subscriber line 1 passes through duplex conversion 63, A/D conversion 64 and DSP compression 65 to TDMA controller 57 where data MUX 43 sends the signal in its appropriate time window to data modulator 49, CDMA modulator 48, power amplifier 50 and AC line coupler 55 into power lines 4 and on its way to the base unit 3.

The system controller 58 of the extension unit of FIG. 5 can differ from the system controller 42 of the base unit 3 in that the former contains multiple extension arbitration logic. For example, in one embodiment, only one extension phone set is permitted to use one subscriber line at a time. If several extension sets are assigned to one subscriber line and a first extension is using that line, then when a second extension set is taken off hook, the second extension unit will check the base unit transmissions to determine that the assigned subscriber channel is already in use by an other extension unit and will emit a busy tone to the second extension phone set. Desired protocols may be installed in the system control logic to handle various requirements. A programmable logic device can be used to implement this function and provides for reprogramming the desired protocols.

Figure 6:
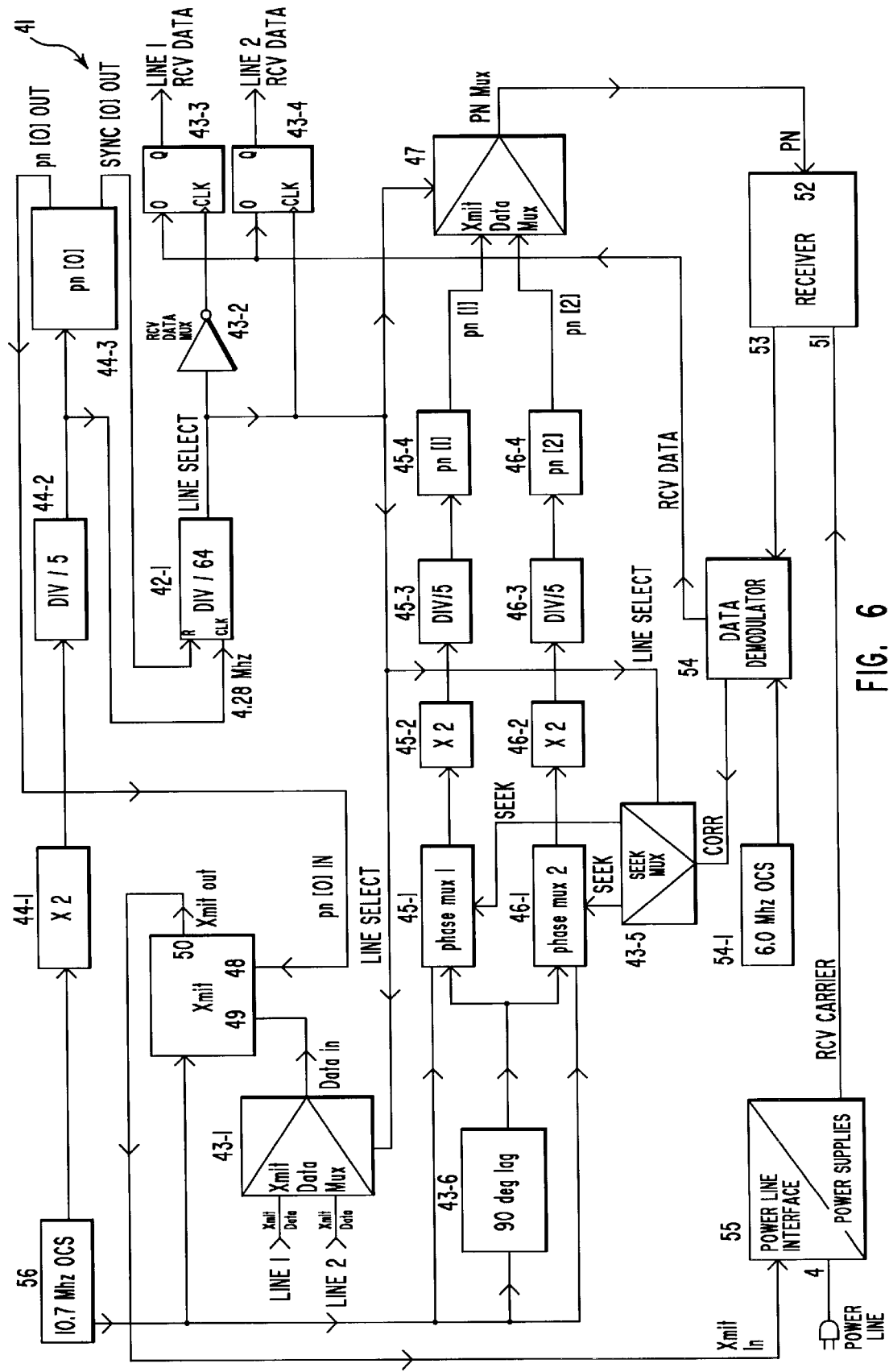
FIG. 6 is a schematic and block diagram illustrating one presently preferred embodiment of the base unit system diagram of FIG. 4, including the associated transmitter and receiver subsystems.
Figure 7A:
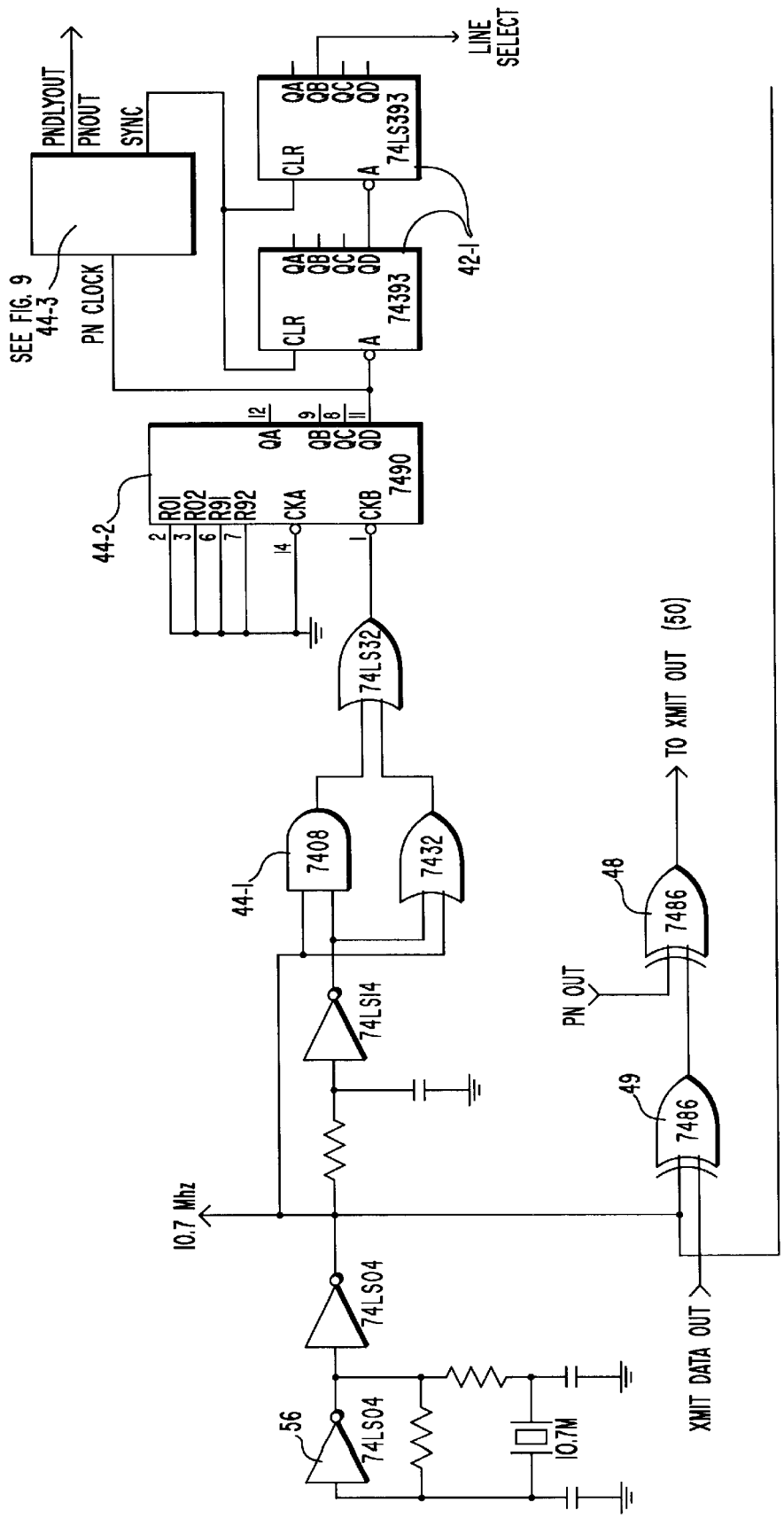
Figure 7B:
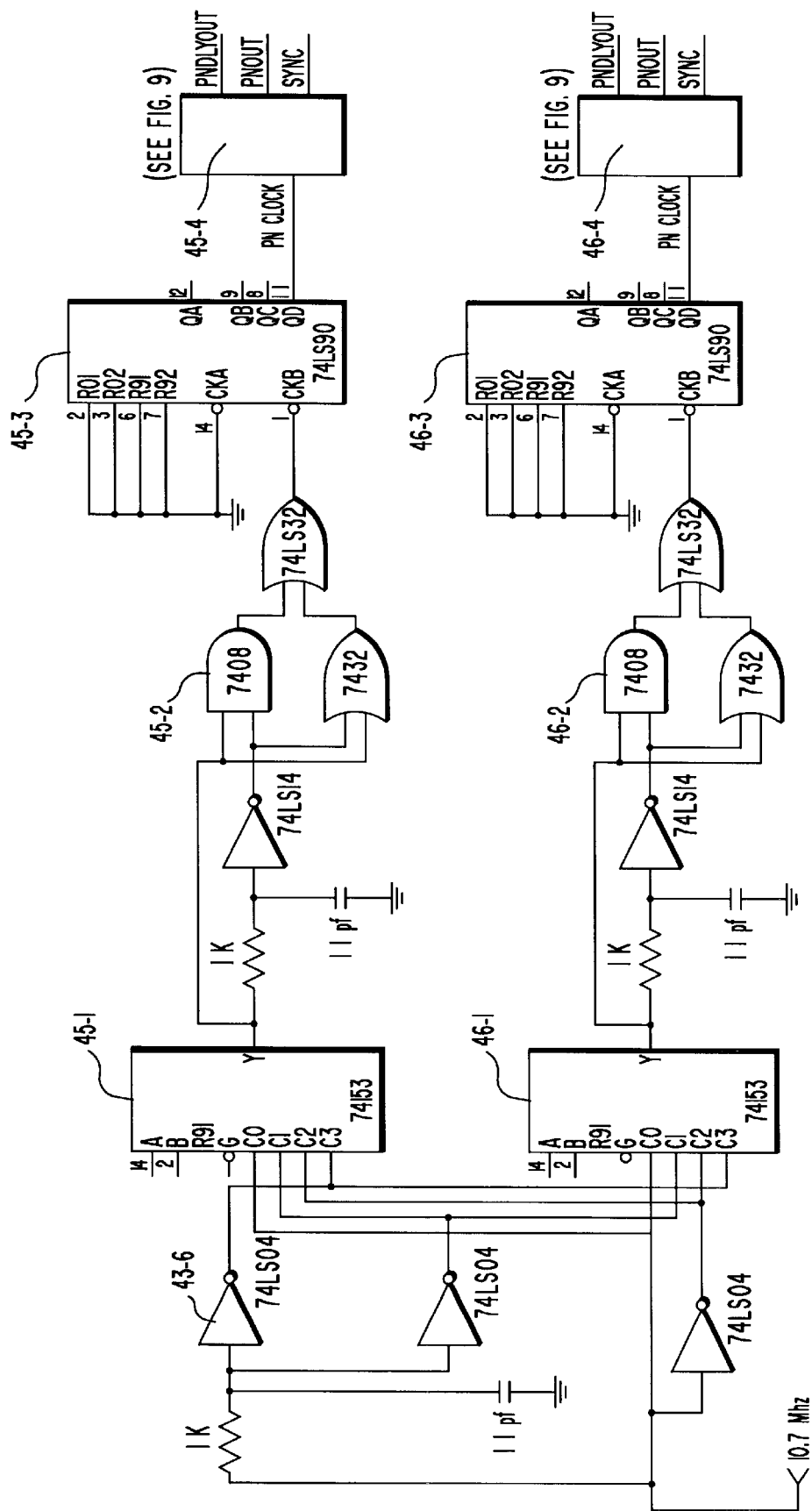
Figure 7C:
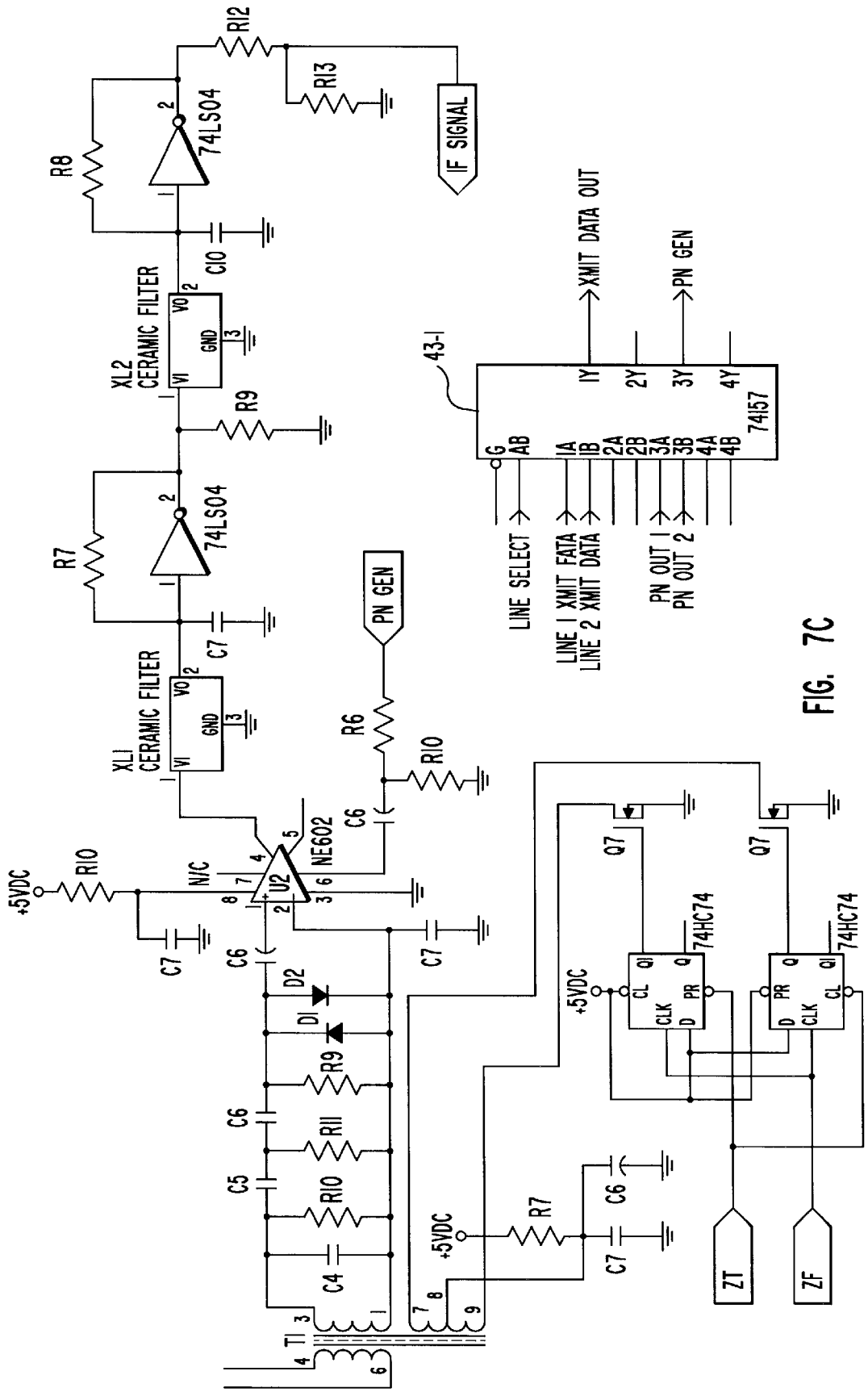

Reference is next made to FIGS. 6 and 7, which illustrate in more detail a block diagram and schematic diagram of one preferred embodiment derived from the functional block diagram of FIG. 4. Those of ordinary skill in the art will, of course, appreciate that various modifications to the block diagram of FIG. 6 and corresponding schematic diagram of FIG. 7 may easily be made without departing from the essential characteristics of the invention, as described in connection with the block diagram of FIG. 4 above. Thus, the following description of the detailed diagrams of FIGS. 6 and 7 is intended only as an example, and it simply illustrates one presently preferred embodiment of a schematic diagram that is consistent with the foregoing description of FIG. 4 and the invention as claimed herein. Components of FIGS. 6 and 7 which correspond to functional components of FIG. 4 are designated by the same initial reference numbers. Thus, for example, components which correspond to CDMA PN code generator transmitter 44 of FIG. 4 are designated in FIG. 6 as 44-1, 44-2 and 44-3.

FIGS. 6 and 7 illustrate a specific embodiment of the system controller 41 for a base unit 3 in which three multiple access techniques are employed to provide a two line extension system, which requires four data channels, two for each line. FDMA (frequency division multiple access) is employed to multiple access the transmit and receive function, wherein the transmitter 48–50 operates at 10.7 MHz and the receiver 51–53 at 6 MHz.

CDMA (code division multiple access) is employed in the transmitter and receiver PN (pseudonoise) code generators 44-3, 45-4 and 46-4 to reduce mutual interference between the stronger local transmitter signals and the weaker extension unit signals. In the instant embodiment, this is accomplished by offsetting the phase relationships of the similar code sequences of the three PN generators relative to one another. This code phase offset is partly accomplished as a natural consequence of the differing distances of the extension units 5, 8 and 11 from the base unit 3 (see FIG. 1).

To obtain the four data channels, two data channels each for the transmitter and receiver, TDMA (time division multiple access) is employed to multiplex the data for lines 1 and 2 to the transmitter (through multiplexer 43-1) and from the receiver (through demultiplexer 43-2,3,4) at a 50% duty cycle as synchronized by the PN (pseudonoise) codes and divider counter 42-1. Thus, at the beginning of each 8191 chip code sequence, the divide by 64 line select counter 42-1 is reset, and the 4.28 MHz chip clock from 44-2 clocks both the PN generator 44-3 and the TDMA line selector 42-1, which alternately selects data at the rate of 67 KHz, providing a bit rate for each channel of 33.5 KHz or 67 KBs.

A detailed description of the system controller circuitry of FIG. 6 follows. Power line interface or AC line coupler 55 connects bidirectional carrier signals from AC power lines 4 to the transmitter 50 and receiver 51. The output of transmitter oscillator 56 is doubled by a conventional pulse edge detector frequency doubler 44-1 and subsequently divided by five with counter 44-2, producing a 4.28 MHz chip clock for clocking PN generator 44-3, said PN generator having 13 stages and producing an 8191 chip long code sequence and a sync out pulse at the start of each new sequence for resetting line select counter 42-1. The 4.28 MHz chip clock also clocks the line select counter 42-1, which clocks line 1 and line 2 data multiplexers 43-1,2,3,4 as well as seek multiplexer 43-1 and PN multiplexer 47.

Thus, line 1 and line 2 transmit data from the subscriber line interfaces enter transmit data MUX 43-1, where the data modulates the 10.7 MHz carrier at 49 and which is further code division multiple access modulated at 48 and via transmitter output 50 sent to the power line coupler 55. The receiver data for sending back to the subscriber line interface is received from the power line 4 via interface 55 and filter 51 and presented to CDMA correlator 52 which recovers the data modulated 6 MHz carrier 53. Separate PN generators 45 and 46 are provided because the distance from the base unit and resulting propagation delay for each extension unit may differ, which causes the PN phase relationships between the transmitter PN[0] generator 44-3 and the receivers'0 PN[1] 45-4 and PN[2] 46-4 to be delayed in time.

During the initiation of communication, synchronization of each receiver PN generator with that of the extension unit transmitter is required. This is achieved by providing a PN code seek and lock circuit consisting of 90 degree lag circuit 43-6 in combination with phase multiplexers 45-1 and 46-1, seek multiplexer 43-5 and the correlation output of data demodulator 54.

The seek function is provided at all times when correlation is not detected, and is effected by individually retarding the phase of the clock signal (10.7 MHz) input to each uncorrelated receiver PN generator (PN[1] 45-2,3,4 and PN[2] 46 2,3,4) at the line select rate by means of 90 degree lag circuit 43-6 and phase multiplexers 1 and 2 45-1 and 46-1. The 90 degree lag circuit 43-6 supplies all four phases of the clock to the phase multiplexers, which select in a retarding order one of the phases by means of a two bit binary counter which is clocked by each line select pulse.

The seek mode of operation continuously and progressively retards each receiver PN code phase by 90 degrees every 64 chips until the data demodulator detects correlation of an incoming signal from one of the extension units assigned to a specific line, whereupon the seek mode for that line is converted to the operating mode for said line and the phase multiplexer and PN generator hold the correlating phase relationship and the transmit and receive data channels for said line are activated. The seek multiplexer 43-5 insures that the uncorrelated channel for the unused line continues in the seek mode until correlation for said unused line is detected.

Many of the subsystems illustrated in FIGS. 4–6 can be implemented with readily available and second sourced commercial components. For example, ring detect 31, off hook circuit 32 and duplex audio circuit 33 are elements of a subscriber loop interface circuit ("SLIC"). The codec 34 and compression function 35 can be constructed with industry standard 2913–2917 devices. The codec can also be a newer oversampled sigma-delta coder with DSP decimation and companding, as described in several articles such as that by Freedman et al., "IEEE Journal of Solid-State Circuits", Vol. 24, No. 2 (U.S.A., April 1989), pp. 274–280, and manufactured by AT&T as a T7510. The PN (pseudo noise) code generator can be a 13 stage modular shift register generator (MSRG) or a Gold code sequence generator as described by Dixon at pp. 65–81 and implemented with MC8504's (or equivalent shift register chips) and exclusive-or gates. The CDMA modulator 48 can be as simple as an exclusive-or gate with the carrier frequency and the PN code as its inputs or a balanced modulator such as a Signetics NE602 or older circuits described by Dixon at pp. 109–113. Similarly, the CDMA correlator/demodulator 52 can be an NE602. The IF (intermediate frequency) amplifier and filter 53 and demodulator 54 can consist of an NE604 or a CA3089. The digital data MUX 43 consists of digital gates or bilateral switches (CD4066). The application notes of numerous manufacturers provide detailed examples and engineering data on the implementation of the functions described in this paragraph.

The TDMA (time division multiple access) system controller 42, on the other hand, is a unique sequential and state logic machine, an embodiment of which is described in detail above in connection with FIG. 6. In addition, it should be appreciated that cost and size limitations apply to discrete implementation of complex circuit embodiments, which motivates the integration of most functions of the present invention into a single low-cost application specific integrated circuit (ASIC).

Following is a table which further lists specific electrical component parts that might be used to implement the functions and subsystems of the present invention, as illustrated and described above in connection with FIGS. 4–6. Those skilled in the art will readily appreciate, however, that other specific circuitry and components may be equally well adapted to the implementation of the principal functions of this invention. Thus, the following list of specific components is intended only as an illustration, and merely represents one presently preferred embodiment of the invention. For simplicity, components are identified in the following table by the corresponding reference numbers used in Figures and FIGS. 4–9.

TABLE I

Specific Electrical Components Comprising the Embodiment of FIGS. 4–6

| Reference No. | Part No. | Manufacturer |
| --- | --- | --- |
| 31 | MC33120 | Motorola |
| 32 | MC33120 | Motorola |
| 33 | MC33120 | Motorola |
| 34 | 2913 | {Texas Instruments |
| 35 | 2917 | {Intel Lattice |
| 42 | | |
| 42-1 | 74393 | National, Motorola, Etc. |
| 43 | | |
| 43-1 | 74157 | |
| 43-2 | 7404 | |
| 43-3 | 7474 | |
| 43-4 | 7474 | |
| 43-5 | 75157 | |
| 43-6 | 7474 | |
| 44 | | |
| 44-1 | 7408, –14, –32 | |
| 44-2 | 7490 | |
| 44-3 | 74194, 7474, 7486 | |
| 45 | | |
| 45-1 | 74157 | |
| 45-2 | 7414, 7408 | |
| 45-3 | 7490 | |
| 45-4 | 74194, 7474, 7486 | |
| 46 | | |
| 46-1 | 74157 | |
| 46-2 | 7414, 7408 | |
| 46-3 | 7490 | |
| 46-4 | 74194, 7474, 7486 | |
| 47 | 74157 | |
| 48 | NE602, 7486 | Signetics |

TABLE I-continued

Specific Electrical Components Comprising
the Embodiment of FIGS. 4–6

| Reference No. | Part No. | Manufacturer |
|---|---|---|
| 49 | 7486 | |
| 50 | 7404 | |
| 51 | RC, LCLow Pass Filter | |
| 52 | NE602 | Signetics |
| 53 | NE604 | Signetics |
| 54 | NE604 | Signetics |
| 54-1 | | |
| 55 | | |
| 56 | | |
| 57 | | |
| 58 | | |
| 61 | | |
| 62 | | |
| 63 | | |
| 64 | | |
| 65 | | |

Figure 8:
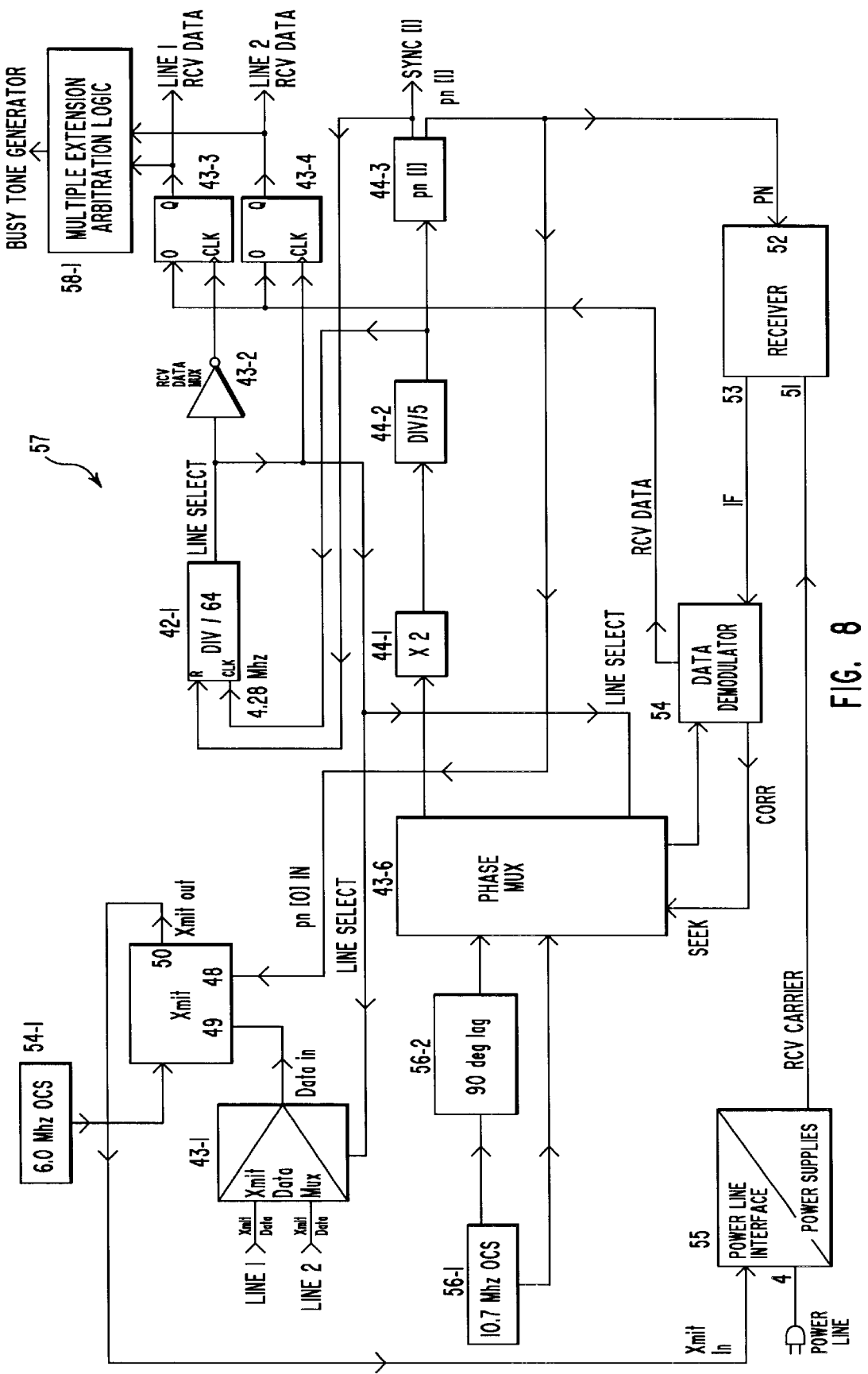
FIG. 8 is a block diagram of an extension unit system controller and digital data multiplexer, including the associated transmitter and receiver subsystems.
Figure 9A:
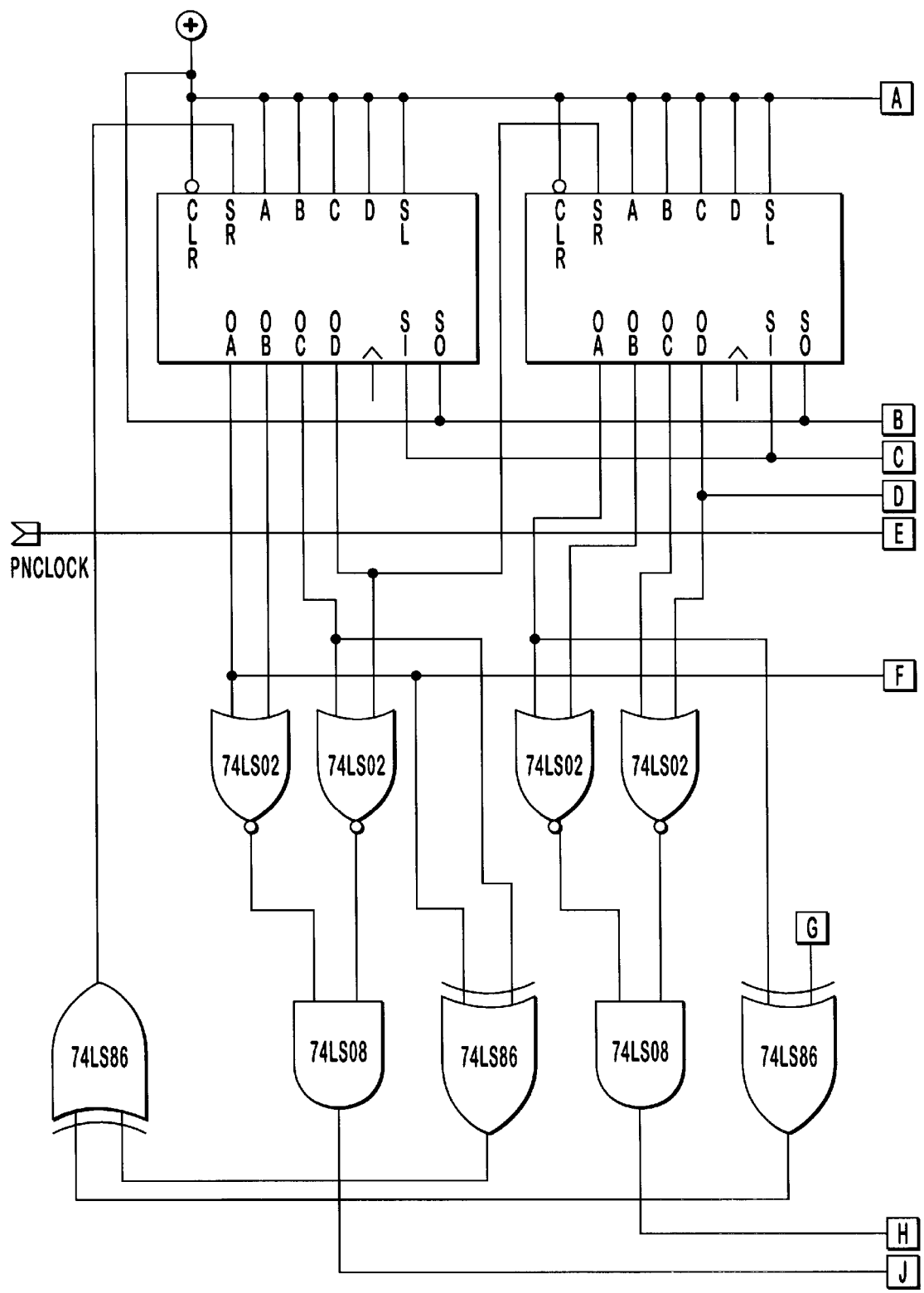
FIGS. 9A through 9D are a complete schematic diagram of the PN generator employed in FIGS. 6 through 8.
Figure 9B:
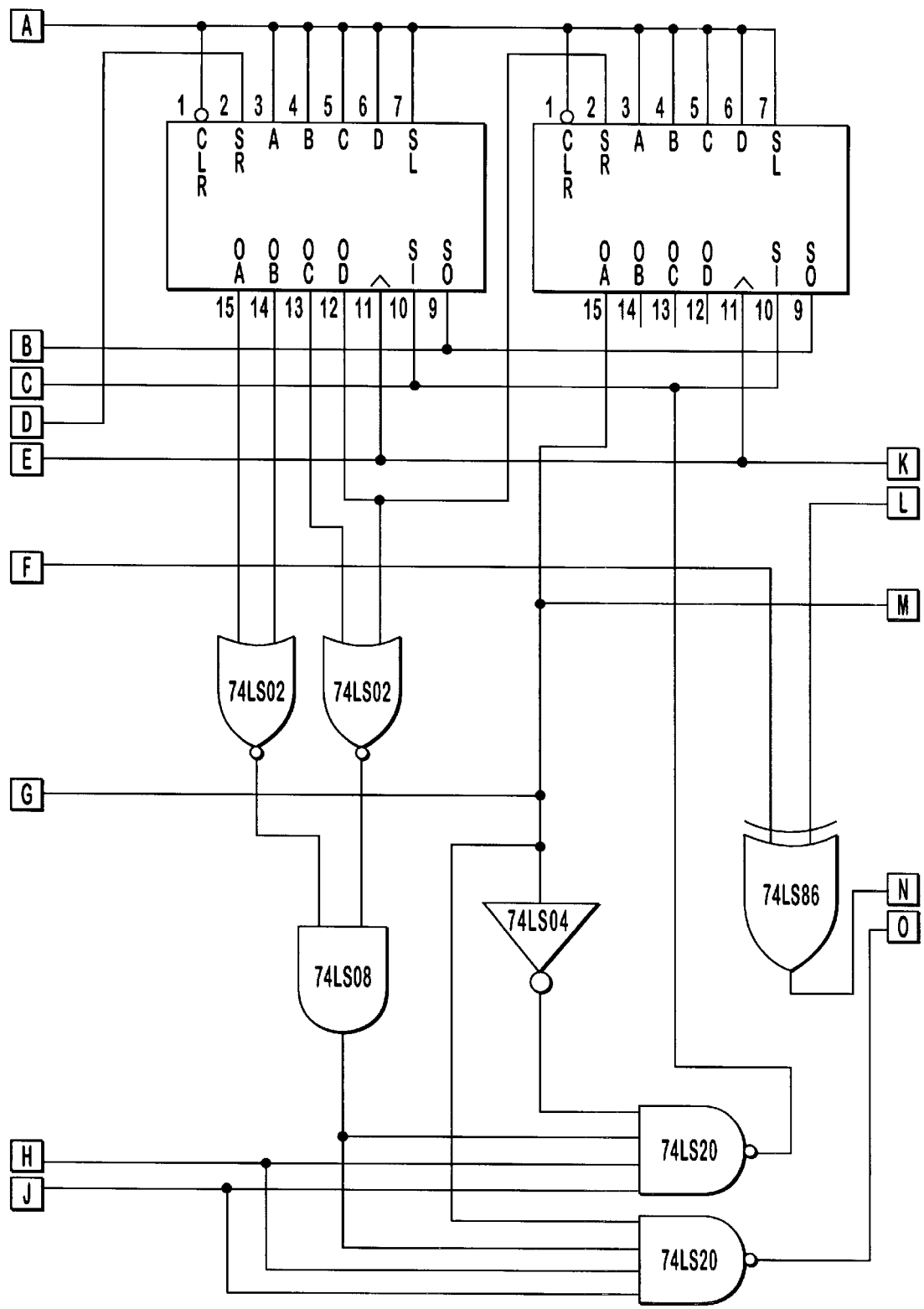
Figure 9C:
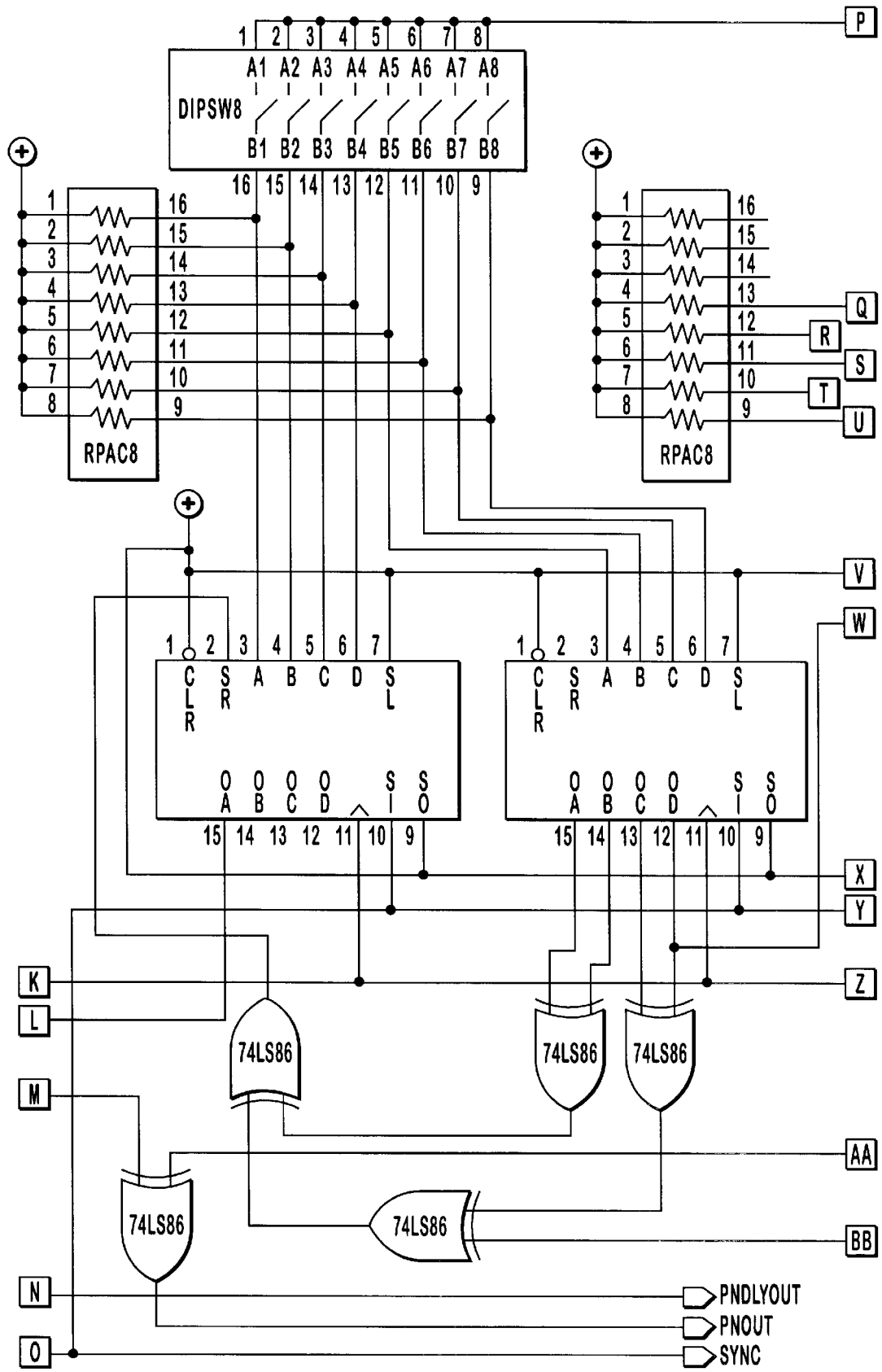
Figure 9D:
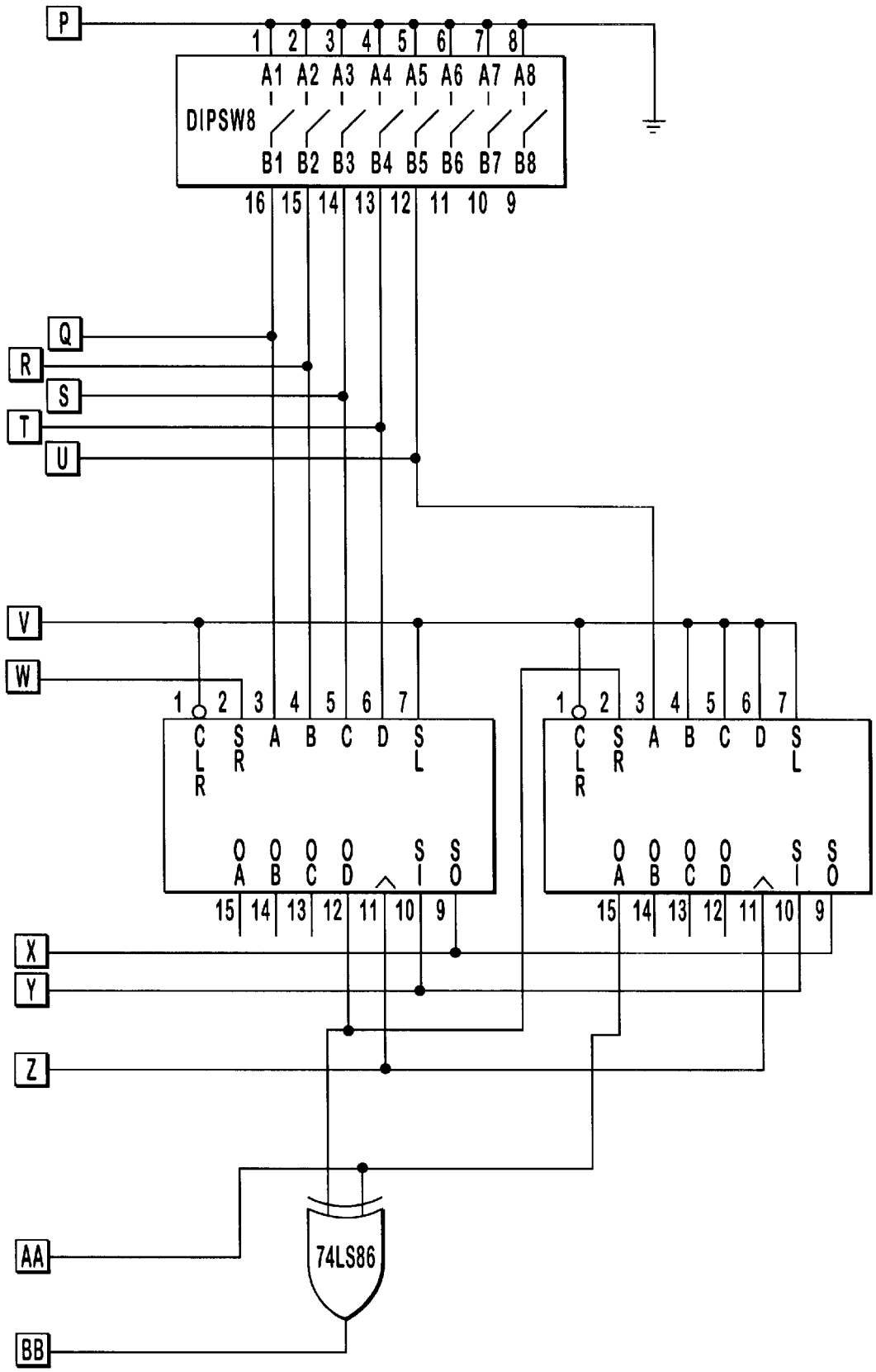

An embodiment of the extension controller 57 is illustrated in FIG. 8. Power line interface 55 connects the power line 4 with the transmitter 50 and receiver 51. The transmitter operates at a carrier frequency of 6 MHz which is substantially different from that of the receiver's 10.7 MHz 56-1. A sufficient difference in carrier frequency allows for simultaneous operation of both the receiver 51 and transmitter 50 with support from other subsystems including filters and hybrid circuitry in power line interface 55 and a phase offset in receive and transmit pseudonoise (PN) codes at PN code generator 44-3, said code offset providing a spreading instead of a correlation of the transmitter signal 50 which may bleed over into the receiver 51. While the offset PN output is easily obtained by using the existing output of one of the last stages of the modular shift register generator employed in the PN generator 44-3, a separate PN generator and code could also be employed. The use of a heterodyne correlator in receiver 52 in combination with a frequency synthesized local oscillator mixed with PN code 44-3 enhances the flexibility for performing frequency division multiple access. Frequencies of all subsystems are carefully selected to avoid fundamental, harmonic and image frequency interference.

In the extension unit (5) embodiment of FIG. 8 the base carrier signal enters the filter 51 and is correlated and mixed with the PN code at correlator 52 recovering the data modulated intermediate frequency signal at 53, which signal is demodulated at 54 and the data sent to data demultiplexer 43-3 and 43-4, which demultiplexer sends the correct data to line 1 and line 2 extension phone interfaces. Multiple extension arbitration logic 58-1 continuously monitors the data and operating state of each line to provide a busy tone indicator to a user of one extension unit attempting to use a line which is being used by another extension unit. This is possible because all extension units 5 receive data from the base unit 3 but do not transmit data back to said base unit unless a user takes the particular extension unit off hook and the line is not already in use by another extension unit. Physically, the arbitration logic controller is composed of several gates and flip-flops. PN code correlation is provided by a seek circuit composed of 10.7 MHz oscillator 56-1, 90 degree lag 56-2 and phase multiplexer 43-6, which multiplexer clocks the PN generator 44-1,2,3 and periodically selects the next 90 degree retarded phase of the oscillator during correlation seeking state of the receiver, until the data demodulator detects a strong and correlated intermediate frequency signal at receiver IF 53, whereupon seeking is terminated and the base and extension PN codes are synchronized. The sync output of the PN generator 44-3 resets the time division multiple access line select counter 42-1, which divides the chip (PN clock) rate by 64 or another suitable number depending on clock rates and data rates. The line select output of counter 42-1 drives the received data demultiplexer 43-3 as well as the transmit data multiplexer 43-1, which selects which data modulates the 6 MHz carrier oscillator 54-1 at transmitter 49 and is mixed with PN code at mixer 48 for transmission back to the base unit by output 50.

Secure Access System

Figure 10:
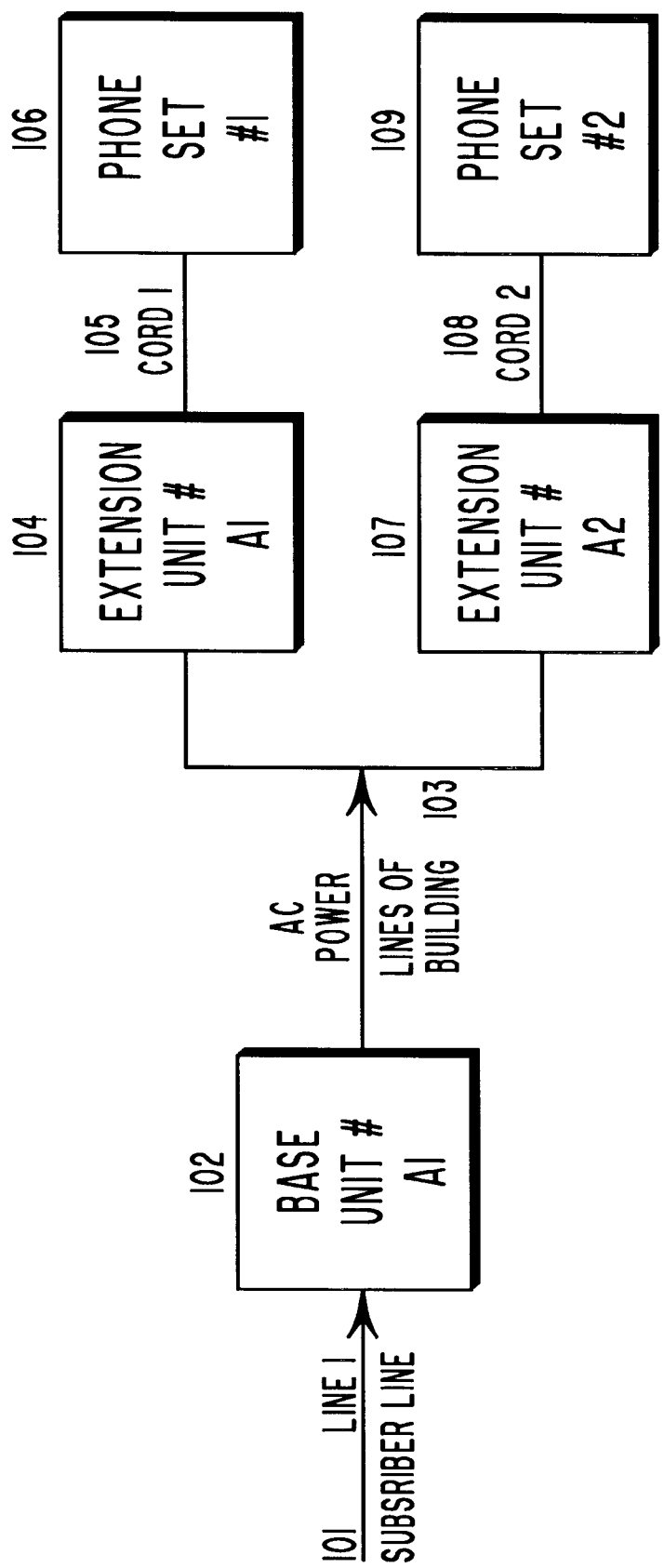
FIG. 10 is a block diagram of a line carrier telephone extension system servicing a single subscriber line and a plurality of extension phone sets.

Reference is first made to the illustration of a line carrier telephone extension system in FIG. 10 which services a single subscriber line 101 and a plurality of extension phone sets 106 and 109. Subscriber line 101 plugs into base unit 102 which provides the interface circuitry and protocols for the subscriber line signals (including ring, off hook and duplex audio) and for secure access power line carrier signals, which are carried through a building via AC power lines 103 to extension interface units 104 and 107. The extension units 104 and 107 are single line extensions and provide means to interface the secure access line carrier signals to single line phone sets 106 and 109 via cords 105 and 108, respectively.

A line carrier system as illustrated in FIG. 10 must operate in a manner which is transparent to the extension phone set user. Thus, by means of base unit 102, AC power lines 103 and extension unit 104, an incoming ring signal is detected in the base unit, encoded into secure access line carrier signals, transferred through the power line, decoded in the extension unit and converted to a ring signal of identical length for extension phone set 106. When a user picks up the receiver of an extension phone set, it goes off hook, which condition is detected in the extension unit 104, encoded by said extension unit into secure access line carrier signals and transmitted via power lines 103 to the base unit 102 where the secure access line carrier signals are decoded and the subscriber line is captured by off hook circuitry. Duplex audio circuitry is unlocked and connected to the line and bidirectional transmission of voice and/or dial tones and DTMF takes place, with the voice signals modulating line carrier signals, which are transmitted via power lines 103 and decoded/demodulated back into voice in the base and extension units. Specific subsystems and corresponding functions will be addressed in reference to FIGS. 105 and 106.

FIG. 10 also may be used to illustrate multiple extension arbitration logic. For example, when a central office sends a ring signal through the subscriber line 101 into the base unit 102, the base unit 102 qualifies the ring signal for both frequency (15 to 110 Hz) and amplitude (40 Vrms min.) and sends start and stop ring messages to both extension units 104 and 107, which ring messages are detected and converted to standard ring signals which ring both phone sets 106 and 100 with substantially the same ring cadence as that of the original central office ring signal. Suppose a user then takes phone set # 2 (109) off hook, which is detected in the corresponding extension unit # A2 (107), which unit sends an off hook request message to the base unit 102 which 1) qualifies the security code and off hook message, 2) captures the subscriber line and 3) sends an off hook acknowledgment message to both extension units, which off hook acknowledgment message allows only extension unit # A2 (107) to connect audio and signalling circuitry between itself 107 and phone set # 2 (109), enabling the user to engage in normal telephone communications. If a second user at phone set 1 106 takes his receiver off hook while phone set # 2 (109) is in use, the system control logic in extension unit # A1 (104) will produce a busy tone for phone set # 1 (106) and will not permit the second user access to the ongoing conversation because the system control logic recognizes that it did not make the first off hook request and was on hook when the first off hook acknowledgment was received. If, however, the first user goes on hook at phone set # 2 (109) while the second user at phone set # 1 (106) is off hook, extension unit # A2 (107) will send a hang message to the base unit 102 which returns an "unack" message to all extension units (but does not immediately hang up), upon receipt of which unack message by extension unit # A1 (104) it sends an offhook request to the base unit 102 and connects audio upon receipt of an acknowledgment message from the base. Logic in the base unit refrains from hanging up the central office following a hang message for only sufficient time to permit a second extension to request the line following the unack message from the base.

Multiple extension arbitration logic permits a user to put a call on hold by pressing the switch hook twice quickly on his extension phone set #1 or #2. A tone generated in the corresponding extension unit 104 or 107 confirms the hold request state. The extension unit sends a hold message to the base unit 102 whereupon the base unit 1) mutes the subscriber line audio while still capturing the line and 2) sends to all extension units a 3 short ring cadence message every 45 seconds or so for ten periods, following which the base rings twice and waits a last 20 seconds before hanging up the line if the user does not take the call. During this time any extension phone set including hardwired phones can be taken offhook by a user and signal the holding base unit to go off hold; phone set #1 or #2 sends off hook requests to the base unit which unlocks the audio path; if a hard wired phone goes offhook, the base unit detects a drop in subscriber line voltage and releases line capture to the hard wired phone set. The system control logic is more particularly described in FIGS. 12 and 13.

Figure 11:
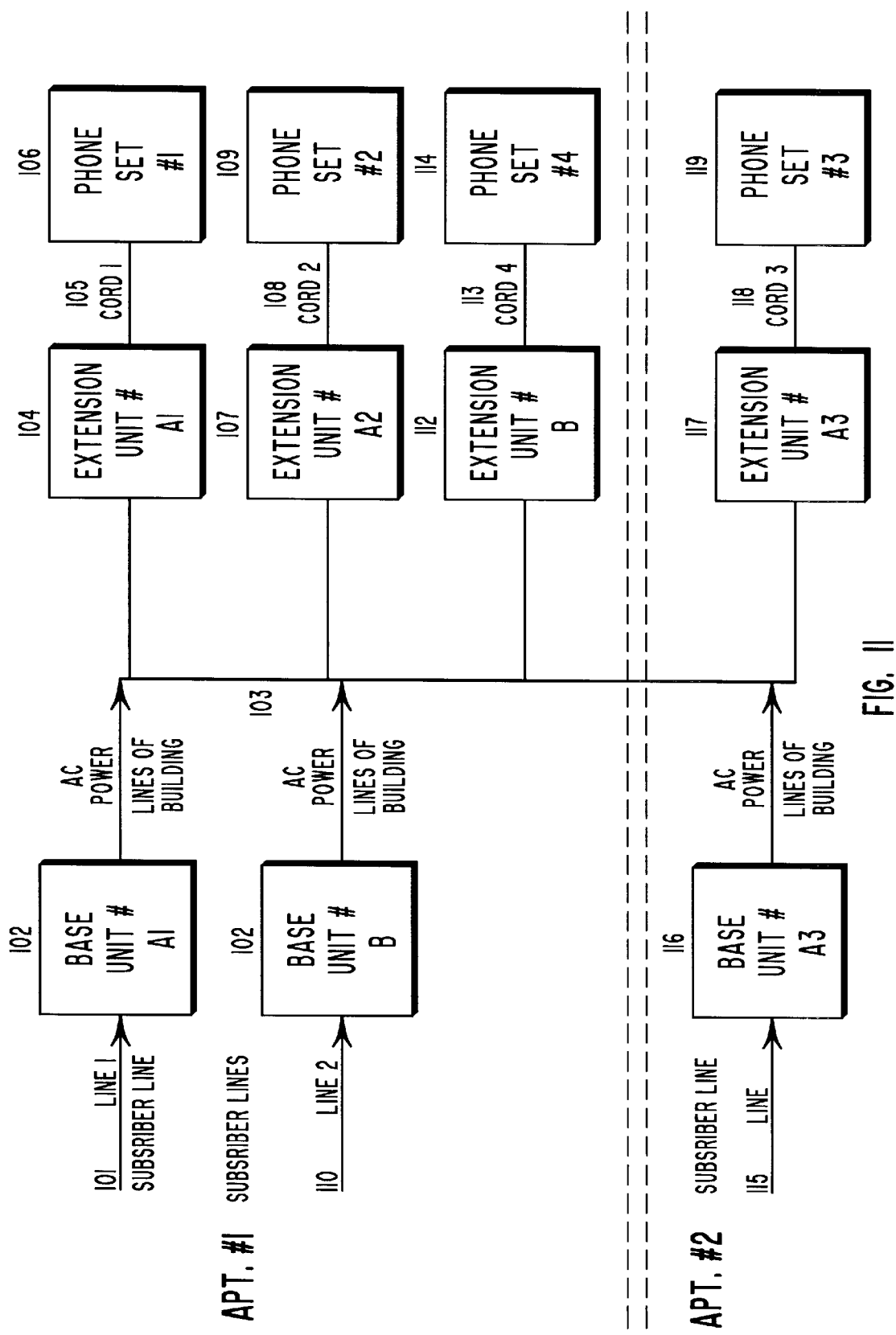
FIG. 11 is a block diagram of a line carrier telephone extension system servicing a plurality of subscriber line and extension phones in an apartment complex with a common AC power distribution system.

FIG. 11 illustrates a combined application of secure access and multiple access technologies in which several apartments share a common AC power distribution system and service a plurality of subscriber telephone lines and line carrier extensions. Because all "A" units use the same line carrier frequencies, secure access techniques are required to provide privacy and security between Apt #1 line 101 and the Apt #2 line 115. The user in Apt #1 can match codes in his units by first pressing a button on base unit # A1 (102) and then within a minute pressing the corresponding buttons on extension unit # A1 (104) and # A2 (107). Pressing the buttons puts the units into the learn mode, where the extensions send out a request for the randomly selected security key in the base unit, which the base returns to the extension units. Since the user in Apt #2 has no idea when the user in Apt #1 is going to match his security codes, his unit #A3 will have a different code. This provides for the multiple use of the AC power lines by the A frequency units on a non-simultaneous basis. Base unit # B (102) and corresponding extension unit # B (112) use a different set of multiple access transmission frequencies, which provides for true simultaneous use of the AC line medium for line # 2 (110). Line #2 could be used for a modem, fax, pay-per-view television service or other telephone apparatus.

Figure 12:
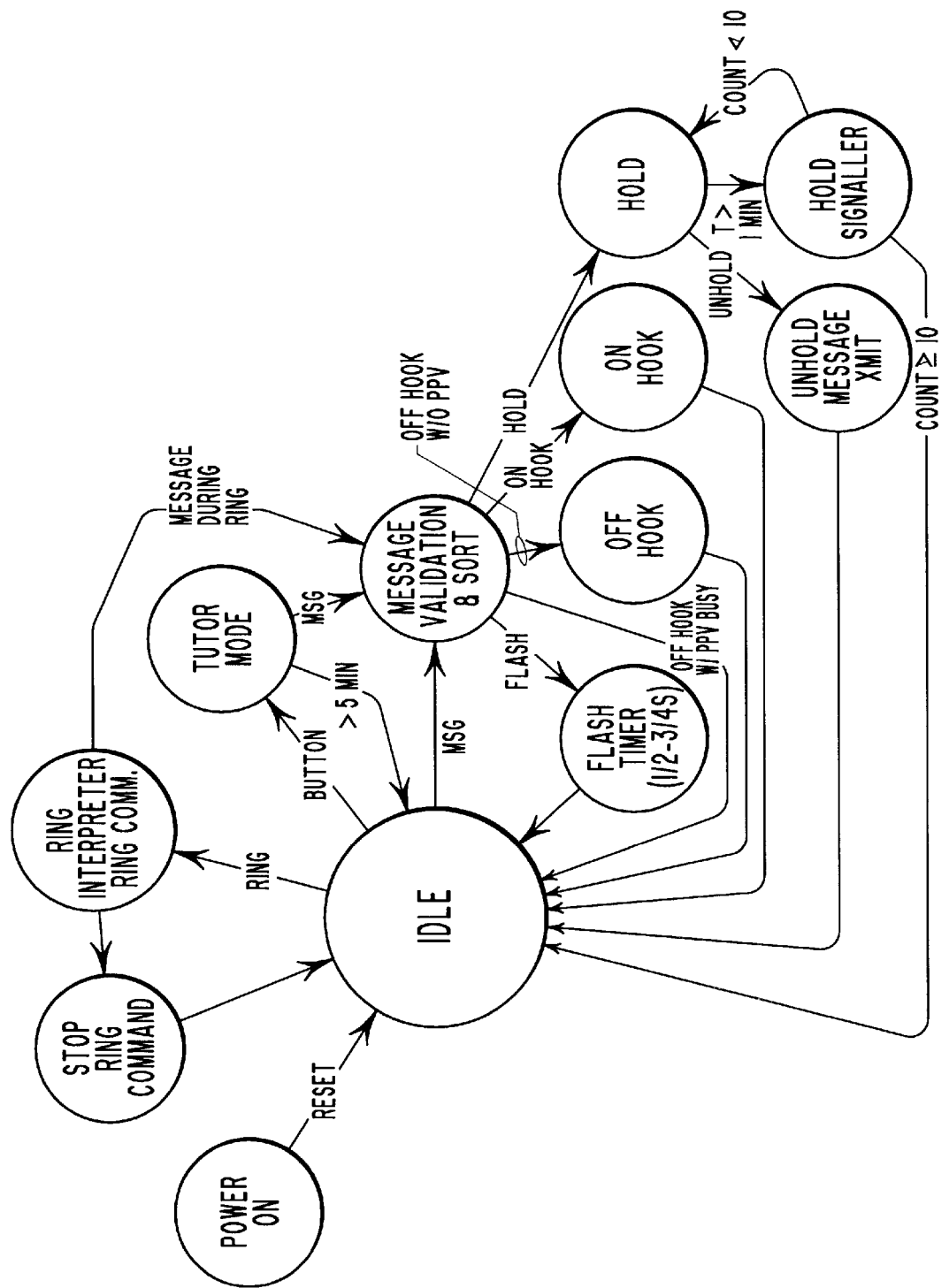
FIG. 12 a is a state diagram for a base unit system controller.
Figure 13:
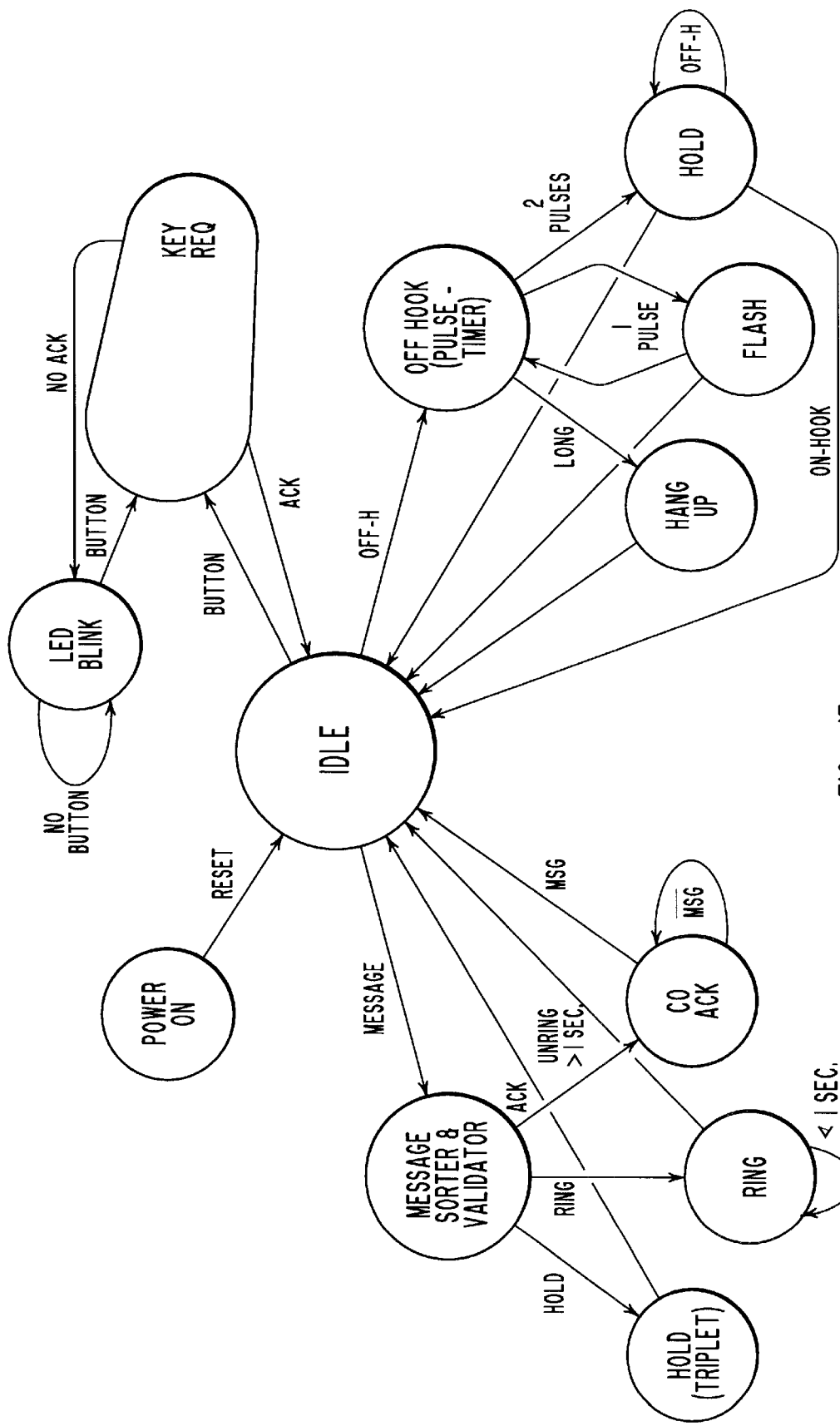
FIG. 13 is a state diagram for an extension unit system controller.

FIG. 12 and FIG. 13 provide a logic state diagram for the system control protocols disclosed above in connection with FIGS. 10 and 11, except for the power on procedure. If during a "power on" reset procedure a unit checks non-volatile memory for a valid security code and does not find one, then it provides a default security code; otherwise it uses the code retained in memory. Since no on/off switch is provided for the units, when the AC line power is on so are the units. In the event of a power failure or unplugging of a unit, the currently used security code is saved in non-volatile memory, so that when power is restored the security code is maintained. Any number of commercial low cost microcontrollers can be employed for this application, such as the Motorola 6805 series or the Zilog Z8 series. A listing of working commercial code for this application as used in one embodiment of the invention is provided in Appendix A and is incorporated herein by reference. Other code may be used as well and still fall within the scope of the invention.

Figure 14:
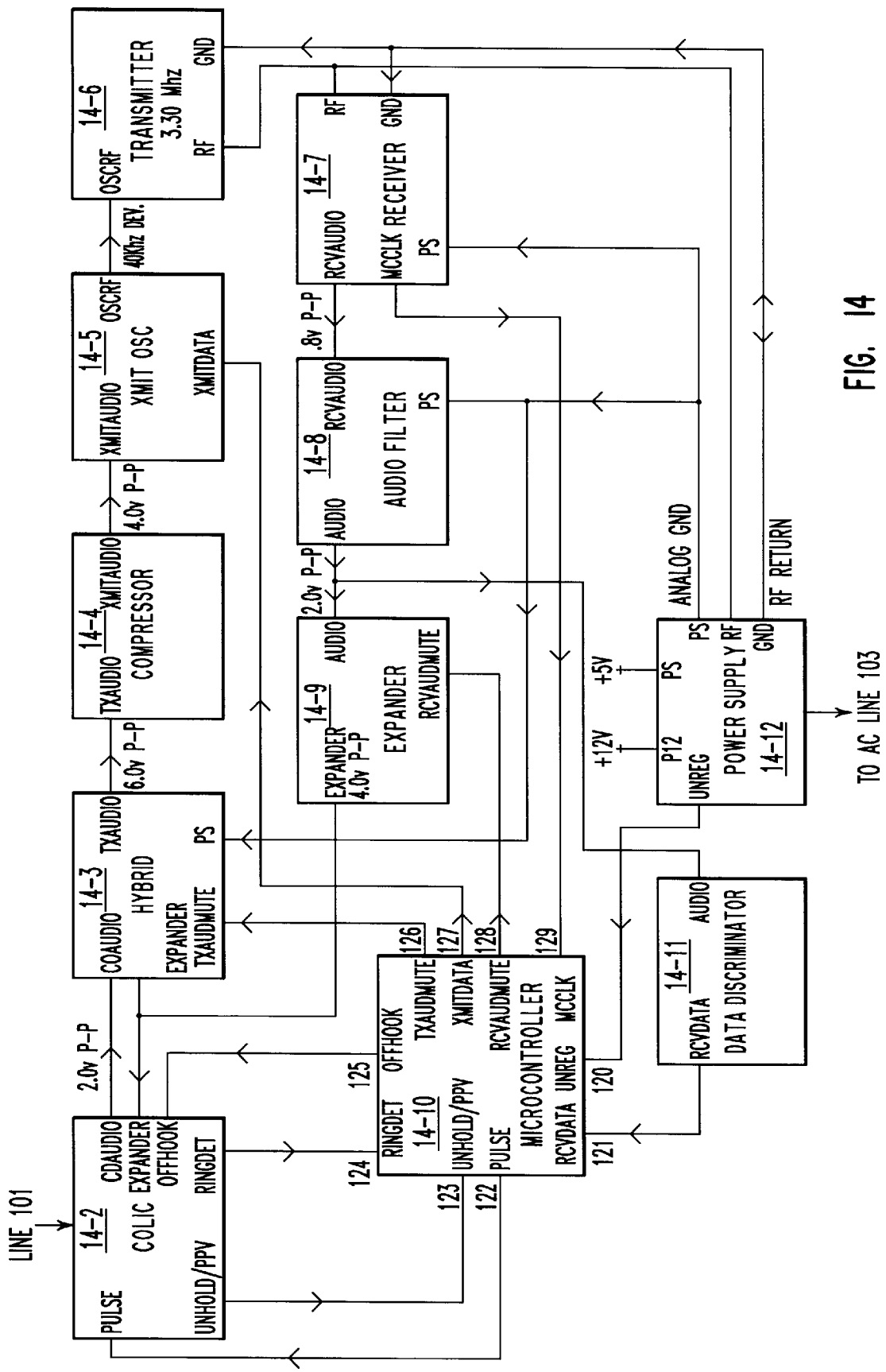
FIG. 14 is an electrical block diagram of a base unit of a secure access line carrier telephone extension system, which interfaces a subscriber line with the AC power distribution system of a building.

FIG. 14 is page 1 of a hierarchical schematic diagram of a secure access base unit 102 from the systems of FIG. 10 and 11. Each of the blocks 14-2 through 14-11 are illustrated as complete electrical schematics in FIGS. 17 through 26, according to hierarchical schematic procedures. Other electrical schematics embodying the inventors' invention may be employed as well and are intended be comprehended within the scope of the invention. Phone line 101 is connected to colic 14-2, and AC power line 103 interfaces with power supply 14-12. Particular attention is directed to the microcontroller 14-10 with its attendant I/O lines 120 through 129. The "unreg" 120 input provides the power on/off reset of FIG. 12 and 13. On power up care is taken to start the controller after the power supplies and clock 129 are stable, and upon power down, to stop the controller before the clock and power supplies become unstable. Data from the extension(s) 104 is received and discriminated through blocks 14-12, 14-7, 14-8, and 14-11 and enters the microcontroller 14-10 via line 121 where the data is validated and sorted into system control instructions. Other hardware inputs include phone line 101 ring signal detection 124 and off hook status detection 123 with respect to hard wired phones on line 101. The microcontroller 14-10 logic acts upon these inputs to provide the appropriate system control responses. Ring signals at 124 produce ring messages at data output 127 which are transmitted via 14-5, 14-6, 14-12 and 103 to the extension unit(s). When an extension unit makes a central office request through 121, the base controller 14-10 takes line 101 off hook via control port 125, sends an acknowledgment message back to the extension unit, unmutes the transmit and receive audio via control ports 126 and 128, and the extension unit can either talk with a caller or, upon hearing a central office dial tone, send DTMF signals or pulse dial messages to dial a phone number. Pulse dial messages are processed through control port 122 for optimum compatibility with the central office. The flow of other audio and RF signals as indicated in FIG. 14 will be apparent to a person of ordinary skill in the art.

Figure 15:
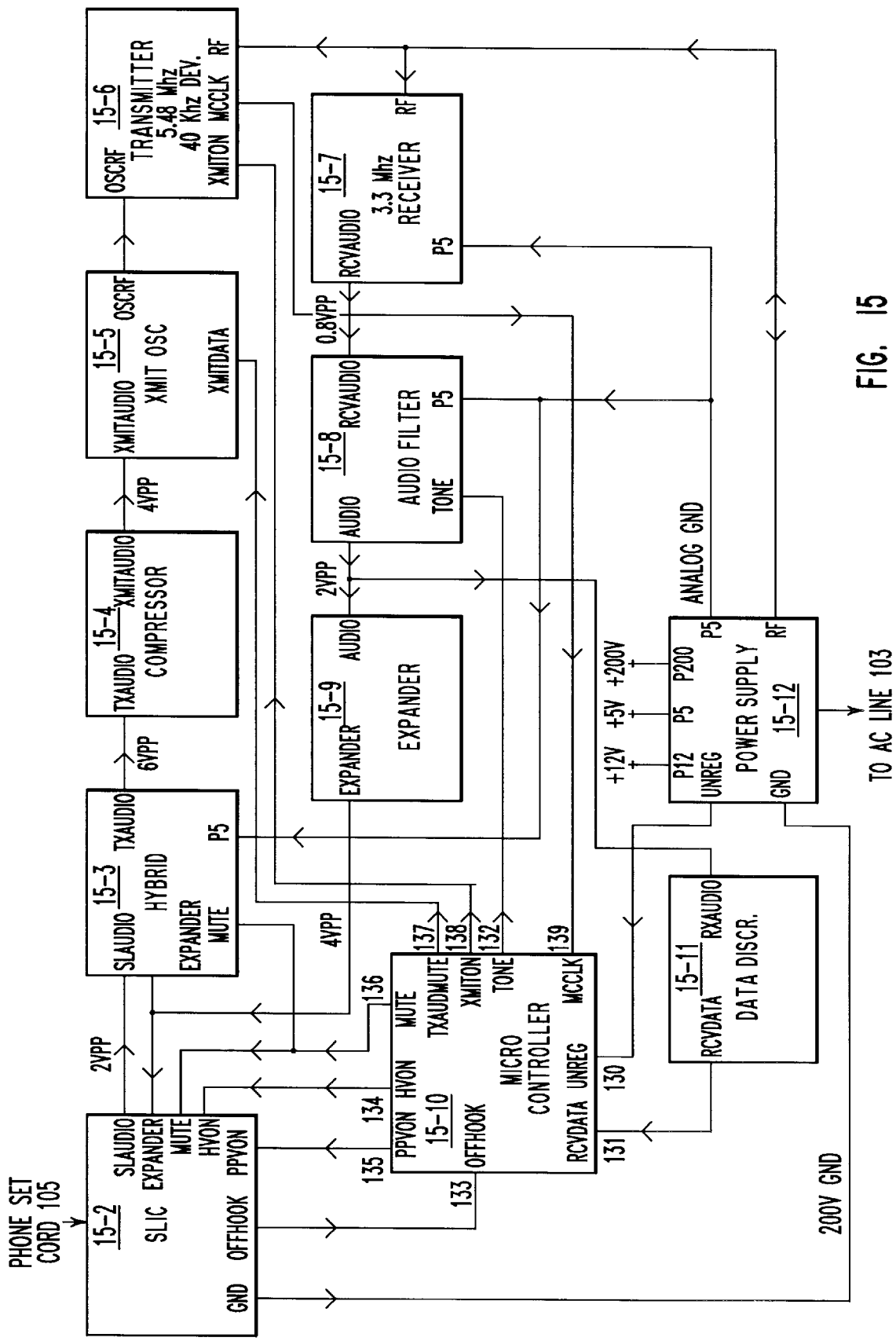
FIG. 15 is an electrical block diagram of an extension unit of a secure access line carrier telephone extension system, which interfaces an extension phone to the power line distribution system of a building.
Figure 16:
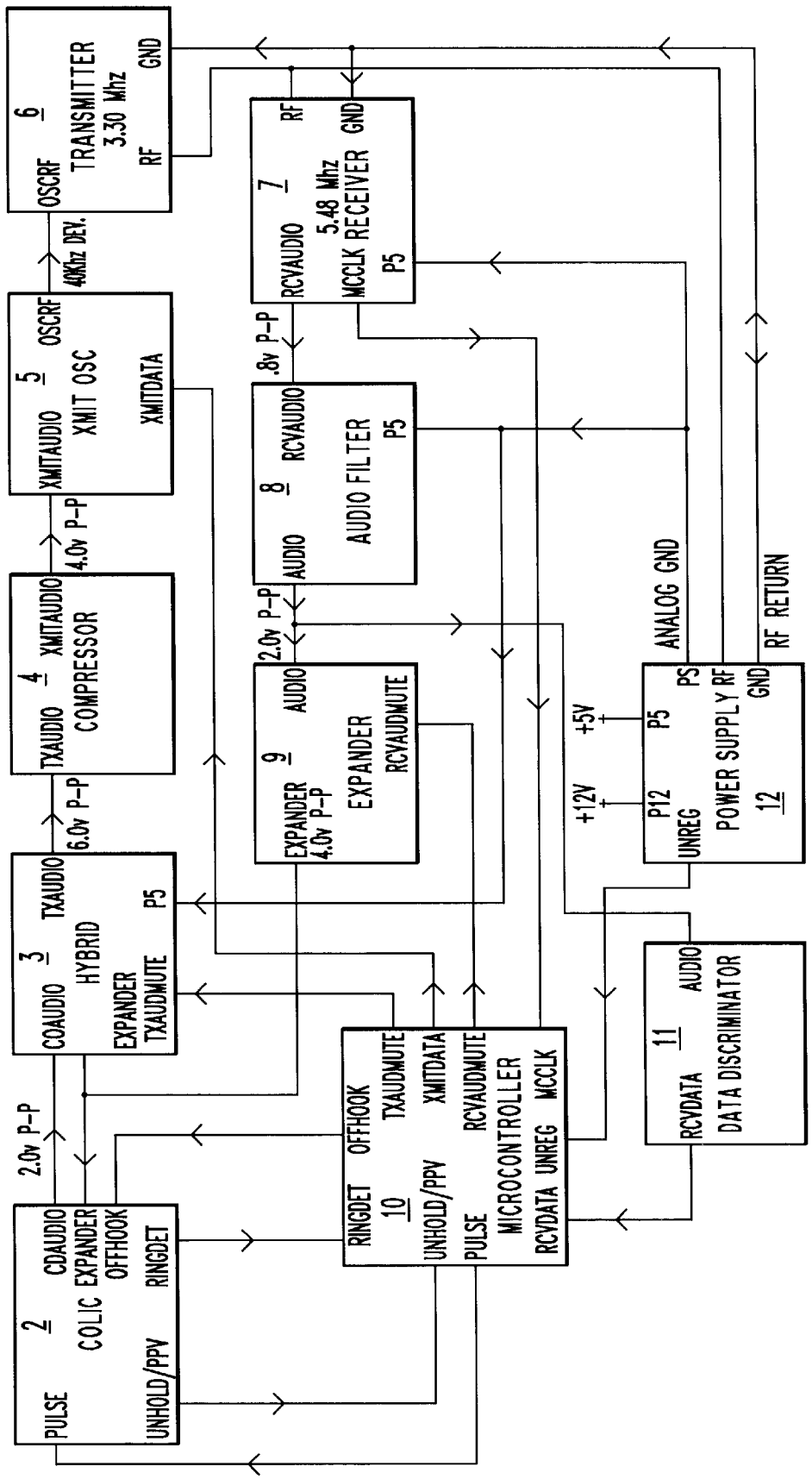
FIG. 16 depicts a base unit.
Figure 17:
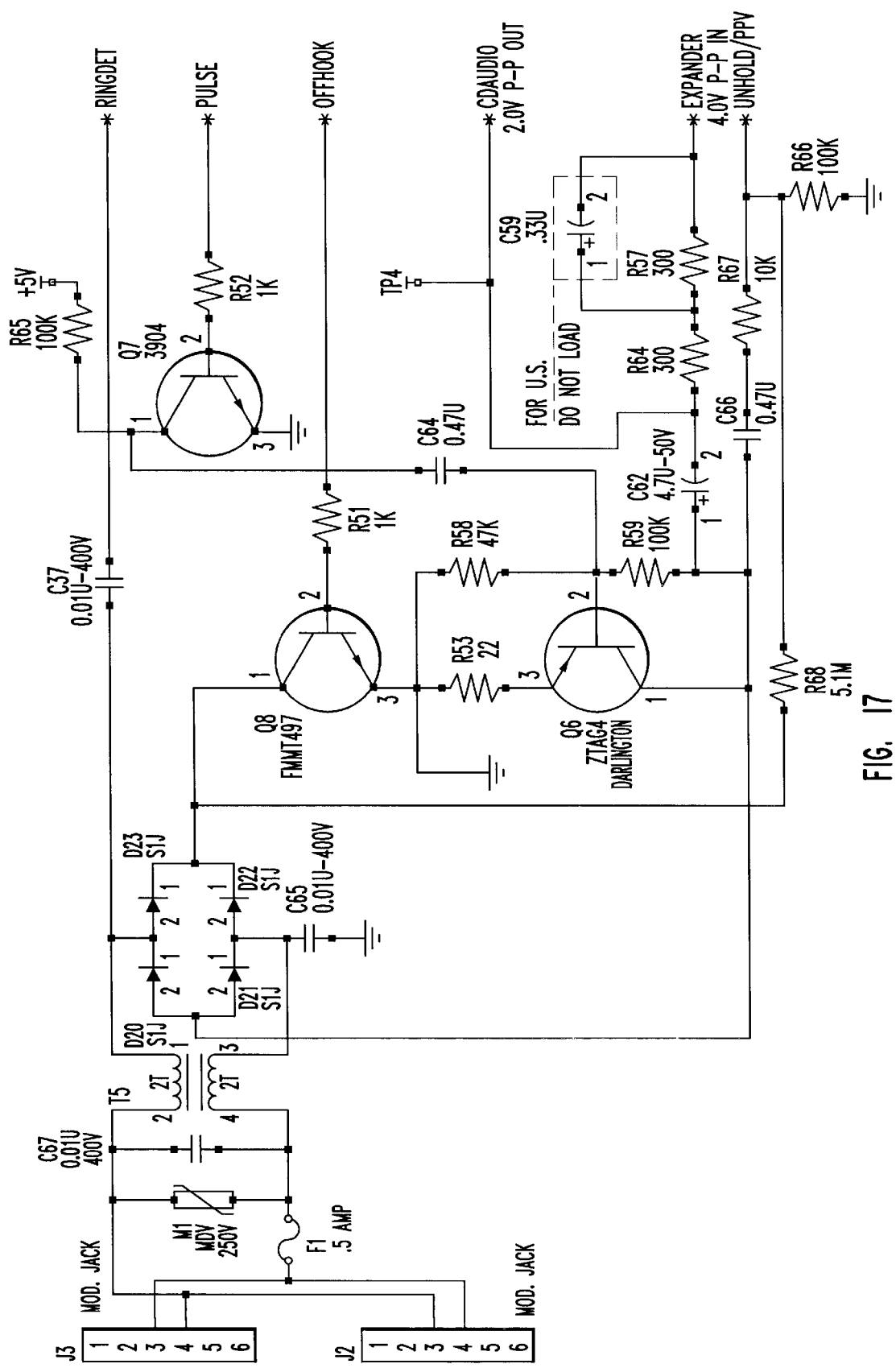
FIG. 17 depicts a colic circuit.
Figure 18:
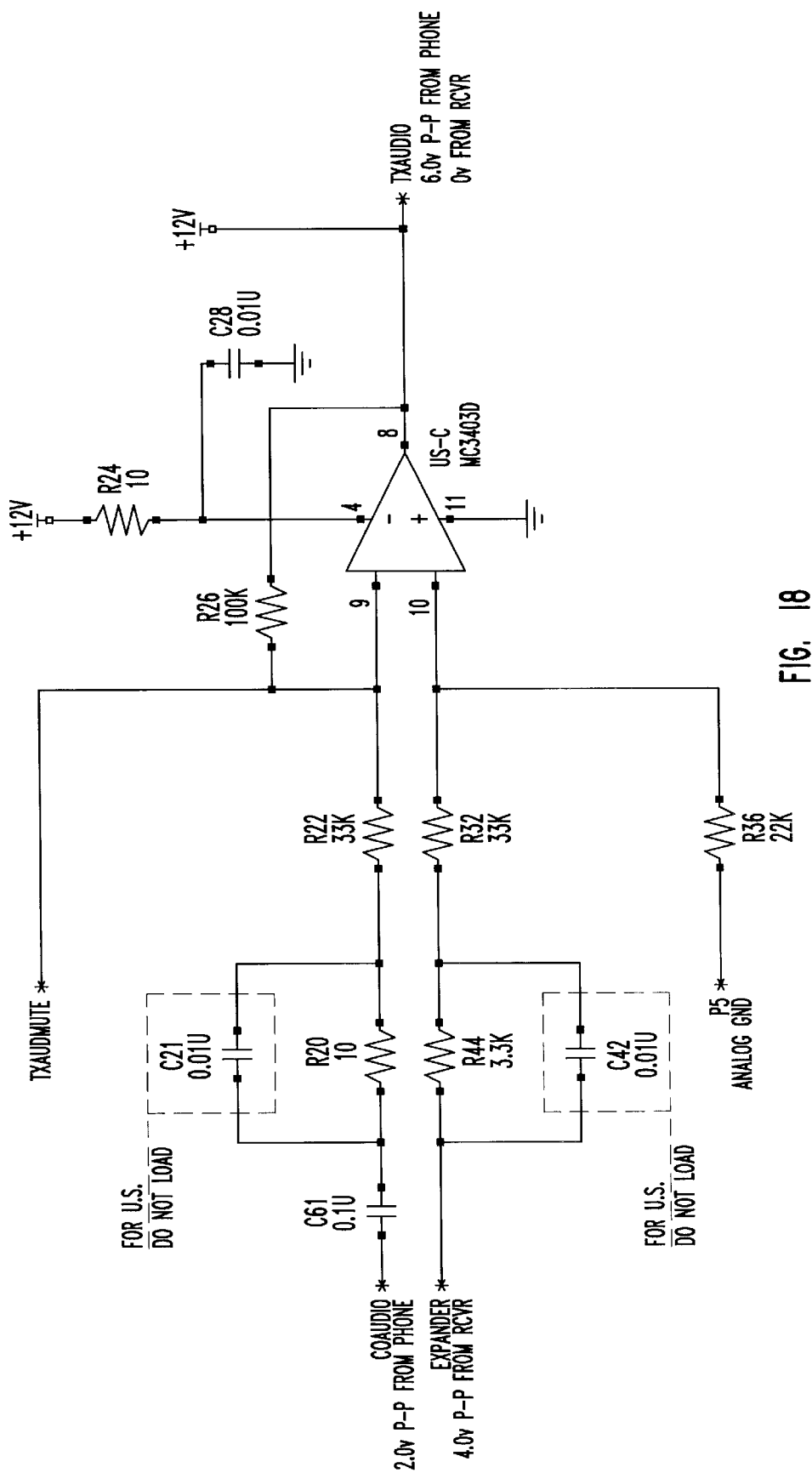
FIG. 18 depicts an hybrid circuit.
Figure 19:
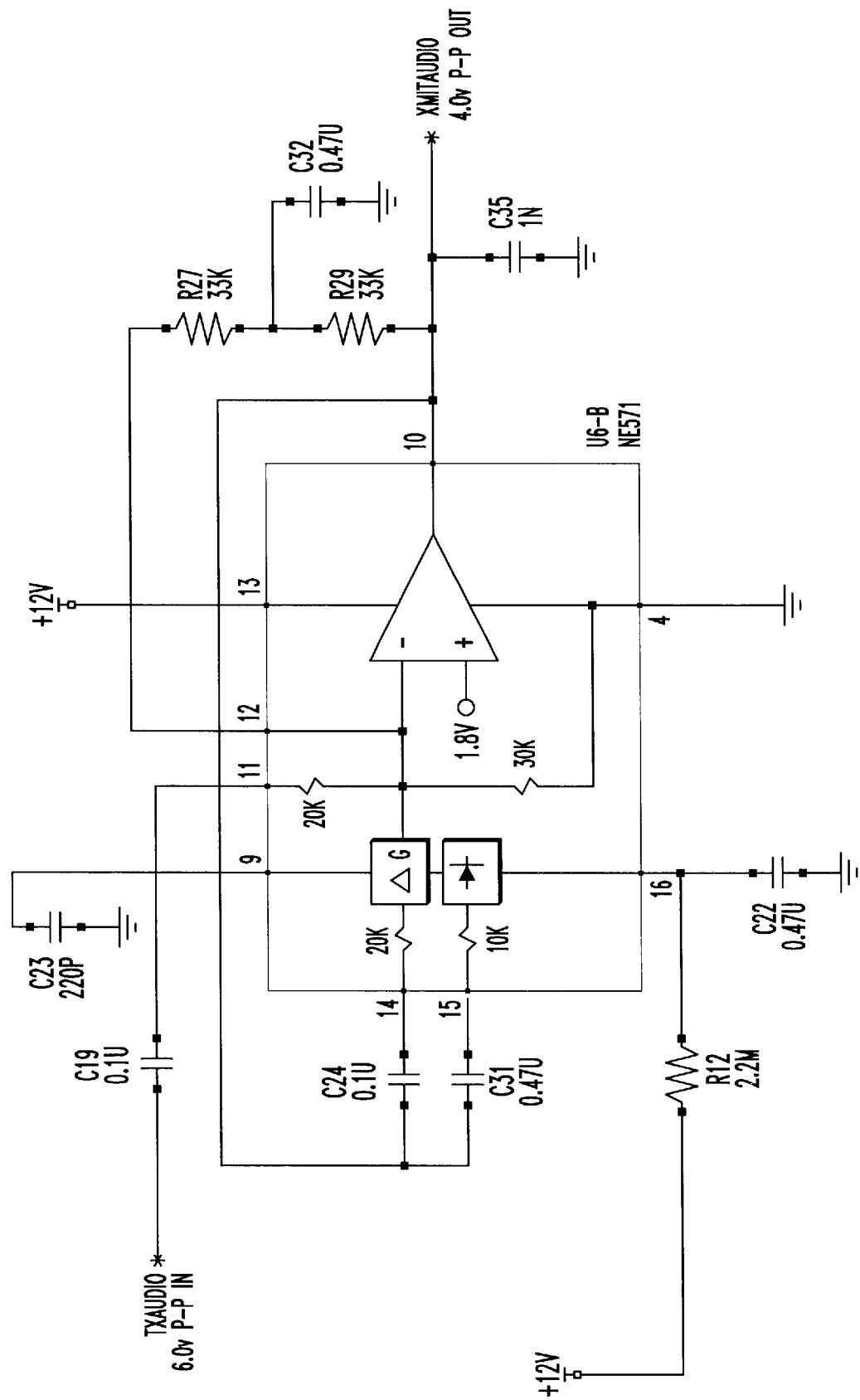
FIG. 19 depicts a compressor circuit.
Figure 20:
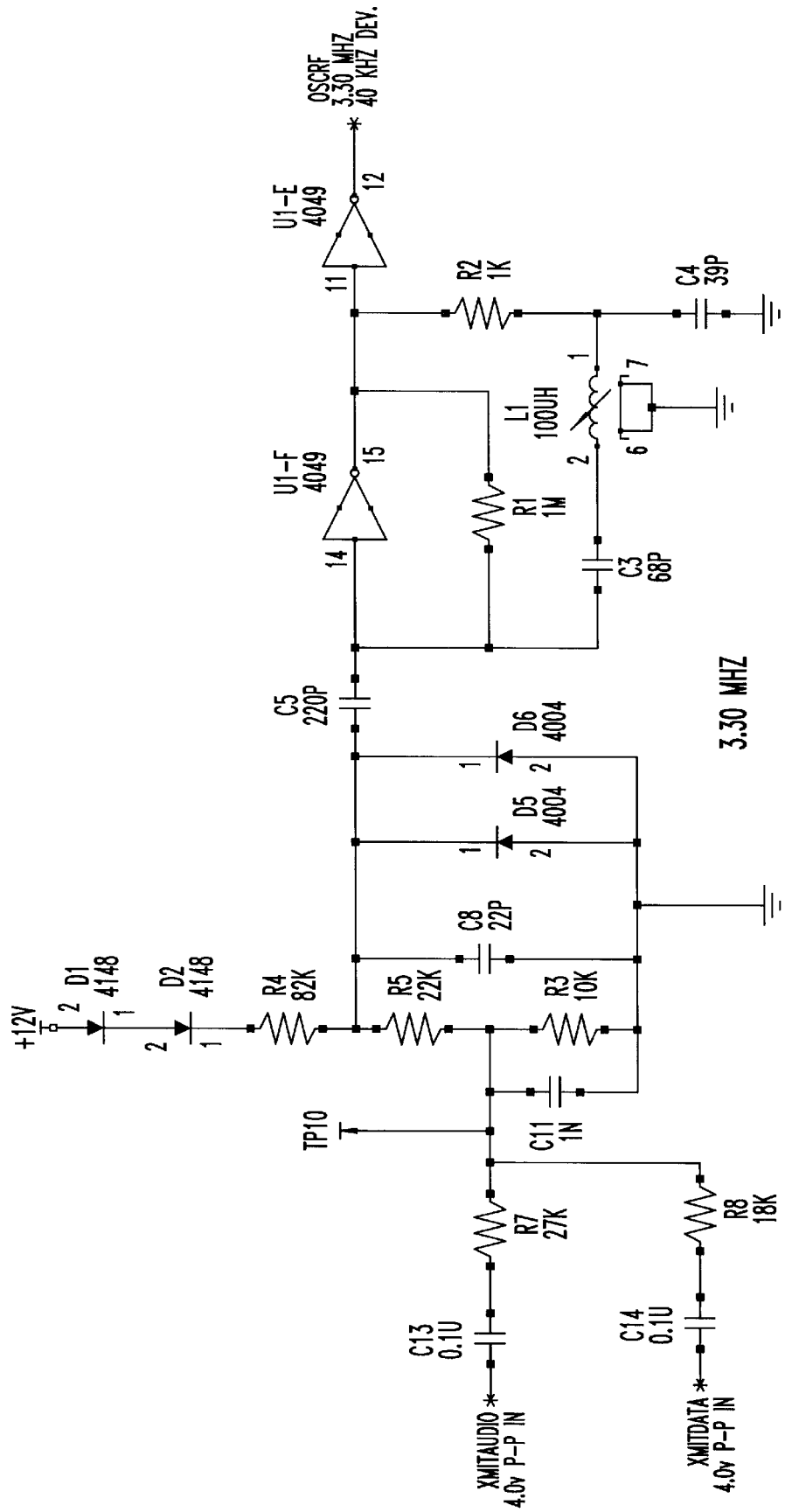
FIG. 20 depicts a transmit oscillation circuit.
Figure 21:
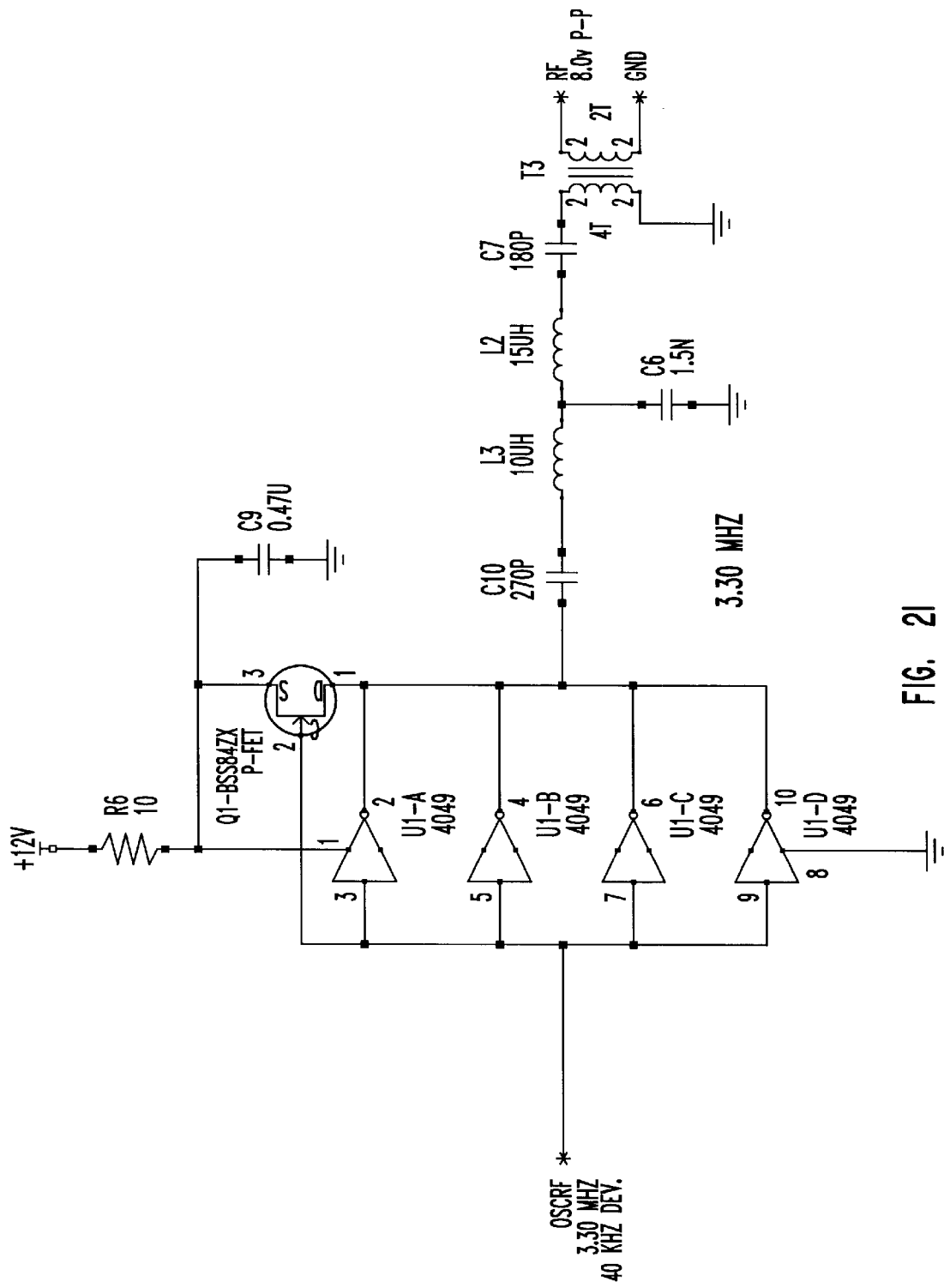
FIG. 21 depicts a transmitter circuit.
Figure 22:
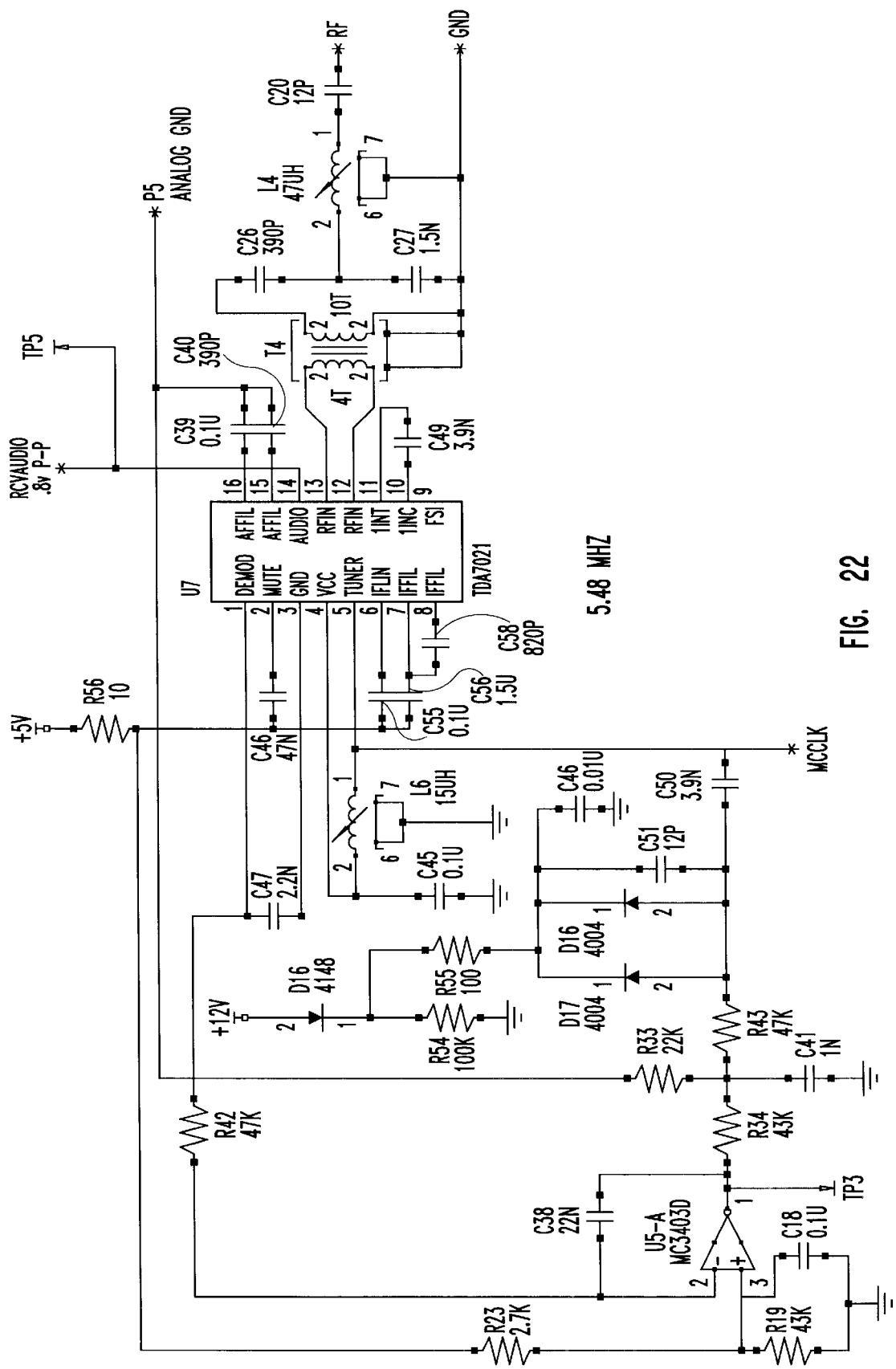
FIG. 22 depicts a receiver circuit.
Figure 23:
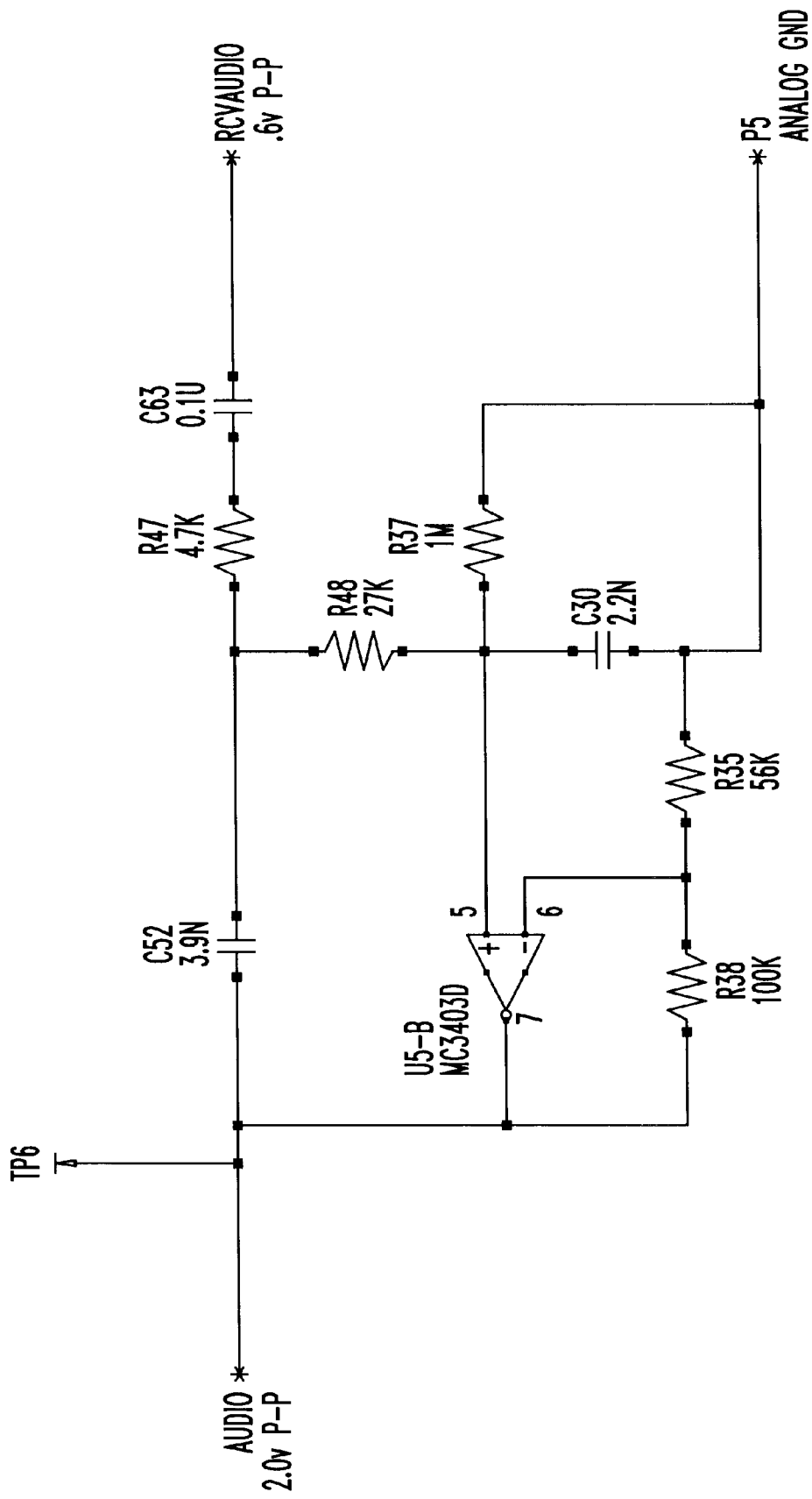
FIG. 23 depicts an audio filter circuit.
Figure 24:
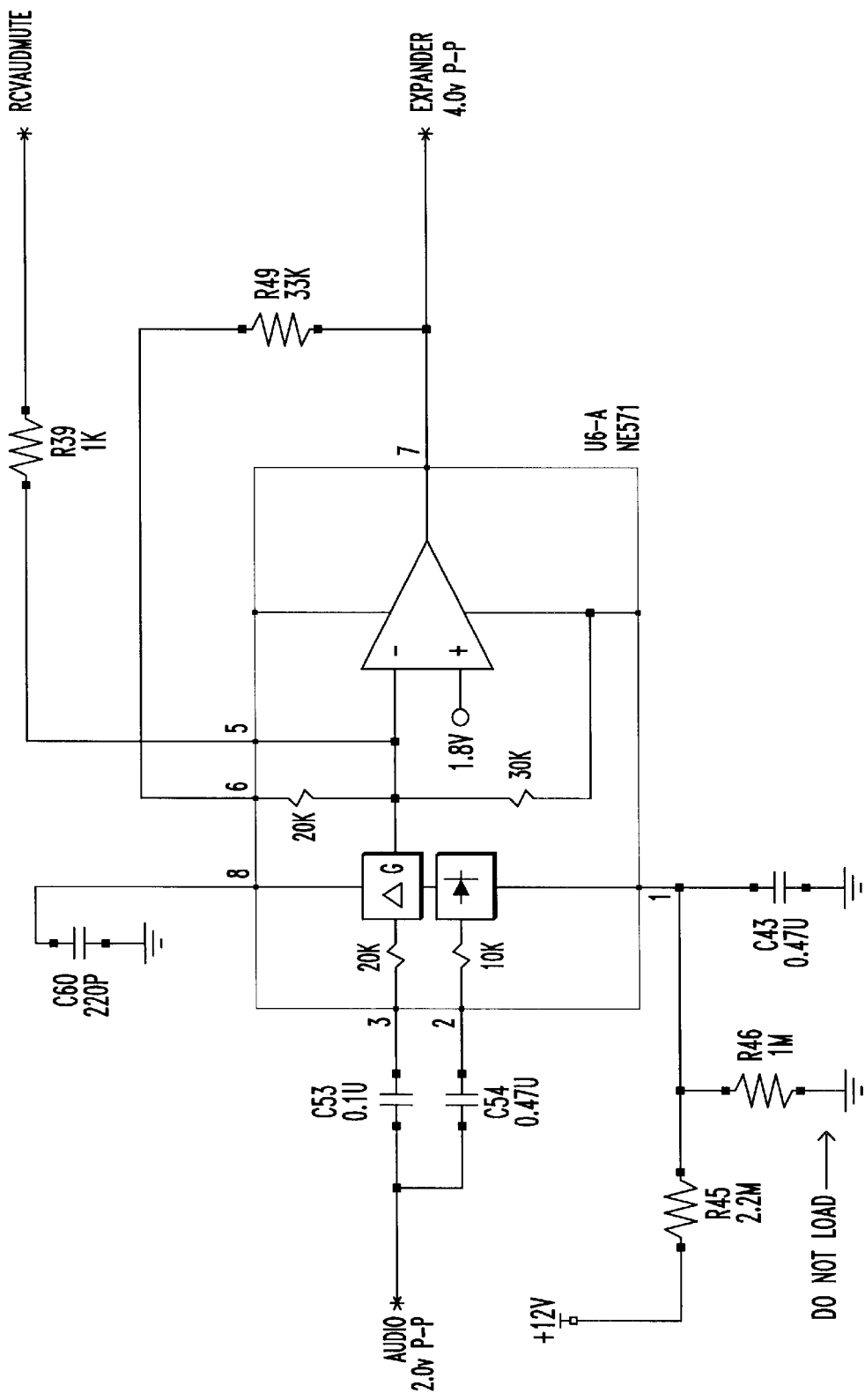
FIG. 24 depicts an expander circuit.
Figure 25:
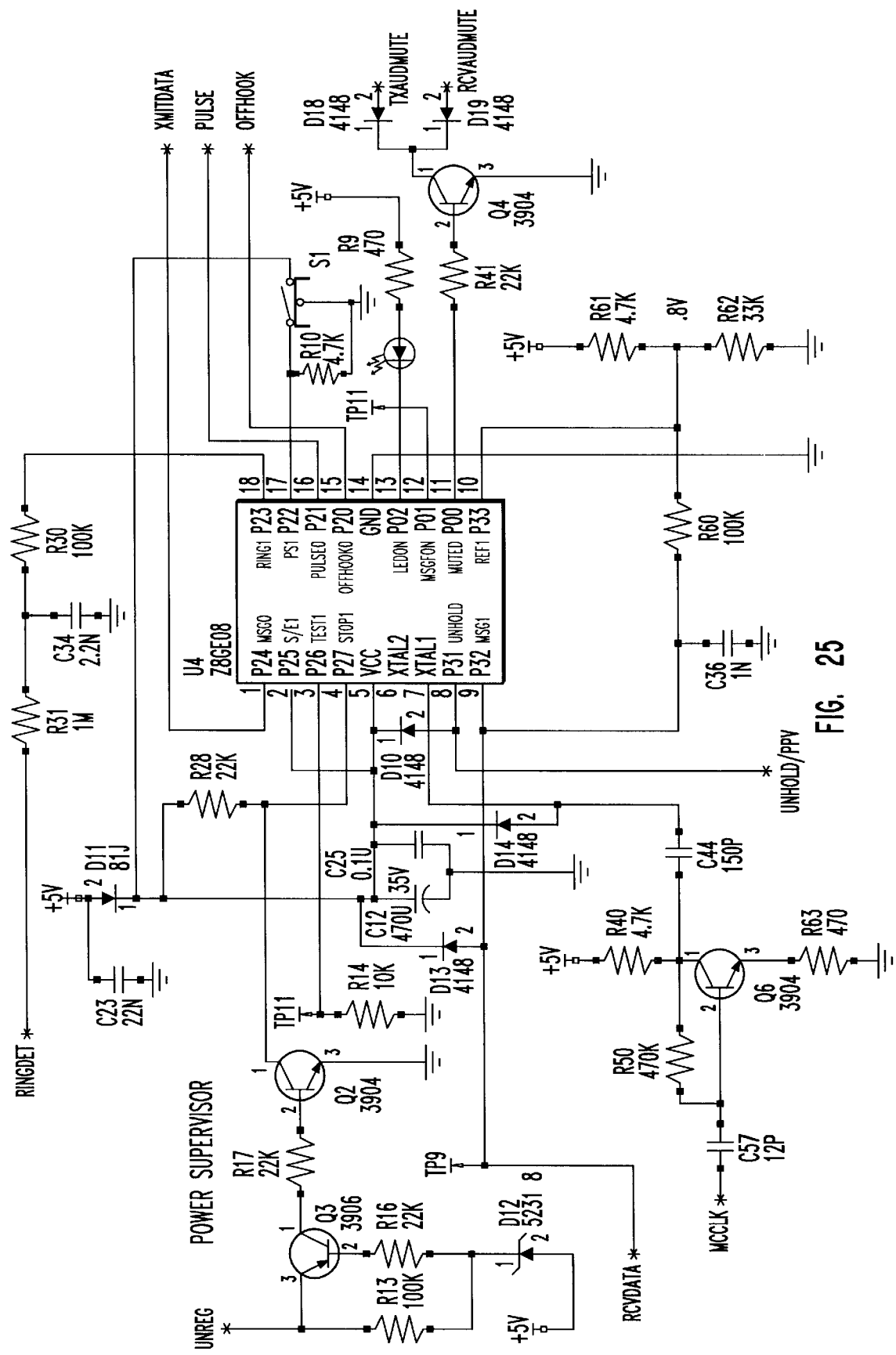
FIG. 25 depicts a micro controller.
Figure 26:
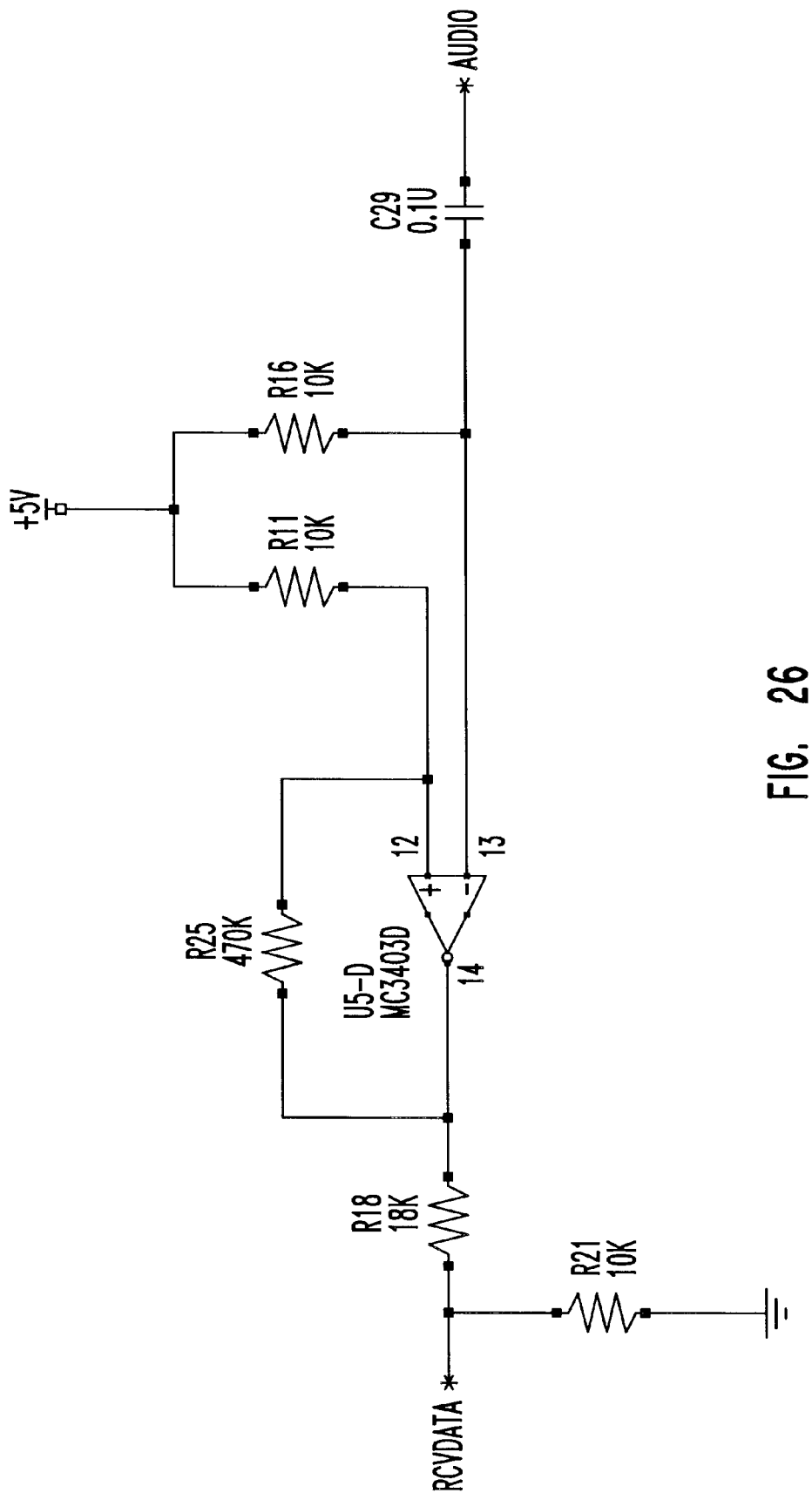
FIG. 26 depicts a data discriminator.
Figure 27:
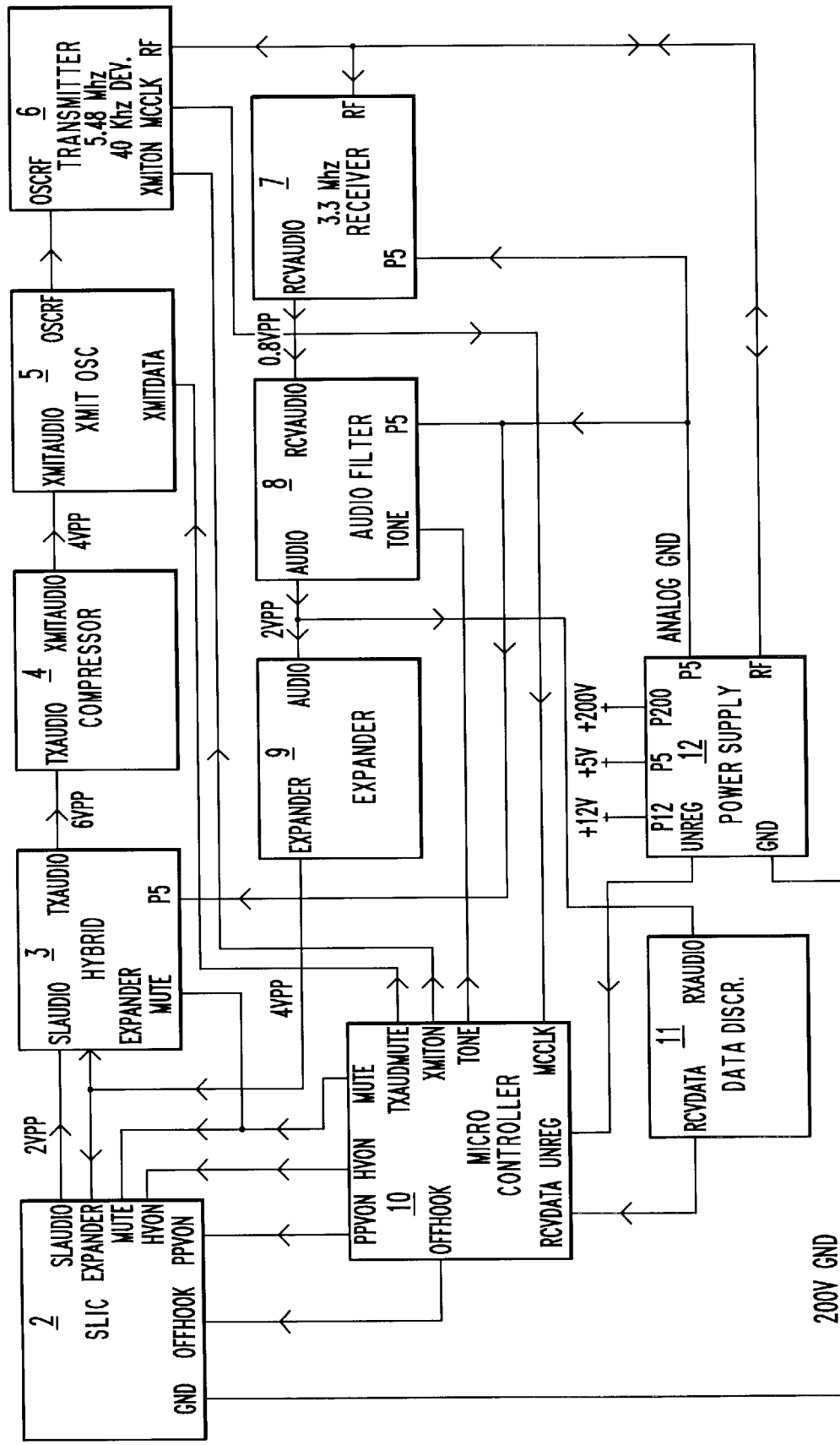
FIG. 27 depicts an extension.
Figure 28:
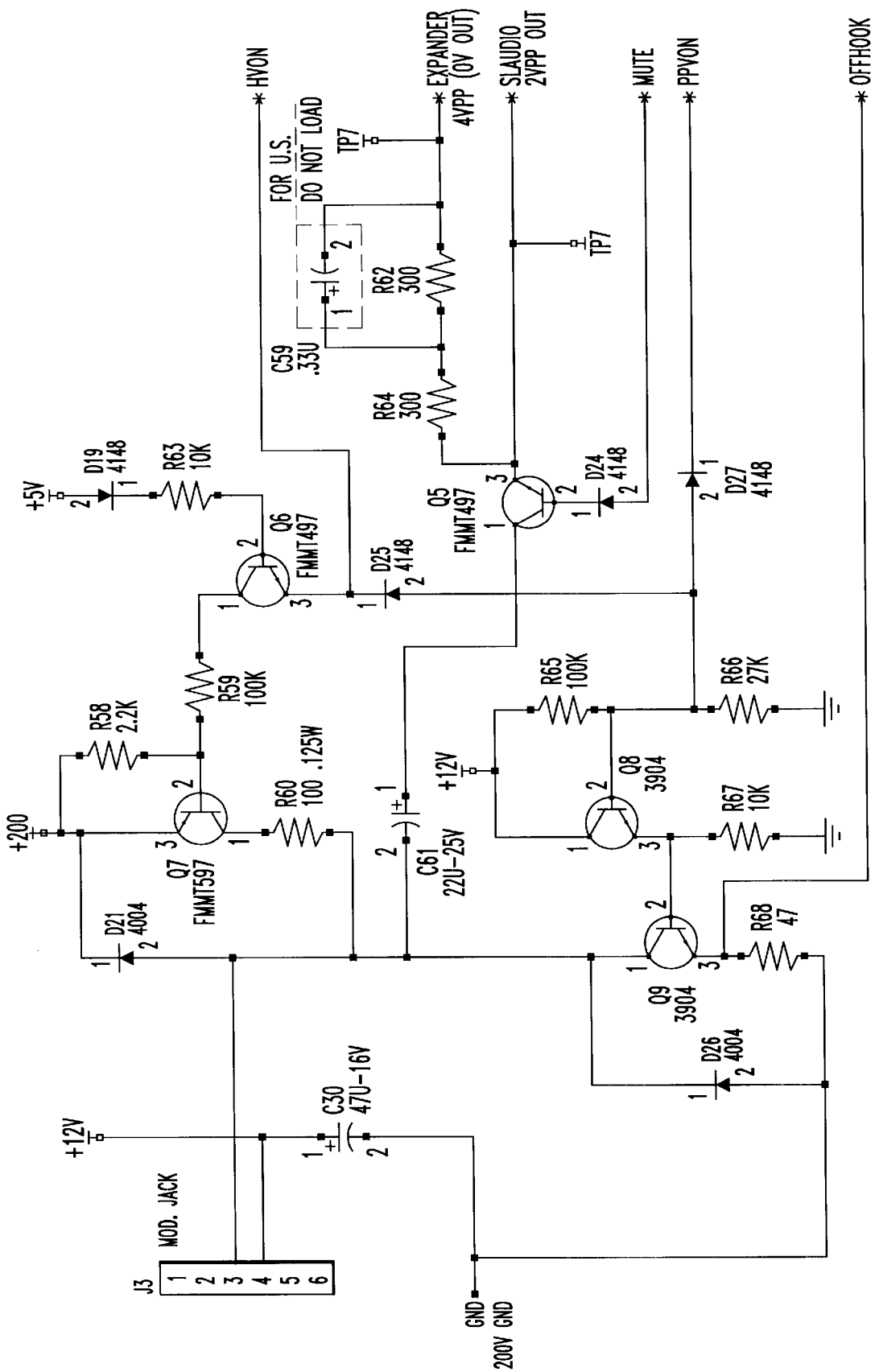
FIG. 28 depicts a SLIC.
Figure 29:
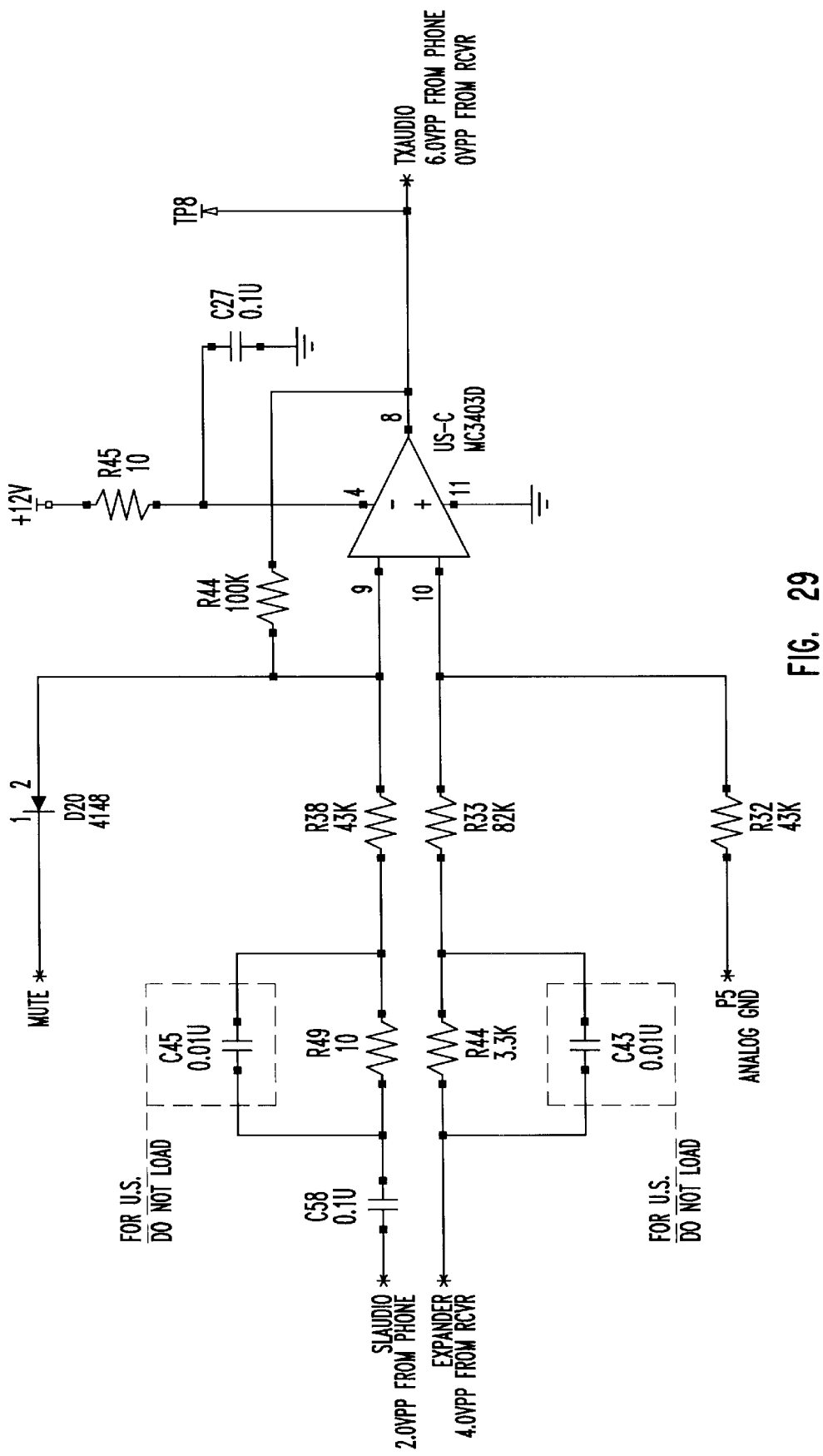
FIG. 29 depicts an hybrid circuit.
Figure 30:
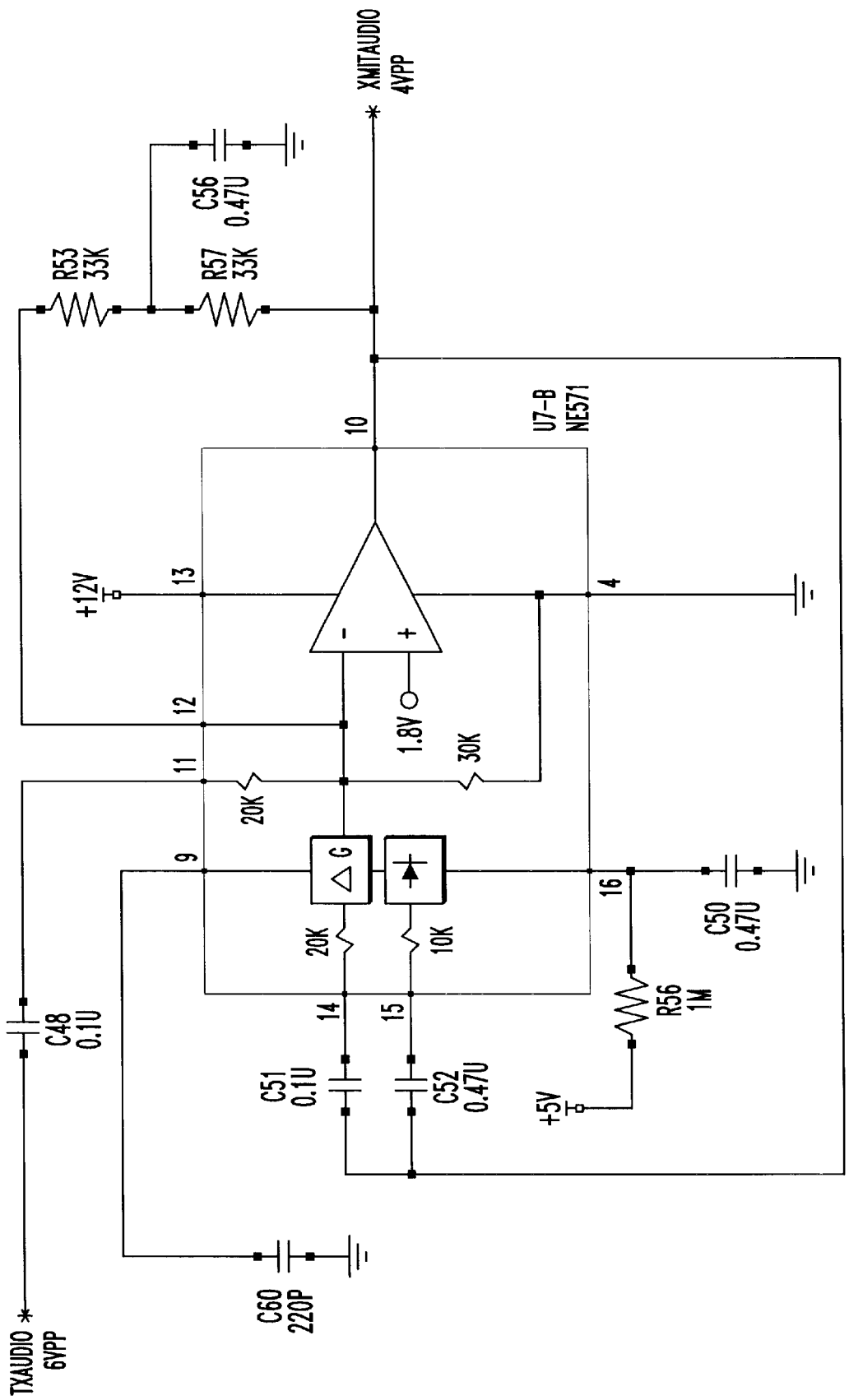
FIG. 30 depicts a compressor.
Figure 31:
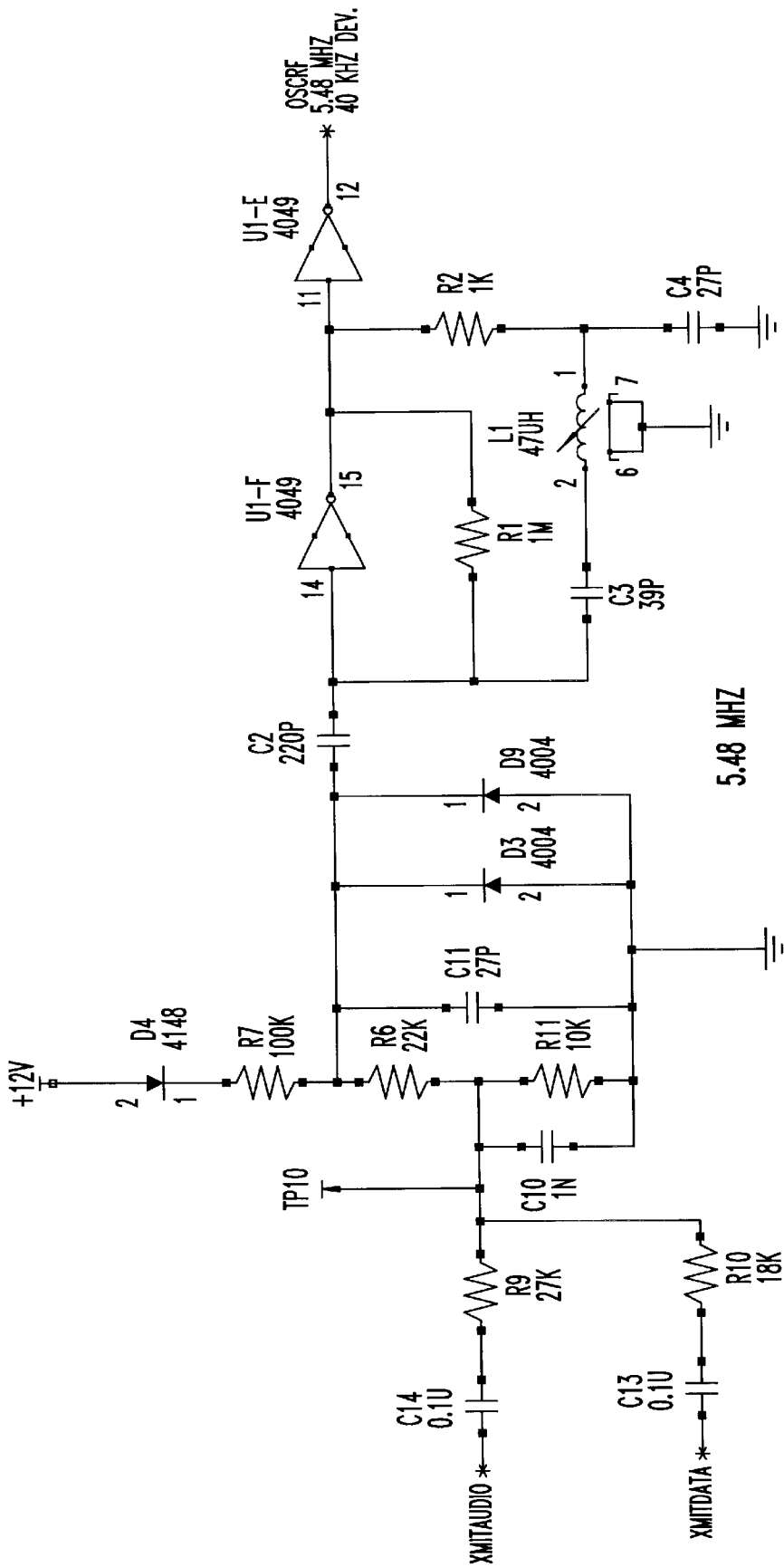
FIG. 31 depicts a transmit oscillator.
Figure 32:
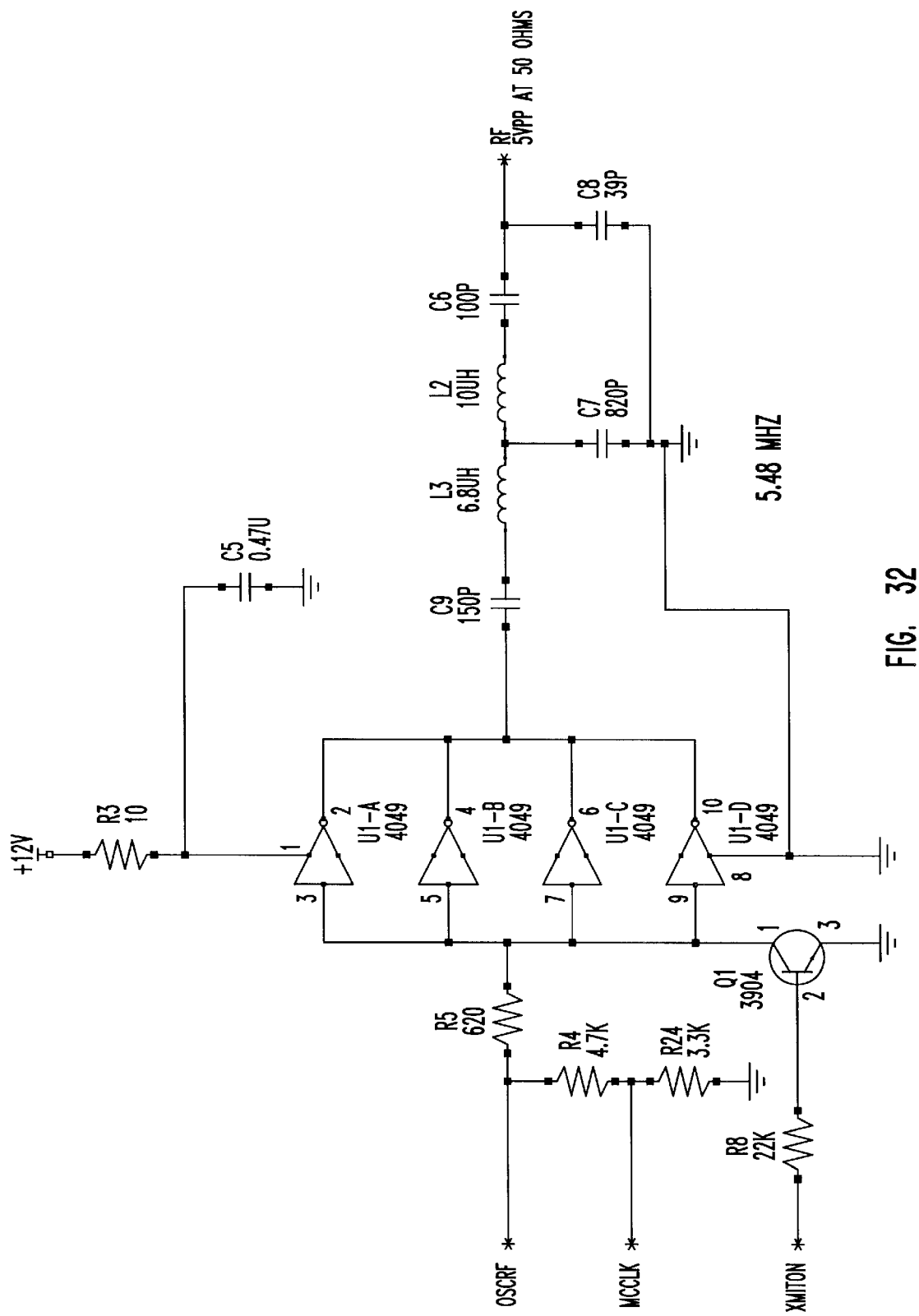
FIG. 32 depicts a transmitter.
Figure 33:
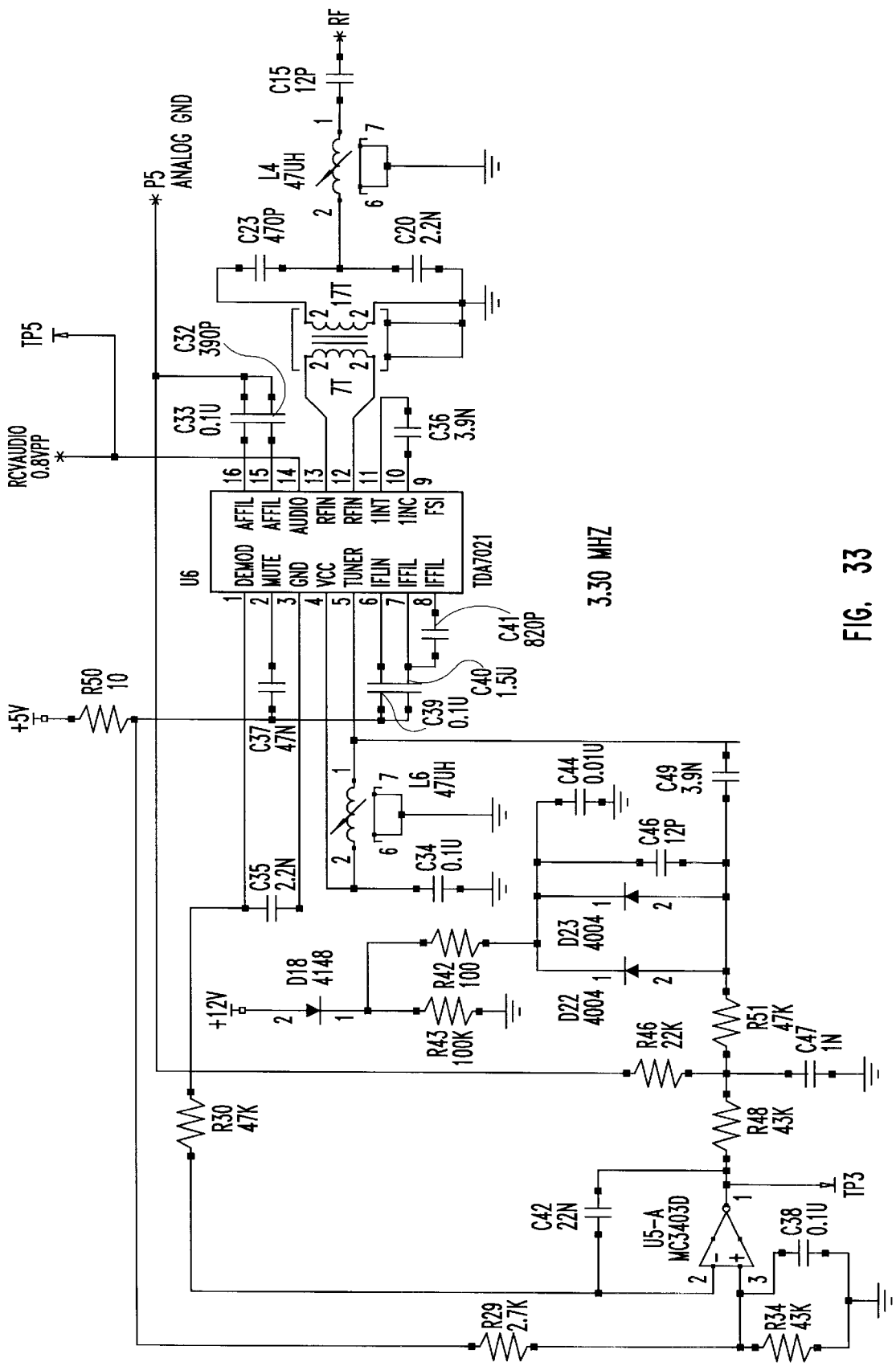
FIG. 33 depicts a receiver.
Figure 34:
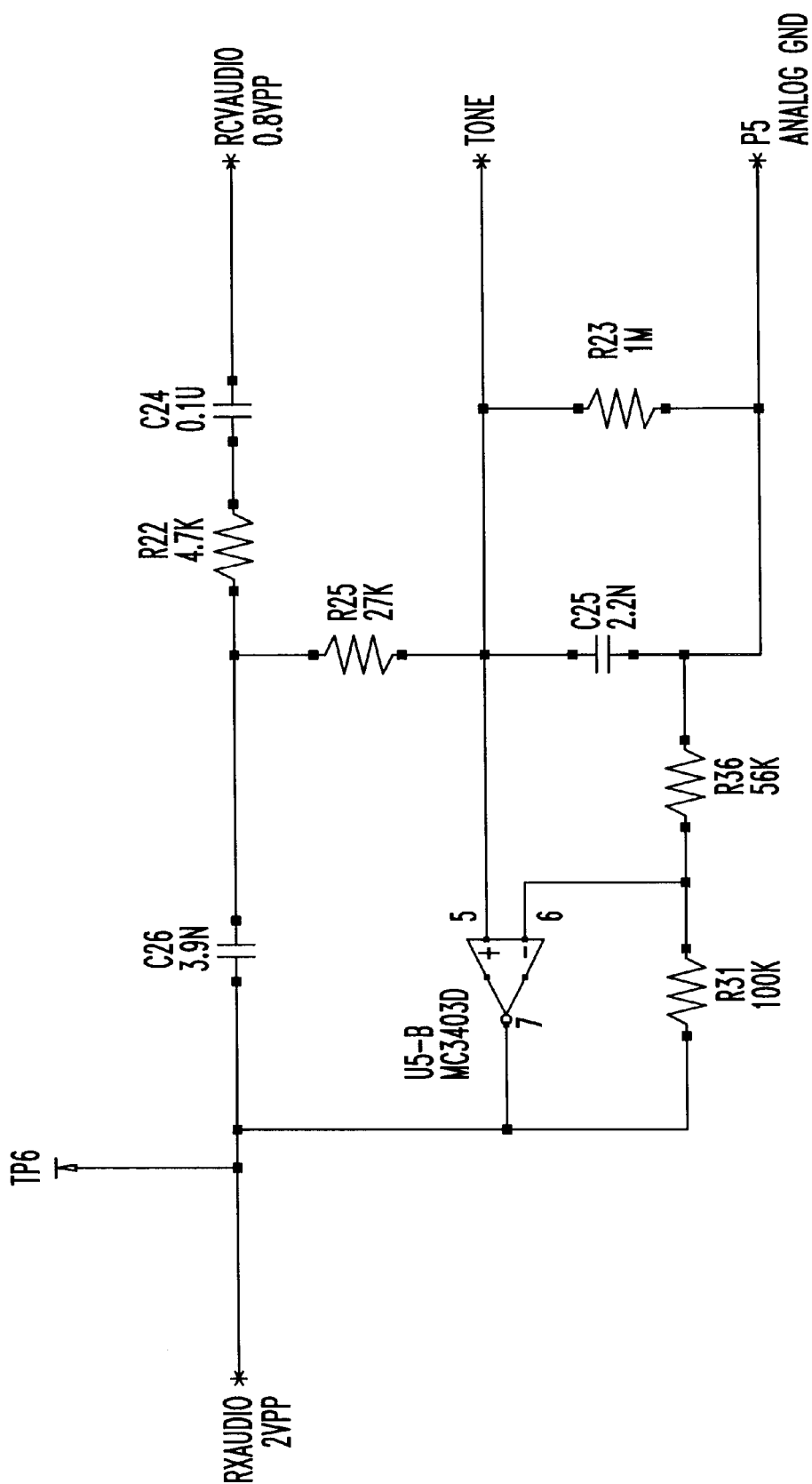
FIG. 34 depicts an audio filter.
Figure 35:
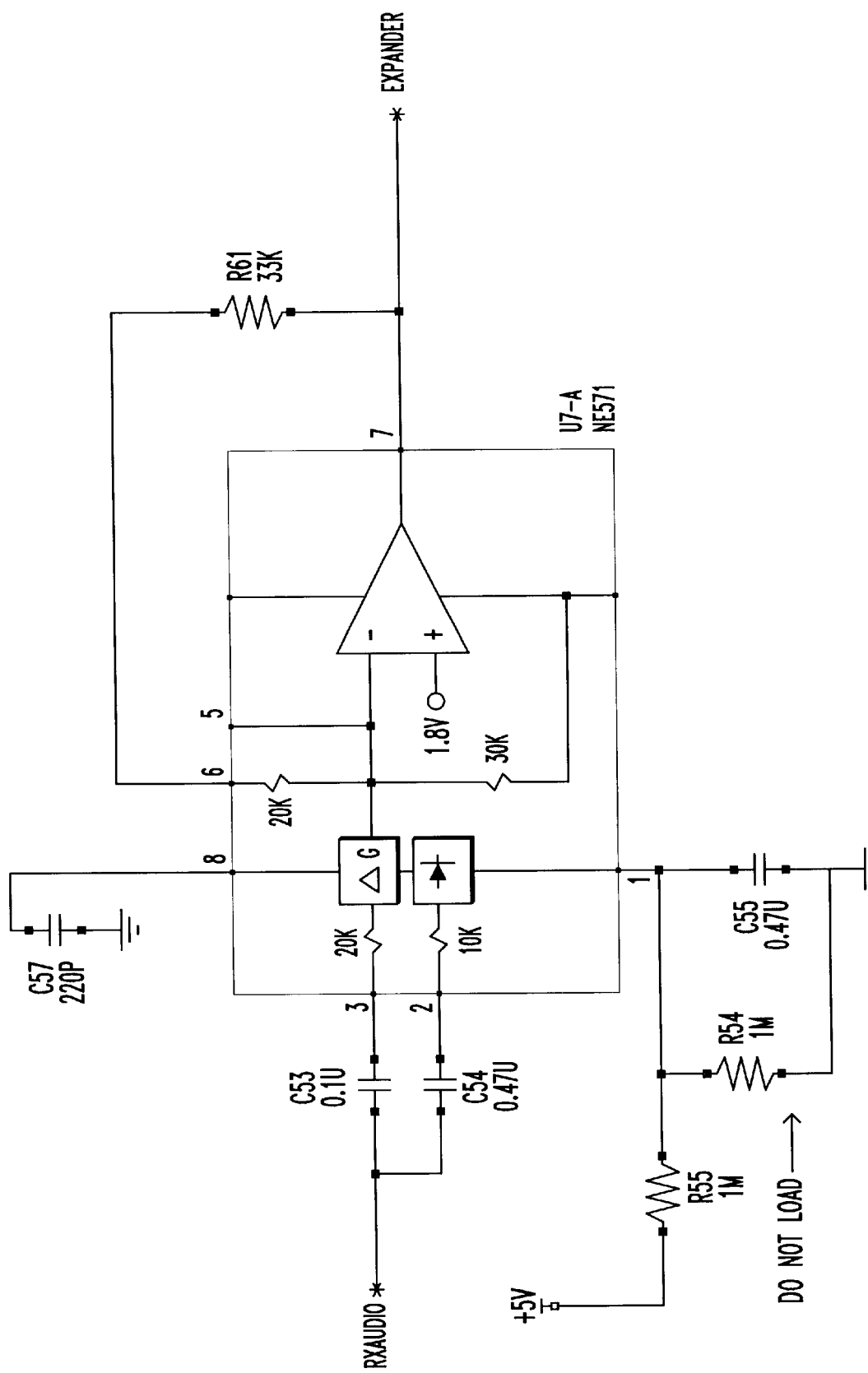
FIG. 35 depicts an expander.
Figure 36:
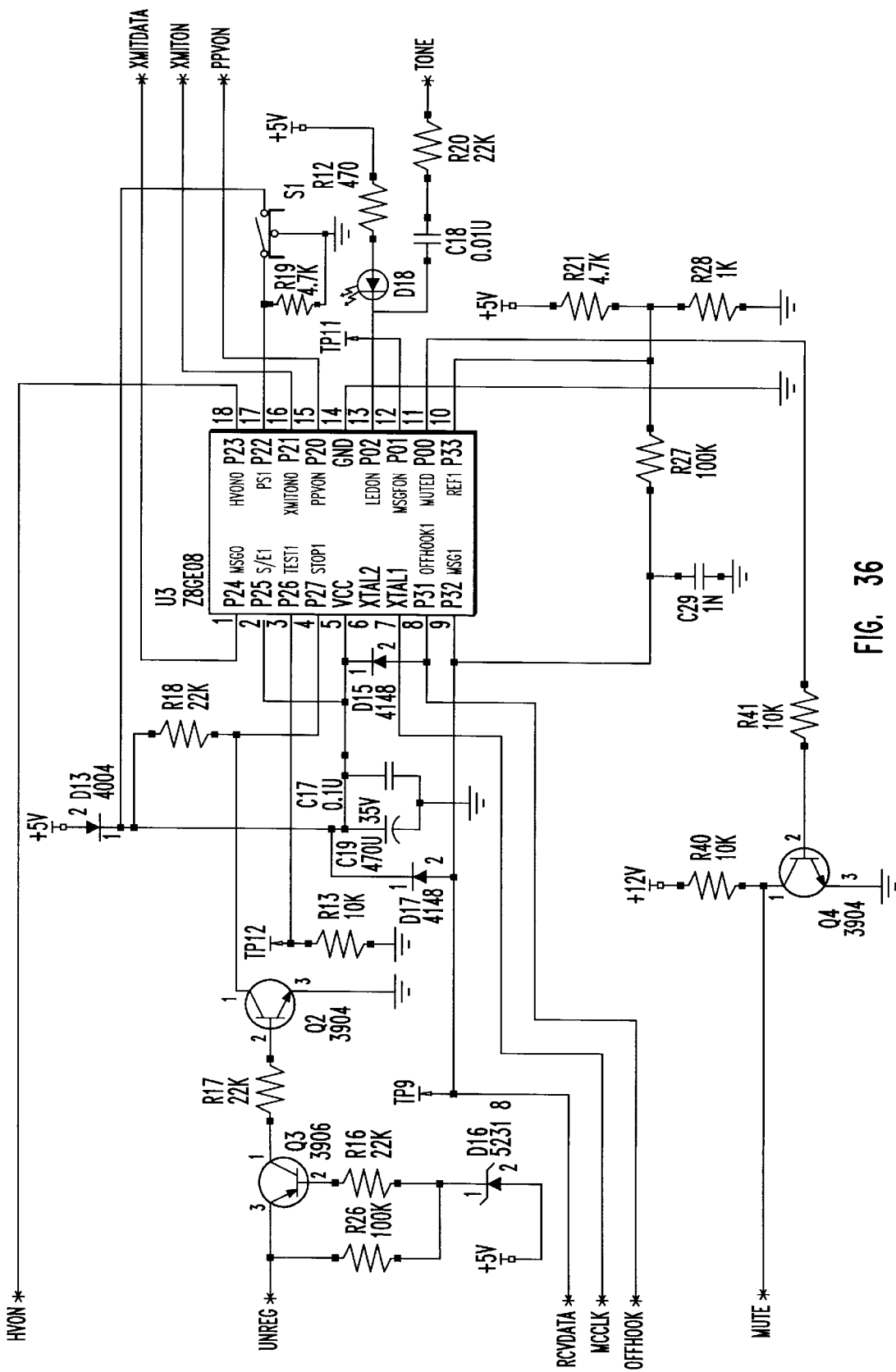
FIG. 36 depicts a micro controller.
Figure 37:
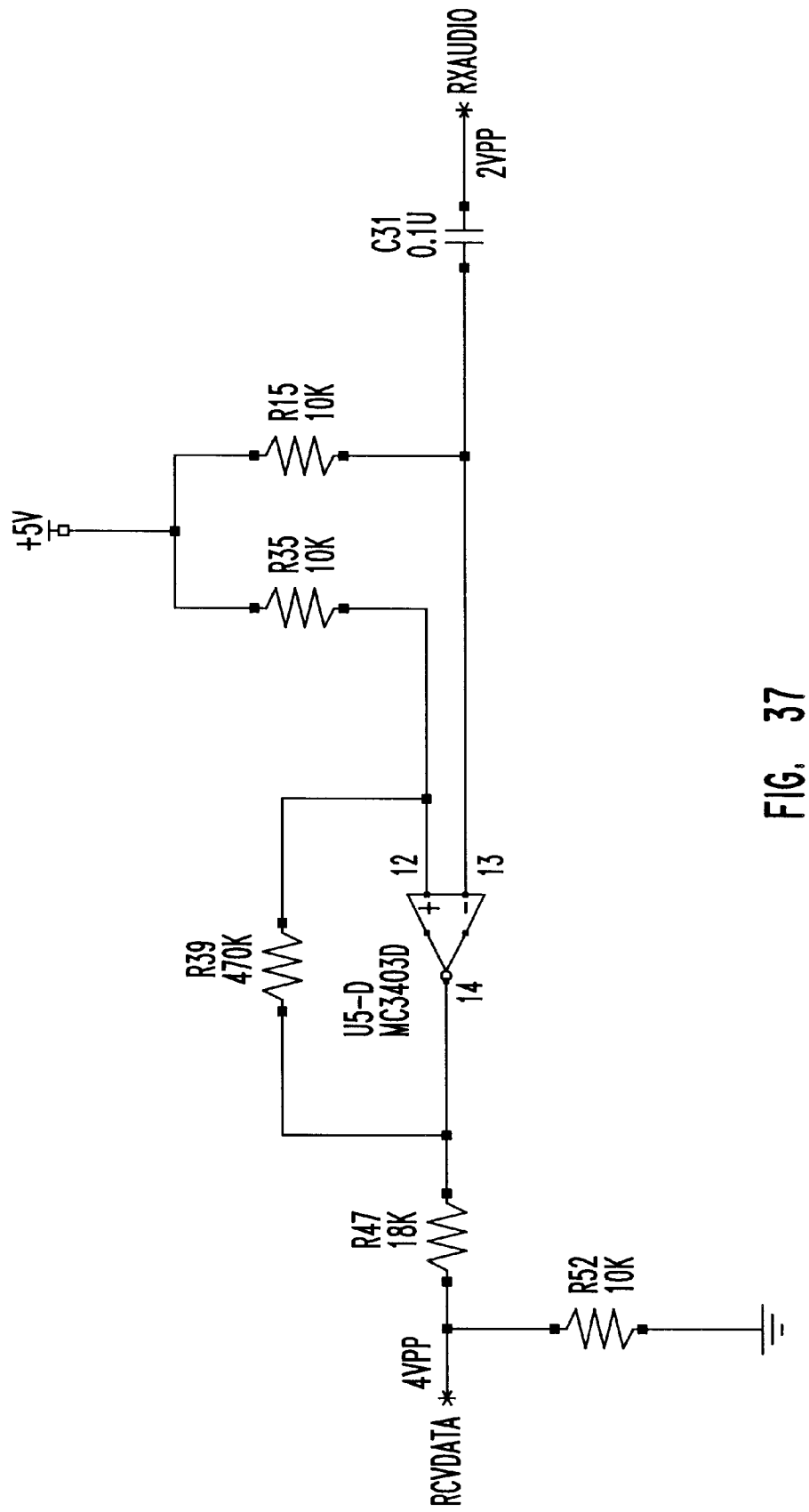
FIG. 37 depicts a data discriminator.
Figure 38:
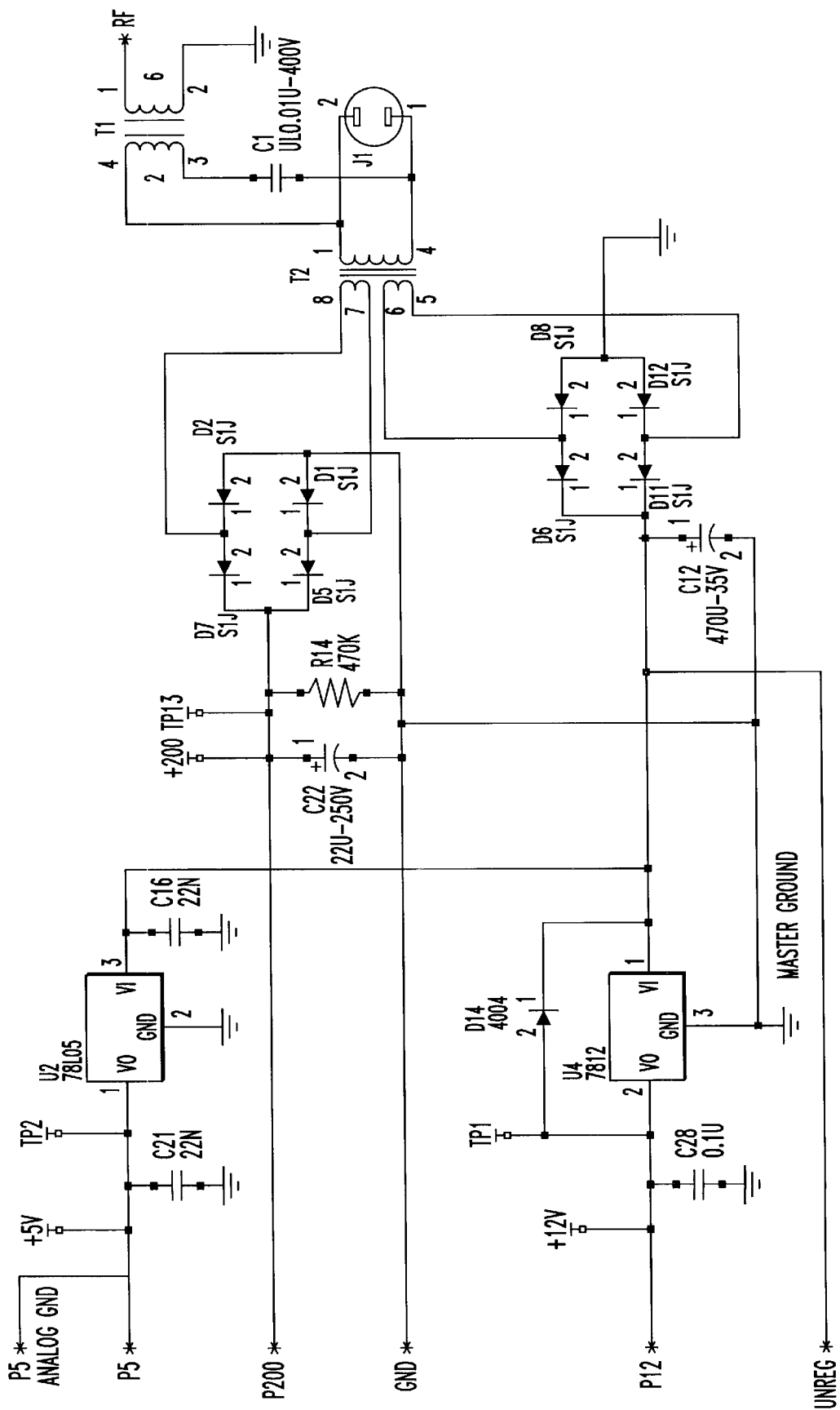
FIG. 38 depicts a power supply.

FIG. 15 is page 1 of a hierarchical schematic diagram of a secure access extension unit 104 (or 107, 112 or 117). Each of the blocks 15-2 through 15-12 are illustrated as complete electrical schematics in FIGS. 28 through 38 according to hierarchical schematic procedures. Phone set cord 105 is connected to SLIC 15-2, and AC power line 103 interfaces with power supply 16-12. Attention is directed to the microcontroller 15-10 with its attendant I/O lines 130 through 139. The unreg 130 input provides the power on/off reset of FIG. 12 and 13. On power up care is taken to start the controller after the power supplies and clock 139 are stable, and upon power down, to stop the controller before the clock and power supplies become unstable. Data from the base unit 102 is received and discriminated through blocks 15-12, 15-7, 15-8, and 15-11 and enters the microcontroller 15-10 via line 131 where the data is validated and sorted into system control instructions. The other hardware input is off hook status detection 133 of the extension phone set 106. The microcontroller 15-10 logic acts upon these inputs to provide the appropriate system control responses. Ring messages from the base are validated and sent through port 34 to the slic 15-2 which rings the extension phone set 106. When a user takes the extension phone off hook, this indication at port 133 makes the controller turn off the high voltage ring at 134, check the status of the system for other extensions in use, and if all is clear, turn on the transmitter via 138, message the base 102 to access the central office line 101, receive and validate a "co acknowledgment" message returning through 131, unmute audio paths via 136, and the extension unit can either talk with a caller or, upon hearing a central office dial tone, send DTMF signals or pulse dial messages to dial a phone number. The extension unit can also indicate to certain phone accessories connected in place of phone set 106 that line 101 is in use by hardwired phone sets by means of port 135 and hardware in slic 15-2 which produces a lower line voltage at cord 105. The flow of other audio and RF signals as indicated in FIG. 15 will be apparent to a person of ordinary skill in the art.

Cordless Telephone System

The herein described CDMA, TDMA and FDMA techniques can be applied to a cordless telephone system, wherein an RF carrier replaces the power line carrier and an antenna replaces the power line interface. Hence, the communications medium is the only real difference, while the multiple access requirements remain the same, and FIG. 3 applies to a cordless telephone system as well as to a line carrier system.

Figure 39:
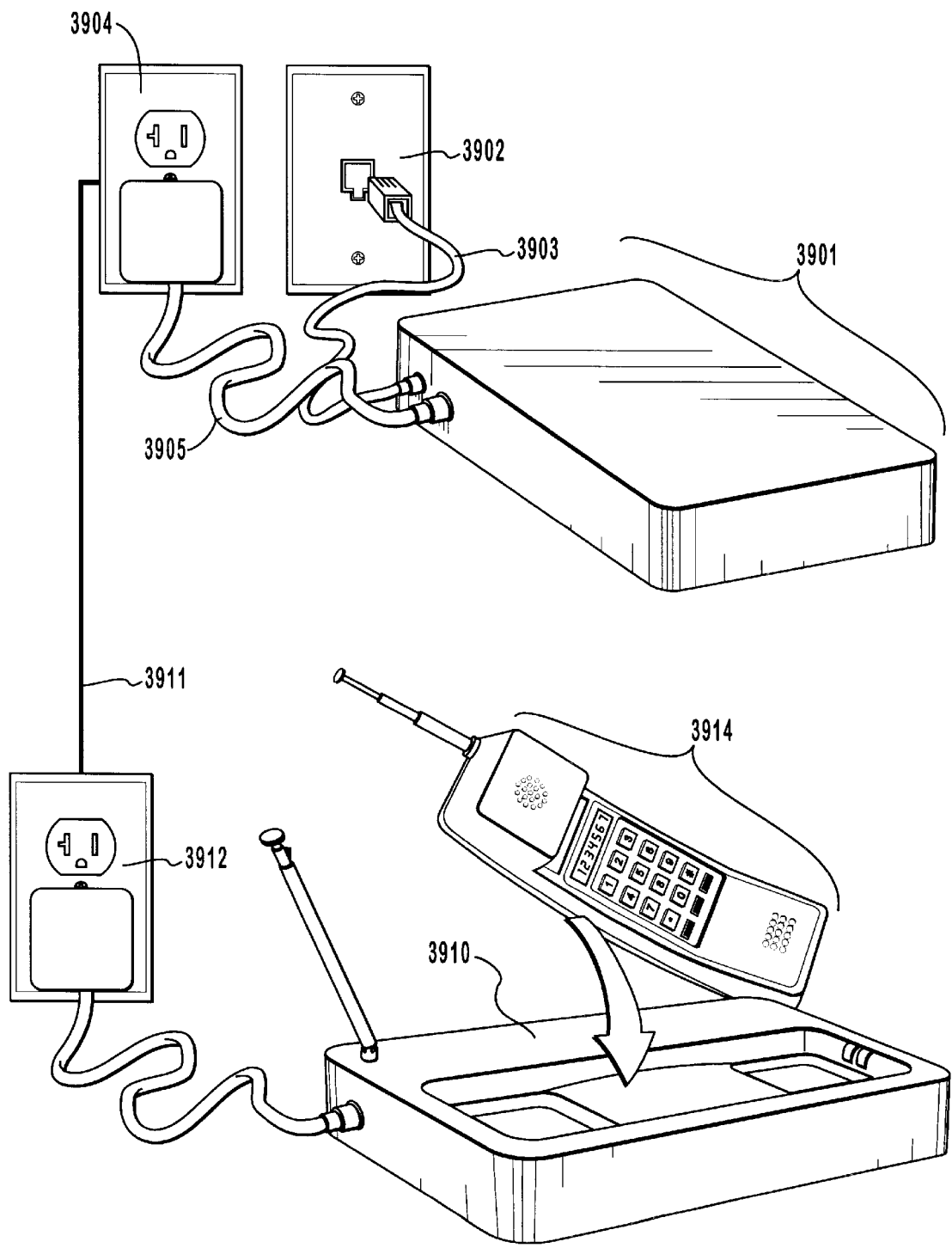
FIG. 39 is an illustration of an extension unit which includes a cordless telephone handset.

An embodiment of the invention in which a cordless extension handset is used is depicted in FIG. 39. The base unit 3901 is connected to conventional telephone jack 3902 by means of RJ-11 cable 3903 and to a first 120 volt AC wall outlet 3904 by cable 3905. Telephone signals are detected and encoded into multiple access line carrier signals in the base unit as described previously, and transmitted to one or more extension units 3910 (only one extension unit is depicted) via power line 3911. Extension unit 3910 is connected to second 120 volt AC wall outlet 3912 via cord 3913. Telephone signals sent to extension unit 3910 via power line 3911 are detected and decoded in extension unit 3910 as described previously. Multiple access or multiple, secure access coding techniques may be used. However, rather than generating a ring signal in the extension and sending voice signals to the handset via a cord once an offhook condition is detected, ring and voice signals are encoded as radio frequency signals and sent to cordless extension handset 3914; similarly, off-hook and voice signals generated by the handset are encoded as radio-frequency signals which are received by the extension unit, converted to multiple access or multiple, secure access signals, and transmitted back to base unit 3901 via power line 3911.

Caller Identification Data Transmission and Detection

In many locations, caller identification information is now routinely transmitted with telephone calls. Caller identification information typically consists of a frequency shift keyed (FSK) signal representing the directory number of the station which originated the call. The caller identification information is sent in the "silent" interval between the first and second ring signals. It is a goal of the present invention to make caller ID information available in a multiple access telephone system, with or without secure access coding and with either a conventional or cordless extension unit. This is accomplished by including circuitry in the base unit for detecting the caller ID data following detection of the first ring signal; converting the caller ID data to a multiple access signal and transmitting it to the extension unit. The extension unit must also include circuitry (or programming code) for detecting and decoding the caller ID data, and either presenting it on a display on the extension unit, or converting it to an FG signal and transmitting it to a cordless handset where it is received and displayed.

Figure 40:
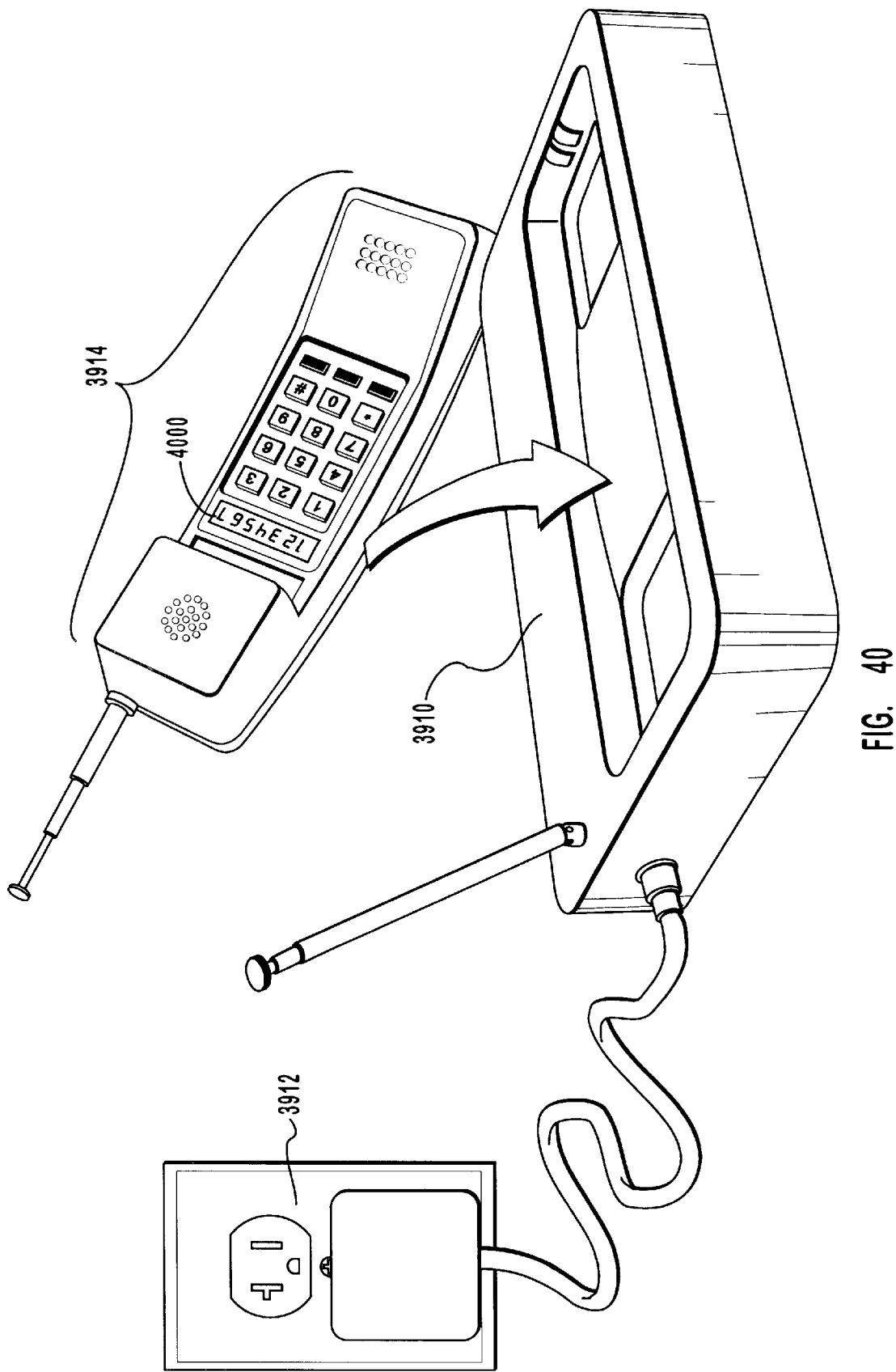
FIG. 40 depicts an extension unit with a cordless telephone handset with a display panel for displaying caller ID information.

An embodiment of the invention in which caller ID information is provided is shown in FIG. 40. In this figure, an extension unit 3910 with a cordless handset 3914 is depicted. Caller ID information is displayed on alphanumeric display panel 4000 on handset 3914. Caller ID information may be transmitted to the handset as radio frequency signals, as are the ring and voice signals. The handset would then also contain circuitry for detecting and decoding signals containing caller identification information. Caller ID information may of course also be provided in an extension unit with an attached handset, or in the base unit.

It would also be possible to send the caller identification information after the parties established a talking condition between the calling and receiving stations. Information in addition to the directory number of the originating station could be included, such as service indicators or alphanumeric text. In the present invention, circuitry for detecting and decoding caller identification information is present in both the base and extension units. In the base unit, the system controller initiates detection of the caller identification signal after the first ring signal has been detected. The caller identification signal is converted to a digital signal and transmitted to the extension unit on the building power lines, as are the ring signals. At the extension unit, the caller identification information is detected and decoded after the first ring signal is detected. The caller identification information is stored in data memory, and subsequently displayed on a display line.

The present invention provides a method and system of code synchronization to provide multiple extensions for the same subscriber line which do not interfere with each other. The system and method of the present invention utilizes FDMA (frequency division multiple access) in combination with CDMA to prevent interference between relatively close neighboring transmission systems or partner transmissions in the same system and to provide for multiple access (simultaneous transmission) of duplex signals for at least one telephone line. Moreover, the present invention provides a method and system of multiple access telephone extension communications which applies equally well to both cordless and line carrier telephone extension systems and methods.

Many variations on the system illustrated the figures will be readily apparent to one of ordinary skill in the art from previous discussions herein.

It will be appreciated that the present invention provides an effective method of multiple access communication which provides for multiple access of a plurality of signals on a single communications medium. The system and method of the present invention also utilizes both TDMA (time division multiple access) and CDMA (code division multiple access) to permit high data rates and multiple access by two or more telephone lines. CDMA (code division multiple access) is also utilized to provide a high degree of security for preventing unauthorized access to the subscriber's line, and which provides privacy with respect to conversation from third parties.

Another variation replaces the analog compandor and FM modulation technique with a CVSD (continuously variable slope delta modulator) and FSK modulation. A CVSD may also be regarded as a single bit A/D converter with companding. A CVSD requires a 16 kBs to 32 kBs FSK rate at transmitter and receiver, which is practical with some commercial receiver chips. Security can be provided for digital data transmissions by providing encryption techniques.

Many receiver chips also provide FM demultiplex capability, which provides several additional approaches to audio and control signaling. For example, the secure access control signaling could be transmitted on an upper sideband simultaneously with lower sideband audio. This could enhance transparency of operation by not muting audio during certain signaling operations. Also, a separate data channel could be implemented using a subaudio modulation technique.

Some variations could be made in the structure of the secure access message and its sync techniques, system control instructions and security code structure/length. Because of the frequency lock between transmitter and receiver, synchronous data transmission techniques are feasible which simplify data discrimination.

While the present invention has been described and illustrated in conjunction with a number of specific embodiments, those skilled in the art will appreciate that variations and modifications may be made without departing from the principles of the invention as herein illustrated, described and claimed.

The present invention may be embodied in other specific forms without departing from its essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A telephone communications system for transmitting and receiving telephone communications via AC power lines in a building, the system comprising:
   a) a base unit and an extension unit, each said unit comprising:
      i) off hook circuitry for detecting off hook status in the extension unit;
      ii) means for converting analog telephone communications signals to digital data signals;
      iii) means for generating a transmission carrier;
      iv) code division multiple access transmitter means for modulating said transmission carrier by said digital data signals;
      v) at least one additional multiple access means for further modulating and controlling transmission and reception of said modulated transmission carrier, said additional multiple access means being selected from the group consisting of:
         1) time division multiple access multiplexing means for controlling the times at which the digital data signals are transmitted and received; and
         2) frequency division multiple access means for changing said transmission carrier's frequency;
      vi) means for coupling said modulated transmission carrier to the power lines of the building;
      vii) code division multiple access receiving means for demodulating said modulated transmission carrier received via said power lines to produce analog telephone communications signals;
   b) means for coupling at least one subscriber telephone line to said base unit;
   c) ring detect circuitry associated with said base unit for detecting a ring signals in said subscriber line and transmitting a ring signal via said power lines in said building to the extension unit;
   d) ring generator circuitry associated with said extension unit for detecting a ring signal transmitted via said power lines and generating a ring signal in said extension unit;
   e) caller identification detect circuitry associated with said base unit for detecting caller identification signals transmitted with said ring signal and transmitting a caller identification signal via said power lines in said building to said extension unit;
   f) caller identification circuitry associated with said extension unit for detecting said caller identification signal transmitted via said power lines; and
   g) a display device on said extension unit on which caller identification information is presented to the telephone subscriber.

2. A telephone communications system in accordance with claim 1, wherein said extension unit comprises a cradle and a cordless handset; wherein said ring signals, telephone communications signals, and caller identification signals are transmitted from said cradle to said cordless handset as radio frequency signals; and wherein said display device is located on said cordless handset.

3. A cordless multiple access telephone communications system for transmitting and receiving telephone communications via AC power lines in a building, the system comprising:
   a) a base unit and an extension unit, each said unit comprising:
      i) off hook circuitry for detecting off hook status in the extension unit;
      ii) means for converting analog telephone communications signals to digital data signals;
      iii) means for generating a transmission carrier;
      iv) code division multiple access transmitter means for modulating said transmission carrier by said digital data signals;
      v) at least one additional multiple access means for further modulating and controlling transmission and reception of said modulated transmission carrier, said additional multiple access means being selected from the group consisting of:
         1) time division multiple access multiplexing means for controlling the times at which the digital data signals are transmitted and received; and
         2) frequency division multiple access means for changing said transmission carrier's frequency;
      vi) means for coupling said modulated transmission carrier to the power lines of the building;
      vii) code division multiple access receiving means for demodulating said modulated transmission carrier received via said power lines to produce analog telephone communications signals;
   b) a cordless handset associated with said extension unit;
   c) RF transmission circuitry in said extension unit for transmitting said analog telephone communications signals to said cordless handset; and
   d) RF reception circuitry in said handset for receiving said analog telephone communication signals transmitted from said extension unit.

4. A method for telephone communications, the method comprising the steps of:
   a) converting analog telephone communication signals to digital communication signals;

b) producing a transmission carrier;

c) modulating said transmission carrier with said digital communication signals using code division multiple access techniques;

d) further modulating and controlling said transmission carrier by at least one additional multiple access technique selected from the group consisting of:
  i) time division multiple access for controlling the times at which the transmission carrier is transmitted and received; and
  ii) frequency division multiple access for changing said transmission carrier's frequency to another frequency;

e) coupling said modulated transmission carrier to power lines of a building;

f) receiving and demodulating said modulated transmission carrier transmitted via said power lines using code division multiple access receiving techniques to produce analog communication signals;

g) converting said analog communication signals to RF signals;

h) transmitting said RF signals; and i) receiving said RF signals in a cordless telephone handset.

5. A method for telephone communications, the method comprising the steps of:

a) detecting a first ring signal;

b) detecting a caller identification signal transmitted after said first ring signal and before a second ring signal;

c) converting said first and second ring signals and all subsequent ring signals to digital ring signals;

d) converting said caller identification signal to a digital caller identification signal;

e) converting analog voice signals to digital voice signals;

f) producing a transmission carrier;

g) modulating said transmission carrier with said digital ring, caller identification, and voice signals using code division multiple access techniques;

h) further modulating and controlling said transmission carrier by at least one additional multiple access technique selected from the group consisting of:
  i) time division multiple access for controlling the times at which the transmission carrier is transmitted and received; and
  ii) frequency division multiple access for changing said transmission carrier's frequency to another frequency;

i) coupling said modulated transmission carrier to power lines of a building;

j) receiving and demodulating said modulated transmission carrier transmitted via said power lines using code division multiple access receiving techniques to produce analog ring, caller ID, and voice signals.

6. A method in accordance with claim 5, comprising the further steps of:

k) converting said ring, caller ID and voice signals to RF signals;

l) transmitting said RF signals from an extension unit cradle; and m) receiving said RF signals in a cordless telephone handset;

wherein caller ID information contained in said caller ID signal is displayed on said cordless telephone handset.

* * * * *